United States Patent [19]

Drummond

[11] 4,161,101
[45] Jul. 17, 1979

[54] CONTROL SYSTEM FOR AND METHOD OF ZERO ERROR AUTOMATIC CALIBRATION OF GAS TURBINE TEMPERATURE CONTROL PARAMETERS

[75] Inventor: Thane M. Drummond, Roanoke, Va.

[73] Assignee: General Electric Company, Salem, Va.

[21] Appl. No.: 722,066

[22] Filed: Sep. 9, 1976

[51] Int. Cl.² ............................................. F02C 9/04
[52] U.S. Cl. ............................ 60/39.03; 60/39.28 R; 364/431
[58] Field of Search ............... 60/39.28 T, 39.28 R, 60/39.06, 39.03; 73/116, 341; 364/431

[56] References Cited

U.S. PATENT DOCUMENTS

| | | | |
|---|---|---|---|
| 3,709,626 | 1/1973 | Eggenberg | 415/17 |
| 3,719,071 | 3/1973 | Hohenberg | 73/116 |
| 3,764,785 | 10/1973 | Harner | 60/39.28 R |
| 3,789,665 | 2/1974 | Hohenberg | 60/39.28 R |
| 3,899,878 | 8/1975 | Compton | 60/39.28 T |
| 3,955,359 | 5/1976 | Yannone | 60/39.28 R |
| 4,058,975 | 11/1977 | Gilbert | 60/39.28 T |

*Primary Examiner*—Robert E. Garrett
*Attorney, Agent, or Firm*—Arnold E. Renner

[57] ABSTRACT

A control system including a controller for reading temperature values from sensors in a gas turbine, determining the reliability of the sensors, and issuing a fuel control signal for use in controlling the turbine is disclosed. The fuel control signal has a calculated value which is a function of the turbine operating temperature derived from the values of temperature signals generated by the sensors.

8 Claims, 23 Drawing Figures

| |
|---|
| INPUT DATA (TEMPERATURE CONDITIONS) |
| OUTPUT DATA (TRIM OR FUEL CONTROL) |
| CONSTANTS & MASKS |
| MASTER STATUS PROGRAM (READ TEMPERATURE INPUTS & SEND TRIM) |
| SCRATCH (WORKING STORAGE) |
| TEMPERATURE CONTROL PROGRAM TCC, TCA, PPR SUBROUTINES (CALCULATE TEMPERATURE & TRIM) |
| OTHER CONTROL PROGRAMS (EG. SPEED/LOAD) |
| SEQUENCING PROGRAM (SIMULATED RELAY COILS, CONTACTS, TIMERS, ETC.) |

FIG. 3

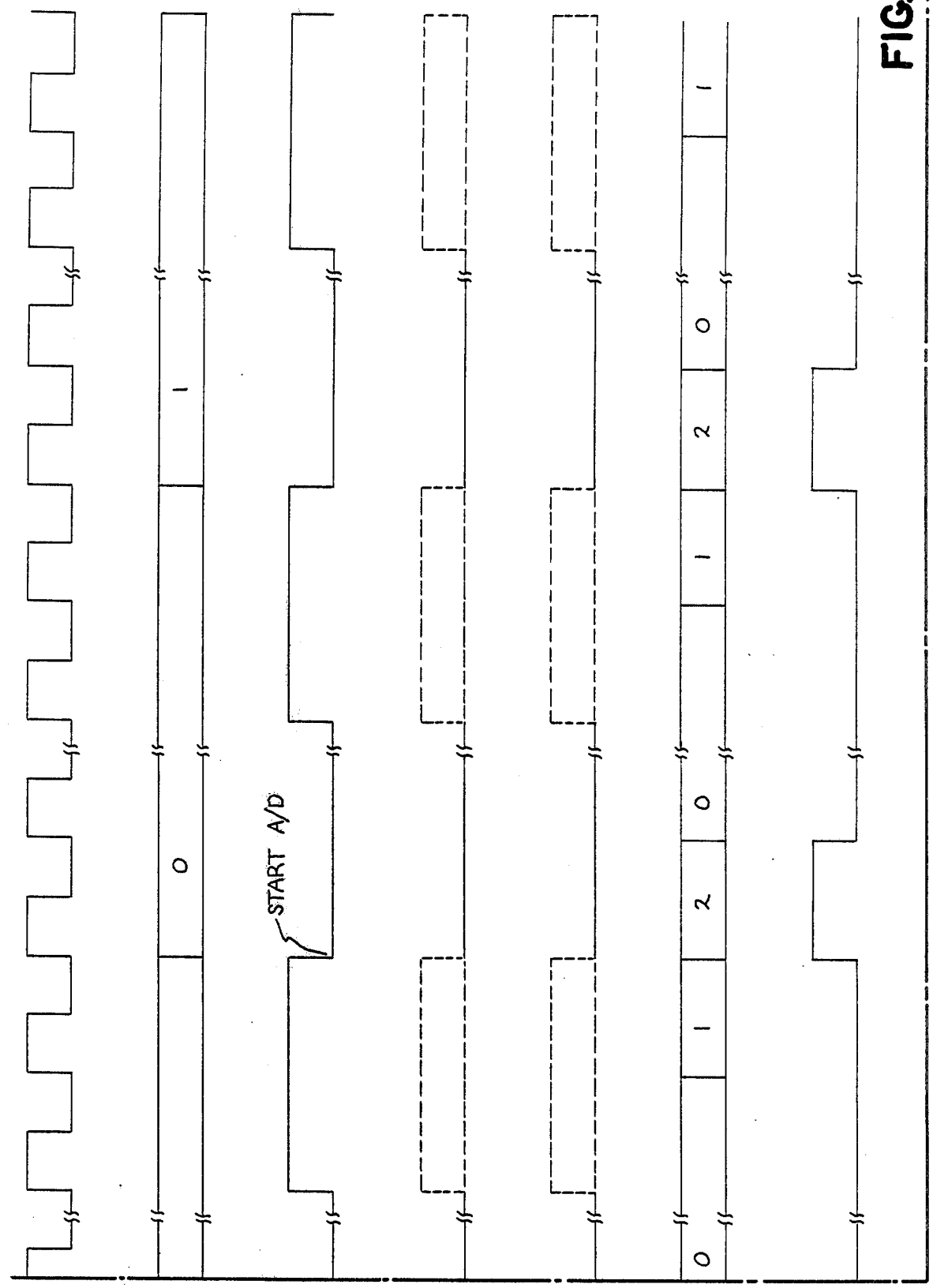

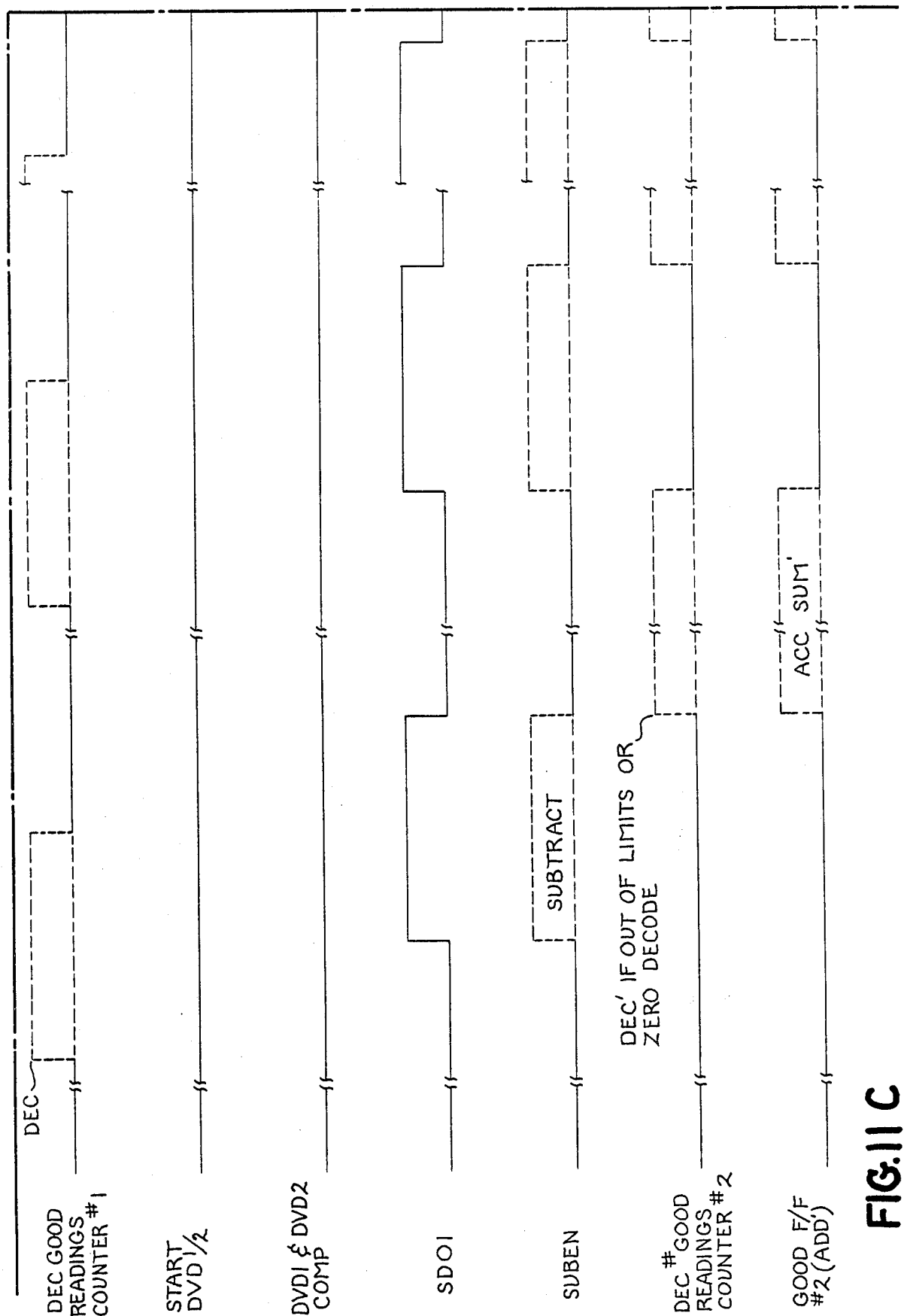

CONTROL SYSTEM FOR AND METHOD OF ZERO ERROR AUTOMATIC CALIBRATION OF GAS TURBINE TEMPERATURE CONTROL PARAMETERS

BACKGROUND OF THE INVENTION

1. Field of the Invention

This invention relates generally to gas turbine control systems and more particularly to an improved control system and method of controlling fuel flow to a gas turbine to control the temperature thereof.

2. Description of the Prior Art

The present day high acceptance of large capacity gas turbine power plants for large peak load applications has made the reliability and economical operation of these power plants an important concern to the user. This is due in large part to the fact that these power plants are often located in remote areas and operate unattended and to assure higher turbine reliability and economical operation, turbine temperature regulation must be accurate. Remote control is sometimes provided by a telemetry communication link.

Traditionally, the operating temperature of a gas turbine has been controlled by regulating either the firing or exhaust temperature of the turbine. Regardless of which is to be regulated, multiple thermocouples or other temperature sensing devices are employed for sensing the turbine temperature. In most all turbines, to measure the exhaust temperature, a plurality of thermocouples are placed at various points in the turbine exhaust plenum and the temperature signals generated by the thermocouples are averaged to calculate a value proportional to the average exhaust temperature.

In the prior art, this averaging has been done by electronic analog elements interconnected as a temperature regulating system to control the average exhaust temperature at some predetermined level.

The analog elements in temperature regulators, whether they be pure analog or a combination of digital and analog, present several problems:

1. A temperature reference set point or base temperature, usually an analog reference voltage, is employed in controllers for comparison with the average exhaust temperature to derive a fuel control signal for controlling fuel flow to the turbine and hence the operating temperature. It is well known in the art that these analog reference voltages are susceptible to drift with time and/or temperature, thus leading to inaccuracies in temperature control.

2. In digital controllers tolerance and drift errors are introduced into the temperature calculations by the analog-to-digital and digital-to-analog conversion circuitry. Also, round off and truncation in digital calculations can introduce errors or inaccuracies in the temperature calculation.

3. Additional inaccuracies are also introduced in the temperature calculation due to summing resistor tolerances at the inputs to amplifiers. Inaccuracies are also introduced by various buffer amplifiers which are used for signal conditioning of input and output signals of the system controller.

The above inaccuracies all contribute to a disagreement between the aforementioned temperature reference set point and the calculated average turbine exhaust temperature. This disagreement accordingly, leads to inaccurate turbine temperature control.

A disagreement between the temperature reference set point and the calculated or determined average turbine temperature can be detrimental to overall system operation. For example, the loss of accuracy of only a few degrees in turbine temperature can degrade both turbine life and fuel economy. Each of these can contribute to a lack of customer or user acceptance of a system.

It is, therefore, desirable to provide a control system and method for accurately controlling the operating temperature of a gas turbine which enhances turbine life and reduces the operating fuel costs of the turbine.

SUMMARY OF THE INVENTION

The foregoing disadvantages are overcome by the present invention by the provision of a turbine temperature regulating system capable of automatically calibrating out electrical tolerance and drift errors in a fuel control signal for controlling fuel flow to the turbine and hence the temperature thereof.

Control of gas turbine temperature, in one embodiment of the present invention, is afforded by a stored program digital computer or programmable controller which effects the reading and storing of temperature readings or values provided by signals from temperature sensors in the turbine. The computer program is comprised of instructions which, when executed by the computer, calculate the value of a trim signal for use in controlling fuel flow to the turbine and, hence, the turbine operating temperature.

In one instance, the trim signal takes on a value derived from the difference in the magnitude of a specified temperature reference proportional to a desired turbine operating temperature and a calculated value which is a function of turbine operating temperature derived from an averaging of the values of the temperature sensor readings. The trim signal is adjusted at a slow rate by a vernier constant when a difference exists between the temperature reference and the average turbine temperature to close the difference therebetween to calibrate out any electrical tolerance or drift errors in the system causing that difference. By keeping the difference between the temperature reference and the average temperature at zero or within a narrow deadband region, turbine temperature control accuracy is enhanced.

An analog backup means is also implemented into the system to operate the turbine at reduced temperature as specified by a safe turbine temperature reference in the event of computer failure, potential turbine combustion problems, or to trip the turbine, shutting it down, if a serious turbine combustion or instrumentation problem is detected.

Temperature signals from specified ones of the turbine sensors are provided to the analog backup means. The analog means generates a mid-value signal having a magnitude intermediate the values of the specified temperature signals which is approximately equal to the average turbine exhaust temperature. This mid-value signal is used by the computer in calculating the trim signal. Further, the mid-value signal is summed with the safe temperature reference and the trim signal to develop a temperature fuel control signal from the analog means for use in controlling fuel flow to the turbine.

In a second embodiment of the invention, an analog controller continuously monitors the signals or temperature readings generated by the turbine sensors. Means in the analog controller averages the temperature readings to derive a value proportional to the actual turbine temperature. The actual turbine temperature value is algebraically combined with a reference proportional to a desired turbine temperature to derive a correction signal which is slowly adjusted by a vernier constant. The correction signal is combined with a signal proportional to the desired turbine temperature to generate the aforementioned trim signal for application to the analog backup means.

In a third embodiment of the invention, a static digital controller continuously scans the temperature sensors, performs an analog to digital conversion on each sensor temperature reading and calculates the value of the temperature fuel control signal for use in controlling the turbine.

In this latter embodiment, means in the controller enables the calculation of the average turbine temperature from the temperature sensor readings. A storage means receives a value proportional to each temperature reading.

The values of the temperature readings are summed and the value of the actual average turbine temperature is calculated by dividing the number of temperature readings or sensors into the sum of those readings.

The development of a correction signal for calibrating out the previously mentioned errors is calculated by subtracting the actual average temperature from a base reference proportional to a desired turbine operating temperature to derive a difference signal. If a difference exists between the difference signal and a specified reference, the correction signal is adjusted by a vernier constant. This correction signal is combined with the aforementioned base reference to develop the trim signal.

The previously mentioned analog backup means is also implemented in this embodiment. The temperature fuel control signal to the turbine is generated by the analog backup means by combining the trim signal, the mid-value signal and the safe analog temperature reference as previously described.

In each of the above described embodiments, means in the controller detects an out of limits condition for the correction signal and sounds an alarm signifying that condition.

In view of the foregoing, it is therefore an object of the present invention to provide a turbine temperature control system and method having enhanced operating capabilities.

It is another object to provide a stored program computer or controller for calculating the temperature of a gas turbine to develop a correction signal for automatically calibrating out system errors which can introduce inaccuracies in the turbine temperature.

A still further object is to provide a control system and method of providing a fuel control signal to a gas turbine for controlling the temperature thereof whereby the fuel control signal is adjusted by a vernier constant to calibrate out system errors when there is a difference between the average turbine temperature and a specified reference proportional to a desired turbine operating temperature.

It is another object to provide a control system including either a digital or an analog controller for providing a fuel control signal to a gas turbine for controlling the temperature thereof whereby the fuel control signal is adjusted by a vernier constant when there is a difference between the average turbine temperature and a specified reference proportional to a desired turbine operating temperature to thereby remove the difference between the turbine temperature and the reference.

The foregoing and other objects will become apparent as the description proceeds and the features of novelty which characterize the invention will be pointed out in particularity in the claims annexed to and forming a part of this specification.

BRIEF DESCRIPTION OF THE DRAWING

The present invention may be more readily understood by reference to the accompanying drawing in which:

FIG. 3 is a memory map showing in exemplary form the organization of programs and data in the memory of the programmable controller of FIG. 1.

FIGS. 11a through 11d collectively comprise a timing diagram useful in understanding the operation of the controller of FIGS. 10a through 10d.

DESCRIPTION OF THE PREFERRED EMBODIMENT

Figure 1:
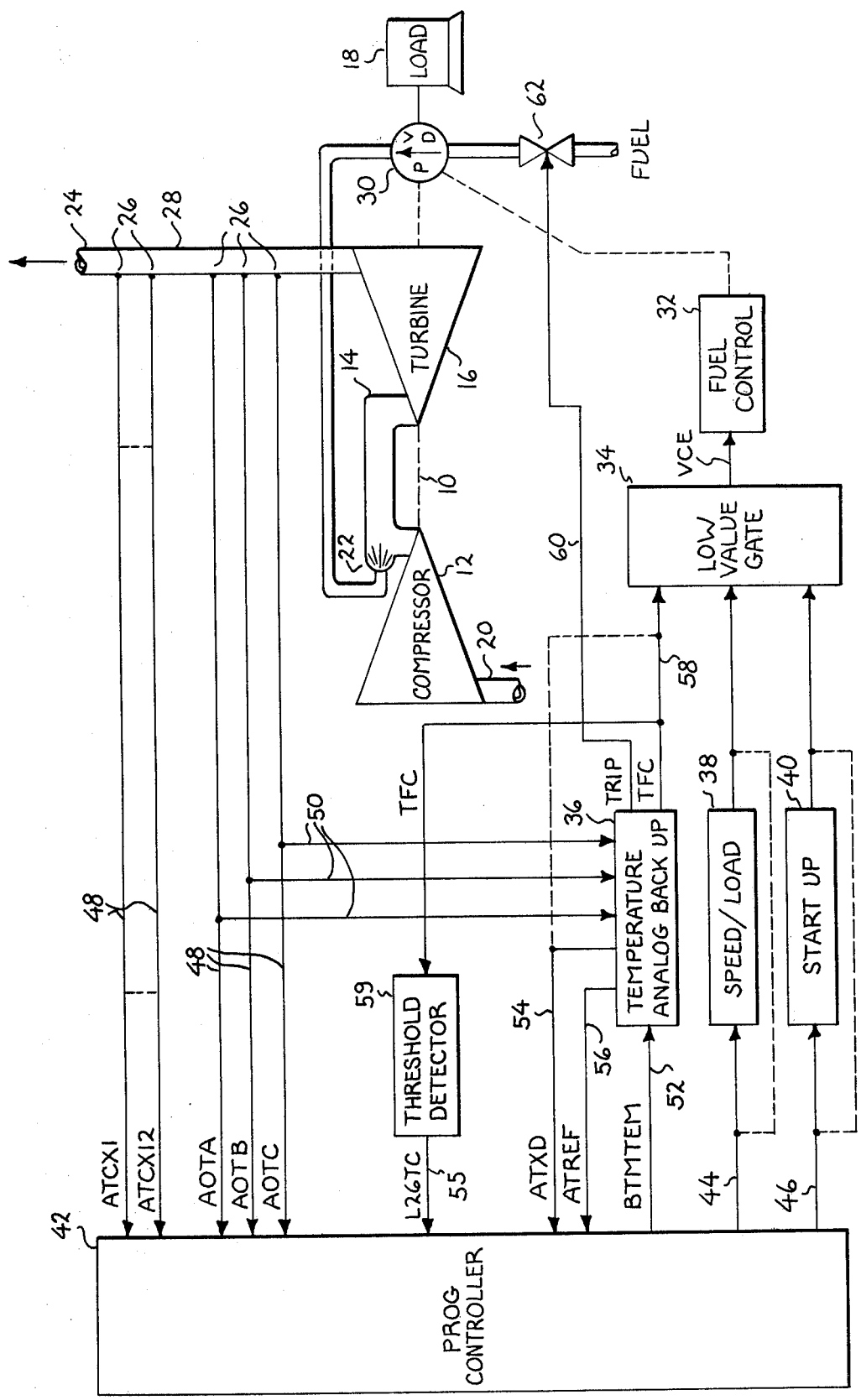
FIG. 1 is a major block diagram of a gas turbine temperature control system in accordance with the present invention.

Referring to FIG. 1 of the drawing, a simplified representation of a single shaft gas turbine shown generally as 10 includes a compressor 12, combustion chamber 14, and turbine 16 connected to drive a load 18. Air entering a compressor inlet at 20 supports the combustion of fuel injected by a nozzle 22. The heated exhaust gasses exit from a turbine outlet 24 past distributed temperature sensors or thermocouples 26, the latter serving to generate signals for measuring exhaust temperature in an exhaust plenum 28. A shaft driven variable delivery fuel pump 39 delivers fuel to nozzle 22 at a rate which depends both upon the rotational shaft speed of the gas turbine 10 and the pump stroke setting specified by a fuel control servo 32 mechanically linked to the pump 30. The details of the fuel control servo 32 are not material to the present invention since it may include any servo mechanism which positions the stroke setting control on the pump at a position corresponding to an electrical positioning or fuel control signal (VCE), there being many devices on the market suitable for such use. Also, since the gas turbine may utilize or gas fuels, a gas valve positioner could be employed to control fuel flow to the combustion chamber. The term fuel control signal is used generically herein to control fuel flow to the turbine regardless of the type of fuel used.

The fuel control signal VCE is a single valued electrical signal applied to the fuel control servo 32 by a low value gate 34. The VCE signal always has a value obtained from one of a number of input signals applied to gate 34, whereby each is intended to have a preference over a certain phase of gas turbine operation. The structure and principles of operation of the low value gate 34 ae documented in detail in U.S. Pat. No. 3,520,133, entitled "Gas Turbine Control System" to A. Loft et al, and assigned to the assignee of the present invention.

There are shown in FIG. 1, three input signals provided to the low value gate 34. One of these signals is a temperature fuel control signal TFC provided from a temperature analog backup means 36 forming a part of the invention. Two other signals are applied from a speed/load control 38 and a start-up control 40. In the basic operation of the low value gate 34, its output signal VCE will always represent the value of the lowest input signal applied to that gate. That is, the fuel control signal (VCE) can be no higher than the lowest control signal supplied to gate 34. In the present embodiment the speed/load control 38 and the start-up control 40 form no part of the invention. They are merely included in FIG. 1 to more appropriately put the temperature analog backup means 36 into an overall turbine control environment for clarity and completeness of disclosure. The speed/load control 38 and the start-up 40 may be free standing units receiving input signals from various sensors in the turbine or they may receive calculated signals from a programmable controller or computer 42 via conductors 44 and 46 if the system is under computer control.

The controller 42 may be any one of several well-known types of process computers such as the General Electric 4010 or 4020 process computers, or a programmable controller such as that manufactured by General Electric Company as "Directo-Matic" logic controller. This latter controller is ideally suited for implementation into the preferred embodiment of the present invention and the details of operation of that controller are disclosed in referenced U.S. Pat. No. 3,969,722, issued July 13, 1976, entitled "Method and Apparatus for Operator Interrogation of Simulated Control Circuits" to William J. Danco et al and assigned to the assignee of the present invention.

The controller 42 is preferably of the industrial type and includes analog to digital conversion means for converting applied analog input signals to digital values for storage in the controller memory and digital to analog conversion means for converting digital values to analog signals for output from the controller memory. Since the techniques of converting analog and digital data are well known in the art, the circuitry for performing these functions is not shown. Analog input signals ATCX1–ATCX12 and AOTA–AOTC are provided as temperature readings to the digital controller via a plurality of conductors 48 from the turbine sensors 26. These signals possess values representative of the temperature of the exhaust plenum 28. Further, should a temperature sensor 26 fail, such as by an open or short, the value of the signal on the line corresponding to the failed sensor will provide an invalid condition to the controller indicating that the sensor has failed.

It will be noted that a plurality of specified sensor signals, as shown by the three signals AOTA, AOTB and AOTC, are provided as inputs to the temperature analog backup means 36 via conductors 50. Although these three temperature signals figure into the overall averaging of the turbine temperature, each signals sensor is also utilized as a backup for increasing the realiability of the temperature control system of the present invention. The purpose of these latter temperature signals will become more apparent as the description proceeds in connection with the temperature analog backup means 36.

The analog backup means 36 also receives a temperature trim signal or control signal BRMTEM from the programmable digital controller 42 on a conductor 52. The previously mentioned mid-value signal generated by the analog backup means is shown applied to controller 42 as a signal ATXD on conductor 54. The value of the ATXD signal is intermediate the values of the three backup sensor inputs AOTA–AOTC.

An additional input to the controller 42 from the analog backup means 36 is an analog temperature reference signal ATREF on a conductor 56. The ATREF signal is an analog voltage proportional to a desired turbine operating temperature, the value being set at a safe level for all possible operating conditions. In the embodiment of FIG. 1, the ATREF signal is shown as being generated by the analog backup means 36. However, the ATREF signal may come from any suitable analog voltage source for application to the controller. A value corresponding to the ATREF signal may also be stored in the controller instead of providing it by an external source. In any event the ATREF signal may be utilized in calculating the BTMTEM signal when the analog means is incorporated in the system. The ATREF signal is also used by the analog backup means 36 as will subsequently be described. The controller also receives a signal L26TC on a conductor 55 from the backup means 36 by way of a threshold detector 59. This signal is utilized by the controller 42 to determine when the system is on temperature control versus start or warm-up control.

The temperature analog backup means 36 generates two additional output signals, the temperature fuel control signal TFC onn a conductor 58 and a TRIP signal on a conductor 60. The TRIP signal is applied as a control signal to a fuel control valve 62 via a conductor 60.. It is utilized to shutoff fuel going to the turbine in the event of certain system failures to be subsequently described.

Figure 2:
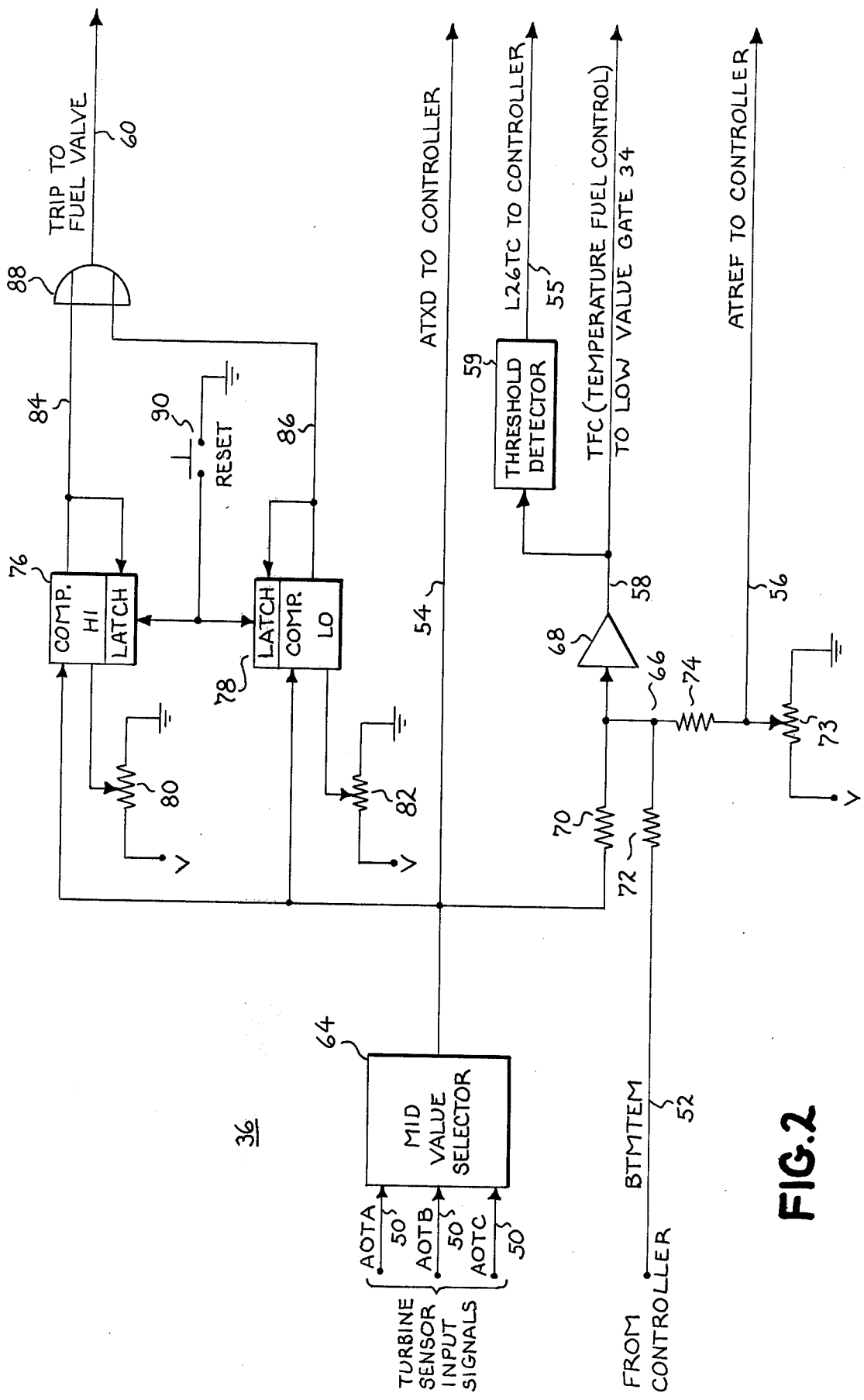
FIG. 2 is a schematic block diagram of one embodiment of the analog backup means of FIG. 1.

Reference is now made to FIG. 2 which shows, in schematic block diagram form, one embodiment of the analog backup means 36. This circuit is comprised of a mid-value selector 64 of known type for receiving the backup analog sensor inputs AOTA, AOTB and AOTC on conductors 50. The details of the mid-value selector 64 are described in U.S. Pat. No. 3,492,588, entitled "Median Selector For Redundant Signals", to M. P. Woodward, Jr., and assigned to the assignee of the present invention. The mid-value selector 64 provides the ATXD signal on conductor 54 to the controller 42. As previously mentioned, the ATXD signal, under normal sensor operating conditions, takes on a value mid the values of the signals applied to the mid-value selector. Further, the ATXD signal normally hhas a value approximately proportional to the average turbine exhaust temperature. The ATXD, BTMTEM and ATREF signals are all provided to a summer shown as a junction 66 where these signals are algebraically combined for input to a regulator amplifier 68, the output of which provides the TFC signal to the low value gate 34 and to a threshold detector 59. The threshold detector 59 generates the L26TC signal to the controller.

The ATXD signal is applied to the summing junction 66 through a resistor 70 and the BTMTEM signal is applied to the junction 66 via a resistor 72 The ATREF signal, the safe temperature reference, is provided to the junction 66 through a resistor 74 and to the controller on conductor 56. The ATREF signal is derived from a voltage source V and ground potential via a slider resistor 73.

Still referring to FIG. 2, the ATXD signal is also supplied to two conventional comparator amplifier latch circuits 76 and 78. Each of the comparator latch circuits has a voltage reference input from corresponding slider resistors 80 and 82, each connected between voltage source V and ground providing a voltage reference for comparison with their respective inputs. The comparator and latch circuit 76 has its input voltage from slider 80 adjusted to a specified voltage level whereby the comparator circuit is activated when the output signal ATXD from the selector 64 achieves a high value in excess of the specified voltage from slider 80. In a similar fashion, the slider 82 is adjusted to cause the comparator latch 78 to be activated when the ATXD signal achieves a low value in excess of the specified voltage setting of slider 82. Typically in the operation of the trip circuit of the analog backup means, when two or more of the sensors providing the AOTA through AOTC signals to the mid-value selector 64 are shorted, the signal ATXD will go to a low or negative value, activating the comparator latch 78. In a similar fashion, if two or more of the sensor input signals show an open condition, the output signal ATXD will go to a high voltage activating the comparator latch circuit 76. Each of the comparator outputs are tied back through their corresponding output conductors 84 and 86 to their latch circuits to cause each of the comparators to set to a latched state when activated. Whenever either one of the comparator latch circuits is activated, that circuit's output signal is passed through an OR gate 88 generating the TRIP signal on conductor 60 to activate the fuel control valve 62 (FIG. 1) shutting off fuel to the turbine. Further, the mid-value signal ATXD can exceed the threshold setting established by slider 80 should the turbine temperature become excessive. This will also cause a generation of the TRIP signal.

Whenever the turbine is shut down it will remain down until restarted through operator intervention. In order to reactivate the supply of fuel to the turbine, an operator must depress a reset switch 90 (FIG. 2) applying a suitable potential, such as a ground signal, to each of the latch circuits 76 and 78. This ground signal resets the activated comparator, thus deactivating the TRIP signal which opens the fuel control valve to allow fuel to flow to the turbine. Obviously, the supplying of fuel to the turbine is integrated with overall turbine start-up not a part of this invention.

Prior to proceeding with an overall operational description of the invention, it is considered advantageous to first reference FIG. 3 which illustrates an exemplary memory map for the storage of programs and data as stored in the memory of the programmable controller 42. The exemplary memory map is segmented into eight portions; (1) input data, (2) output data, (3) constants and masks, (4) master status program, (5) scratch, (6) temperature control program, (7) other control programs, and (8) sequencing program. The master status program may be considered as the executive program in the present embodiment in that it controls the reading of all information into the controller and the transfer of control information from the controller to the turbine. The master program is similar to a program described in the aforementioned U.S. Pat. No. 3,969,722 and identified therein as "Initialization and Standard Status Program" (ISSP).

Under control of the master status program, the temperature sensor input signals ATCX1-ATCX12 and AOTA-AOTC in FIG. 1 are read into the input data portion of the memory of FIG. 3 as temperature sensor conditions and temperature values. Also, the ATXD, ATREF annd L26TC signals are read into memory by the master status program. All of these input signals are stored in digital form in the input data portion of the memory subsequent to the performance of an analog to digital conversion thereon.

The output data portion of the memory of FIG. 3 contains calculated data in the form of a trim or fuel control signal for controlling the turbine which results from the execution of the temperature control program comprised of three subroutines TCC, TCA and PPR. As shown in FIG. 3, the temperature control program is utilized to calculate the temperature of the turbine and the value of the trim signal. The values calculated by the temperature control program are then stored in the output data portion of the memory for output through a digital to analog converter to the turbine.

The constants and masks portion of the memory has been included merely for completeness to show that conventionally the memory stores this type of data for use by the programs. For a similar reason, the scratch portion or working storage is shown to illustrate that the programs utilize a portion of memory into which data is written and read from during execution of the programs.

The other control programs portion of the memory in FIG. 3 is shown merely to indicate that other programs may reside in the memory; for example, programs to control the speed/load and the start-up circuits 38 and 40. The final portion of the memory, the sequencing program, is included for completeness to illustrate a program for simulating relay logic, etc. in electrical ladder diagram form. A program of this type is described in the aforementioned patent application and identified therein as an Application Program.

A detailed description of the master status and sequencing programs is not included in the present embodiment. A detailed description of programs of these types may be found in the aforementioned U.S. Pat. No. 3,969,722. A description of an analog to digital conversion program for converting the sensor inputs to digital values is not included since analog to digital conversion programs and hardware are well known in the art and such inclusion would add nothing to an overall understanding of the invention.

Figure 4:
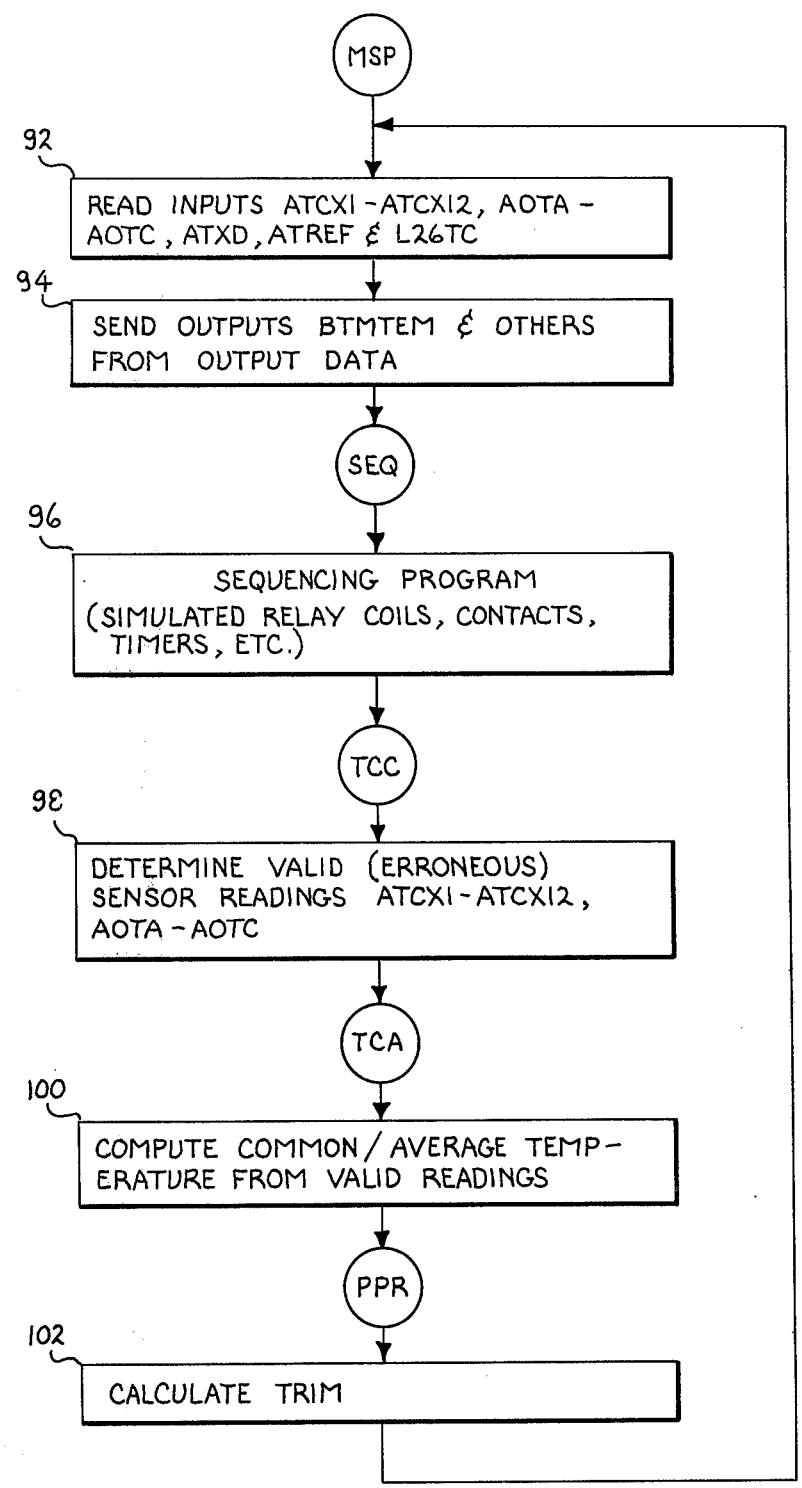
FIGS. 4 through 8 are functional flow charts of an exemplary program for carrying out one embodiment of the present invention.

Reference is now made to FIG. 4 which is a high level flow chart showing the overall program of the present invention for controlling the gas turbine 10. The program is comprised of a master status program (MSP), a sequencing program (SEQ) and a temperature control program which includes a thermocouple calculation (TCC) subroutine, a temperature calculation (TCA) subroutine and a temperature trim (PPR) subroutine. The programs are shown as being sequentially executed in a loop such that, for each sweep cycle through the loop, the program returns to the MSP from the PPR.

Still referring to FIG. 4, when the control system of the present invention is first started up, the controller 42 effects an entry into the master status program (MSP) into an action block 92 whereby that program reads the input signals ATCX1-ATCX12, AOTA-AOTC, ATXD, ATREF and L26TC into the input data portion of the memory. After the input data is stored, the MSP enters block 94 and sends output signals BTMTEM and others, not shown, to the turbine from the output data portion of the memory. Obviously, on the first sweep cycle through the program there will be no data in the output data portion of memory. However, after the first or subsequent sweep(s) through the program, data will exist in the output data portion of the memory.

The program now proceeds to the sequencing program (SEQ), if implemented into the system, whereby the SEQ is executed to simulate a relay or logic controller by simulating relay coils, contacts, timers, etc. to develop output control signals for the turbine to actuate various indicator lights, solenoids, solenoid drivers, etc. not shown. The results of information derived from the execution of the SEQ program are stored in the output data portion of the memory for subsequent transfer to the turbine during block 94 of the MSP.

After execution of the SEQ program the temperature control program is entered at TCC, the thermocouple calculations subroutine of block 98. The TCC subroutine has one primary function and that is to determine the validity or reliability of the turbine temperature sensors by examining sensor words corresponding to the sensor temperature readings ATCX1-ATCX12 and AOTA-AOTC in the input data portion of the memory (FIG. 3). In the preferred embodiment, this determination is made by the TCC program examining a specified bit in each of the words corresponding to the sensor readings. This bit in each of the sensor words is referred to as a validity flag which is either set or reset during the analog to digital conversion of each of the sensor signals ATCX1-ATCX12 and AOTA-AOTC. It is well known in the art that overflow and underflow detection techniques are commonly used in analog-to-digital computation to determine whether the value of an analog signal is either above or below specified values. Another obvious way to determine the validity of sensor conditions would be to merely set arbitrary maximum values for the sensor words and to compare the actual value of each word with the predetermined values and set a flag of either of those predetermined values are exceeded.

The TCA subroutine is entered from TCC at an action block 100. The primary purpose of the TCA subroutine is to compute a common or average temperature from the number of valid readings previously calculated in the TCC subroutine. The TCA subroutine, upon its completion, effects an entry into the PPR subroutine shown by action block 102. The PPR subroutine, based on the results of the computed common or average temperature as established by the TCA subroutine, calculates the output trim signal BTMTEM.

Upon completion of the PPR subroutine, the program returns to the MSP and the above described sequences are repeated. As previously described, the BTMTEM signal is transferred to the turbine during the execution of block 94 of the MSP.

The overall operation of the TCC, TCA and PPR subroutines will now be described in connection with FIGS. 5 through 8 which illustrate in functional flow chart form the operational details of those subroutines.

Figure 5:
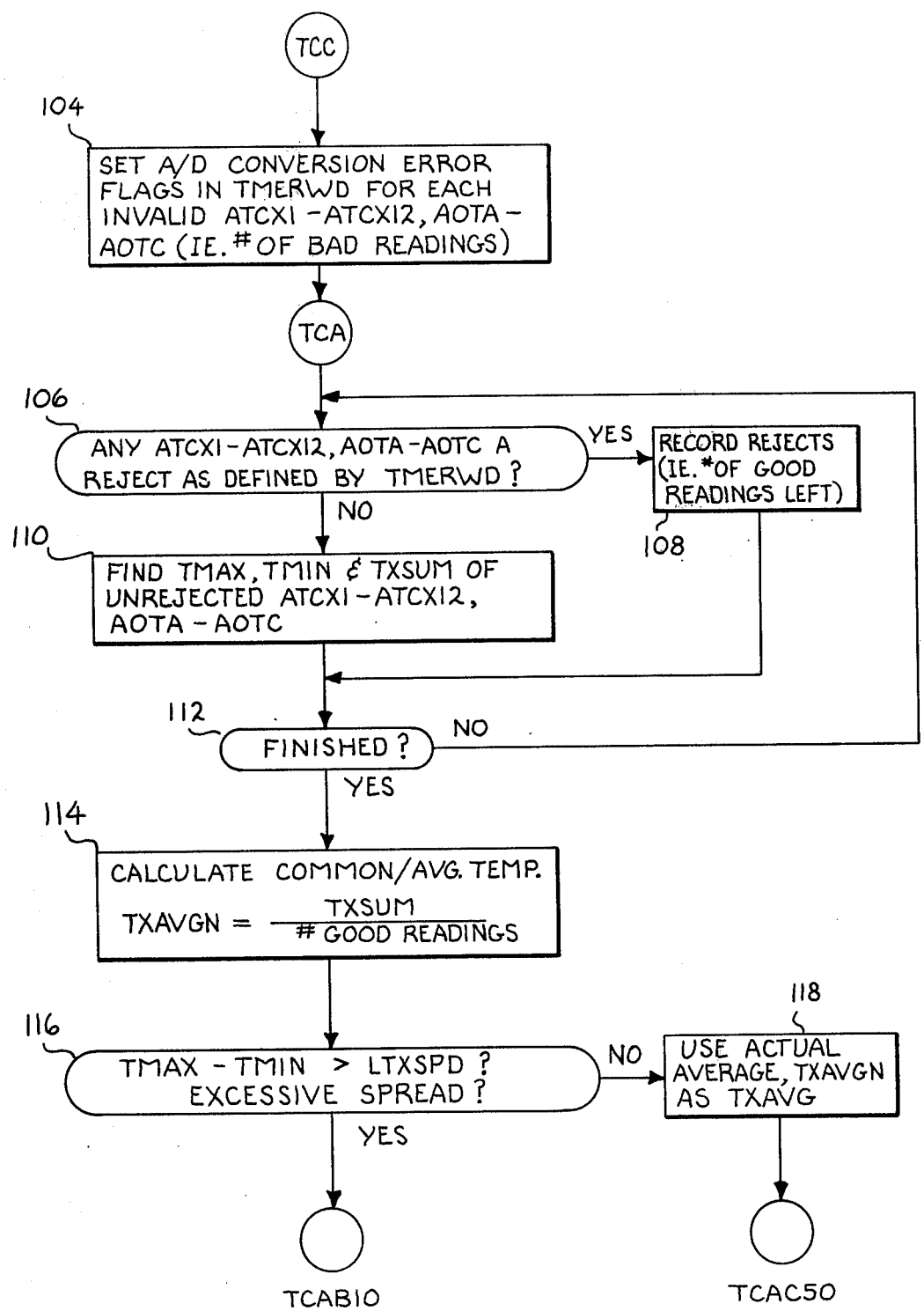

Referring now to FIG. 5, the TCC subroutine is entered directly from block 96 of the sequencing program of FIG. 4. The TCC subroutine is a relatively simple subroutine, as shown by action block 104, wherein the program effects the setting of analog-to-digital (A/D) conversion error flags in a word in scratch or working storage designated TMERWD for each invalid or erroneous sensor reading. As indicated in block 104, one flag corresponds to each of the ATCX1-ATCX12 and AOTA-AOTC signals or conditions. This is accomplished by the TCC subroutine examining the previously mentioned flag bit in each of the sensor words to set or reset a corresponding error flag bit in location TMERWD in scratch storage in accordance with the status of each sensor flag bit. An error flag is set if its corresponding sensor word flag bit was determined to be invalid, otherwise the error flag bit is reset or cleared. An error flag bit which is set indicates that that flag bit's corresponding sensor (derived from a corresponding sensor word) is either open or shorted indicating an invalid reading.

The TCA subroutine is now entered into a program loop comprised of blocks 106, 108, 110 and 112. In this loop, a test is performed to see how many of the sensor input readings, if any, are invalid as defined by the set error flags in the thermocouple error word TMERWD. Upon each entry into this loop, a test is performed in block 106 on one bit of the TMERWD corresponding to one of the sensor input readings or words ATCX-1-ATCX12, AOTA-AOTC to determine if the error flag bit in TMERWD is set or reset. Each time a flag bit in TMERWD is tested, if that bit is set, indicating that its corresponding sensor word is to be rejected, the program will exit block 106 through a YES branch entering into an action block 108. In block 108 a running record is kept of the number of rejects or invalid sensor readings. This recording of the rejected readings could be accomplished in a number of ways. In the present embodiment a program counter is employed. Prior to entry into block 108, this counter is loaded with a number representative to the number of sensor inputs (15 in the present embodiment). For each entry into block 108 the counter is decremented by one. Thus, the number in the counter always indicates the number of good readings remaining (i.e., the number of valid sensors existing in the system).

Upon each entry into block 106, if the flag bit being tested in the TMERWD is reset, indicating a valid reading, entry is made through the NO branch into block 110. Block 110 is an action block wherein the TCA subroutine finds the maximum (TMAX) temperature or value of the sensor readings, the minimum (TMIN) temperature or value of the sensor readings and the sum (TXSUM) temperature or value of the sensor readings. It will be noted that, since entry into block 110 is always via the NO branch of block 106, the values of TMAX, TMIN and TXSUM are always related to the unrejected or valid sensor readings. After each flag bit in location TMERWD has been tested, the program exits through a finished decision block 112 through a YES branch into a block 114.

In block 114 a common or average turbine temperature is calculated by storing a value representative of that temperature in a location TXAVGN, whereby the value of TXAVGN is representative of the value of TXSUM divided by the number (#) of good readings previously recorded in block 108. Upon entry into block 114, if all of the temperature sensor readings were found to be valid, the value placed in TXAVGN is the actual average turbine exhaust temperature. However, if one or more sensor readings were rejected, that is, found to be invalid, the value stored in TXAVGN is an average temperature of the valid temperature sensor readings.

Entry is now made into a decision block 116 wherein a test is performed to see if the difference between TMAX and TMIN is greater than a constant LTXSPD stored in the constants portion of the memory. This test checks to see if the spread between TMAX and TMIN is excessive. If the spread is not excessive, indicating that the temperature sensors are providing within limits readings, the program exits through a NO branch to point TCAC50 through a block 118. Block 118 is not an action block but has been included as a descriptor to indicate that the program is to use the actual average calculated temperature TXAVGN as the average temperature TXAVG. TXAVG is a location in scratch memory.

Figure 6:
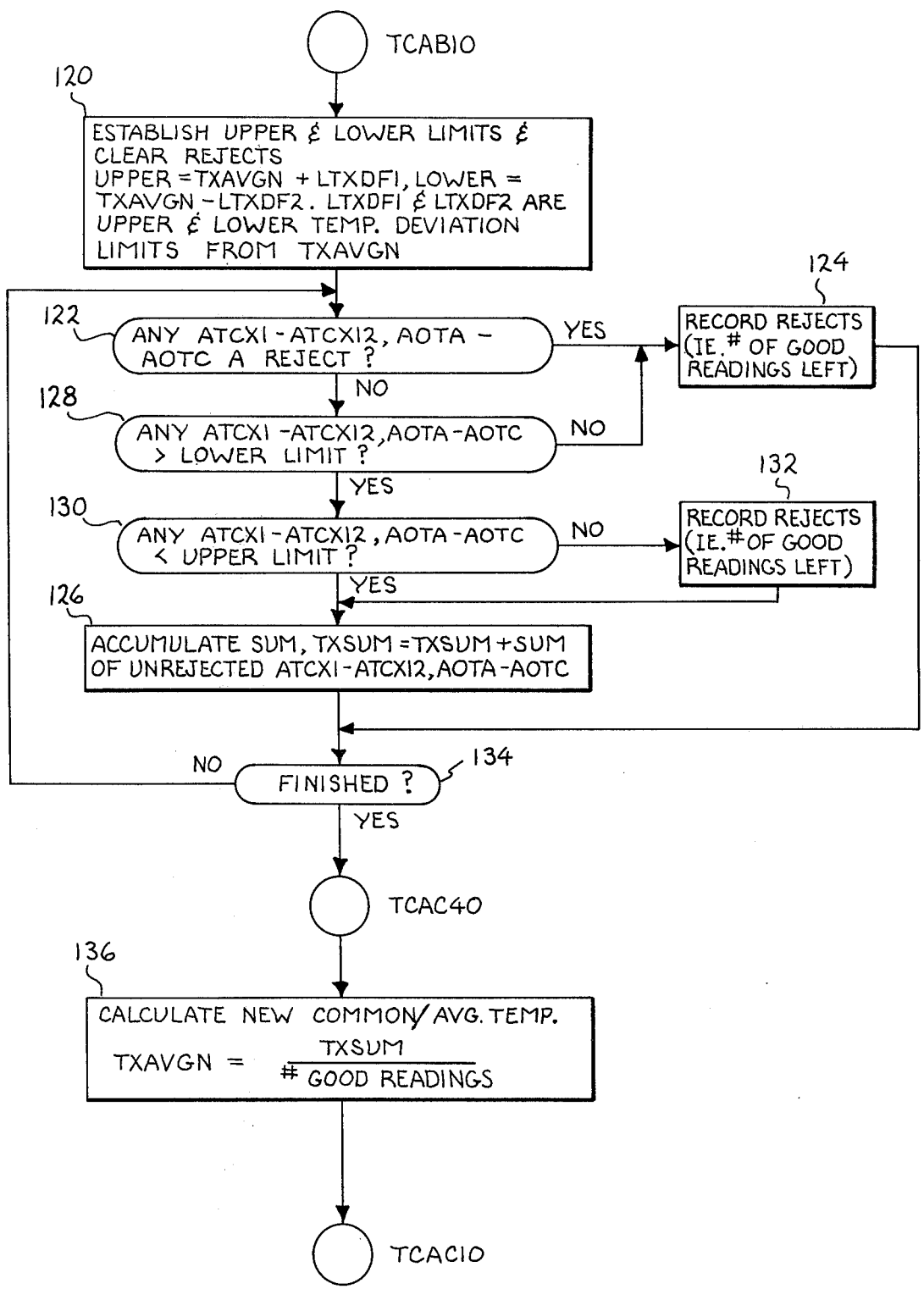
Figure 7:
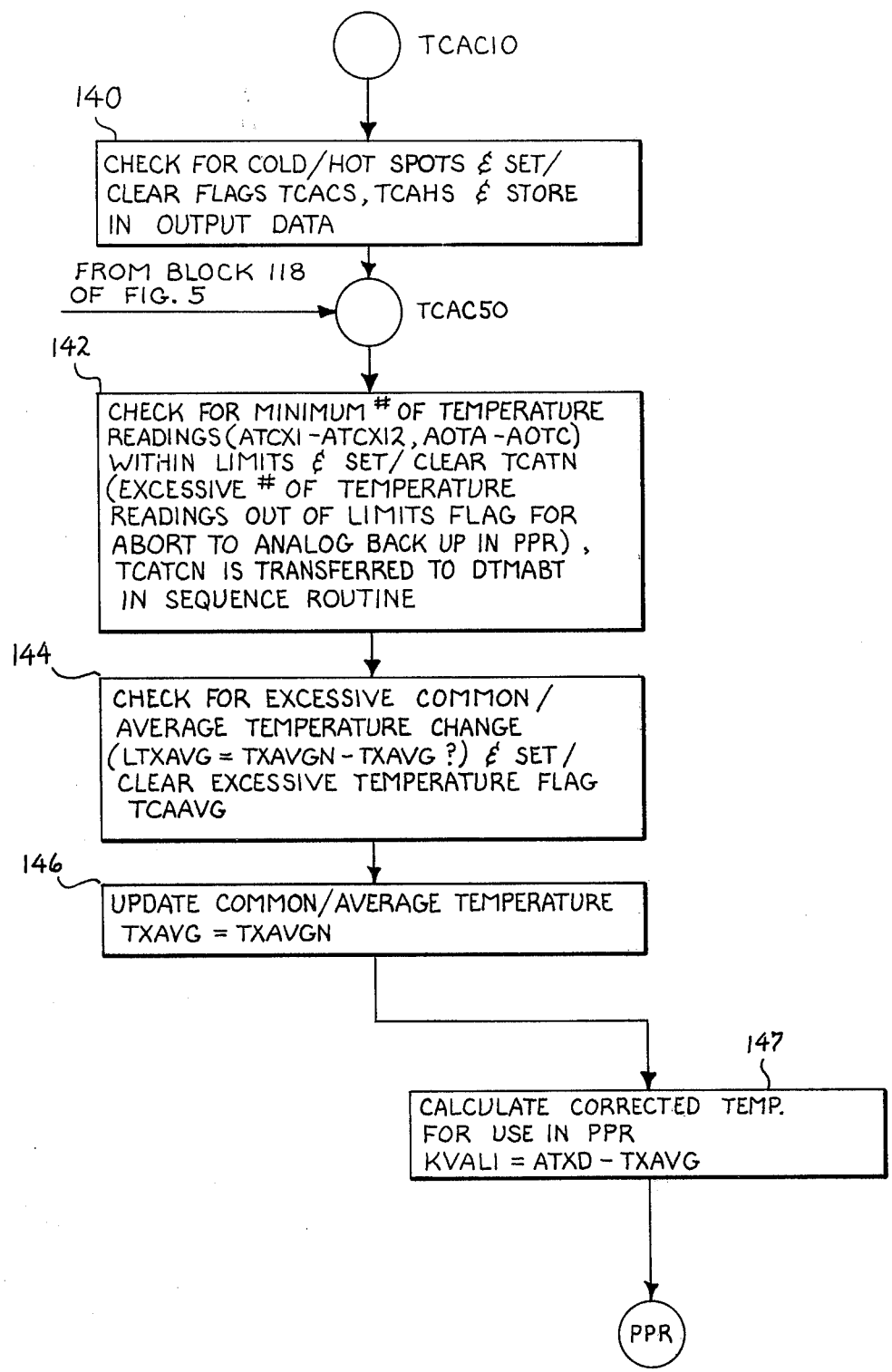
Figure 8:
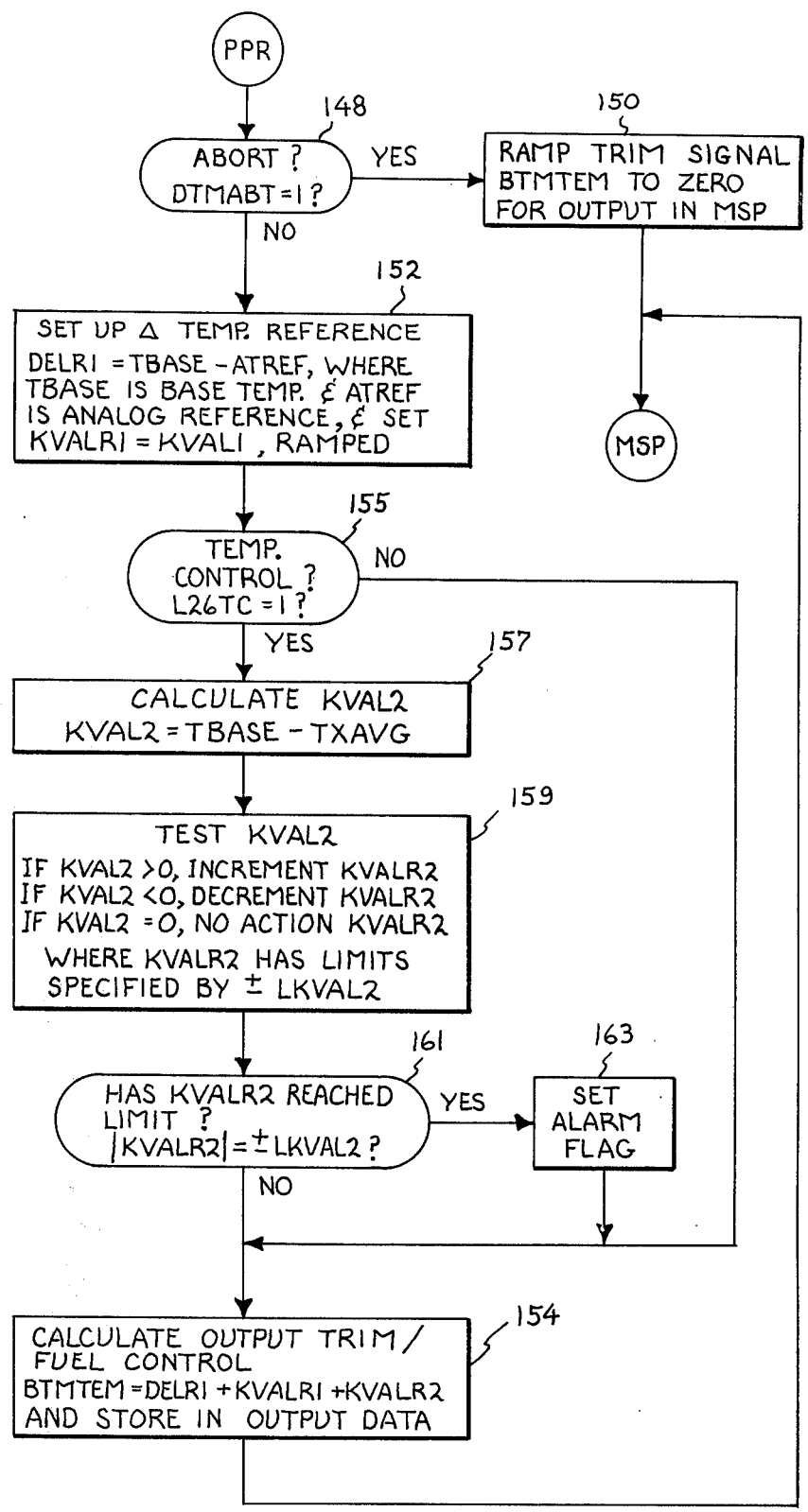

Still referring to FIG. 5, if the temperature spread is excessive, it indicates that a potential turbine combustion problem exists or possibly a temperature sensor is providing an erroneous reading and the program exits through the YES branch of block 116 to a point TCAB10 of FIG. 6. One potential problem which could exist is that something could possibly go wrong with a temperature sensor causing that sensor to generate either an artifically low or high reading not indicative of an invalid sensor condition. If this artificially low or high reading is factored into the overall common or average turbine exhaust temperature, it could cause the turbine to be artificially fired to generate more temperature than is required or to cut down fuel flow thus generating less temperature than is desired. (An overfiring of the turbine can cause serious damager to or degradation of its component parts whereas underfiring will cause a decrease in the performance of the turbine.) A second possible problem is that a clogged fuel nozzle in one of the combustion chambers could result in an indication of a cold spot or low temperature spot in the turbine exhaust. Should this condition occur, an out of limits reading will again cause the turbine to be overfired. (The reverse analogy could also be applied for hot spots in the turbine whereby a malfunctioning nozzle could be providing more fuel to the turbine than is required or specified). In view of the above problems, as detected by the temperature spread test in block 116, it is desirable to isolate definite or potential problems.

The flow chart of FIG. 6 shows the actions taken by the temperature control program to first of all identify the potential combustion problem areas in the turbine and to then recalculate the common or average temperature for use in controlling the turbine. Upon entry at point TCAB10 at block 120 the program initializes system parameters in preparation of testing for and isolating the combustion or sensor problems. This is accomplished by first establishing upper and lower temperature limits whereby a memory location UPPER (Upper Limit) is set equal to the value of TXAVGN, the calculated common or average temperature, plus the value specified by an upper temperature limit LTXDF1 in the constants portion of the memory. In a similar fashion, a lower temperature limit is established by setting a memory location LOWER equal to TXAVGN minus the value of a lower limit temperature constant LTXDF2. In block 120, LTXDF1 and LTXDF2 specify the maximum upper and lower temperature deviation limits of TXAVGN. Additionally, in preparation of recalculating the turbine temperature, the reject counter as previously established in block 108 of FIG. 5, is cleared.

Entry is now made into a decision block 122 wherein a test is again performed similar to that previously described for block 106 of FIG. 5 to see if any one of the sensor input readings is an invalid or reject reading. For each sensor reading determined invalid, a record rejects block 124 is entered, via the YES branch from block 122, wherein the rejected sensor readings are recorded as previously described in connection with block 108 of FIG. 5. Exit from block 124 is to a finished decision block 134. The program will continue to loop through the NO branch of block 134 back to block 122 until all of the sensor readings have been tested.

Reference is now made back to the NO branch of block 122 entering into a decision block 128. Block 128 is entered upon each pass into block 122 whenever the sensor reading being tested is not to be rejected. In block 128 a test is performed to see if the temperature specified by each of the temperature readings ATCX1-ATCX12 and AOTA-AOTC is greater than the lower limit previously established in block 120. Each reading that is not greater is recorded as a rejected reading in block 124. The rejection of a reading in block 128 is indicative of a combustion or temperature sensor problem. For each reading which is greater than the lower limit, a YES branch is taken into another decision block 130.

In a block 130 a similar test to block 128 is performed to see if any of the sensor readings are less than the upper limit as previously established in block 120. Any one of these readings which is out of limits will cause the program to take the NO branch and record that reading as a rejected sensor in block 132. Block 132 returns back to block 126. For each reading which is within limits, the program will take the YES branch entering into block 126. It will be noted that the record reject block entered from block 130 is shown as block 132; however, it represents the same counter as blocks 124 or 108. They are shown separately for simplicity and because they have different entry points to the subroutine.

In block 126 a new temperature sum is accumulated or calculated by setting location TXSUM equal to its present value plus the sum of the unrejected sensor readings (i.e., the number (#) of good readings left). Exit from block 126 is into the finished decision block 134 whereby a branch is taken through the NO exit back to block 122 until each of the sensor readings for inputs ATCX1-ATCX12 and AOTA-AOTC has been tested. The operation of this loop is somewhat similar to that previously described in connection with FIG. 5 for blocks 106, 108, 110 and 112. After all of the sensor readings in FIG. 6 have been tested, exit is made through the YES branch of block 134 to a point TCAC40 entering into a block 136.

In block 136, a new common or average temperature is calculated wherein location TXAVGN is now updated to the contents of the new or accumulated TXSUM divided by the number of new good readings established in blocks 124 and 132. The program now proceeds to a point TCA10 of FIG. 7 into a block 140. In block 140 the controller now tests for hot and cold spots in the turbine combustion chambers to identify potential combustion problems. This is accomplished by the program testing groups of temperature sensor readings corresponding to groups of adjacent sensors circumferentially disposed around the exhaust plenum. For example, the 15 sensors generating signals ATCX-1-ATCX12 and AOTA-AOTC can be segmented into five groups of three sensors each. The program then checks each group of three sensors to see if the sensors in each group are providing valid within temperature limits readings. If any group shows a cold spot within the exhaust plenum, a cold spot flag TCACS is set in the output data portion of memory. If any group designates a hot spot reading, a hot spot flag TCAHS is set in the output data portion of memory. Though not shown in the flow charts of the present invention, the TCACS and TCAHS flags could be used by the program to generate an output signal during the running of the master status program to sound an alarm to notify an operator that either a cold or hot spot resides in the turbine. On completion of block 140, a block 142 is entered through a point TCAC50. It will be recalled that point TCAC50 is also entered from block 118 of FIG. 5 as previously described. Upon entry into block 142 the common or average temperature TXAVGN will be the actual average temperature as previously calculated in FIG. 5, or it will be the newly calculated common or average temperature as just described in connection with FIG. 6. In block 142 it is now desirable to test or check for the minimum number of temperature readings (i.e., ATCX1-ATCX12 and AOTA-AOTC) which are within limits. This is accomplished by the program subtracting the contents of a constant in memory from the contents of the counter specifying the number of good readings. As previously described the counter was set in blocks 124, 132 or 108. An excessive number of temperature readings out of limits flag, TCATN, will be either set or cleared (reset) in accordance with the results of this subtraction. TCATCN is set if an overflow condition occurs indicating that too many temperature readings are invalid (for example, the number of good readings is less than 8). The TCATCN is an abort flag which is tested in the PPR subroutine to cause the program to abort from computer control to analog backup control. As shown in block 142, the contents of location TCATCN are transferred to a location DTMABT in the output data portion of the memory during the SEQ routine. Upon completion of block 142, action block 144 is entered.

In block 144 a test or check is made to see if there has been an excessive change in the common or average temperature since the last temperature calculation. This is accomplished by testing to see if the contents of a memory constant LTXAVG is equal to the newly calculated temperature, TXAVGN, minus the old calculated temperature, TXAVG. For example, if the contents of LTXAVG are equal to 25 degrees F. and if that is the maximum allowable temperature change between any two entries into the temperature control program, an excessive temperature flag TCAAVG is set. If the contents of LTXAVG is less than 25 degrees F., then the TCAAVG flag is reset or cleared.

Entry is now made into block 146 wherein the common or average temperature is updated by setting location TXAVG (old temperature average) to the newly calculated average TXAVGN. A block 147 is now entered wherein a correction value in a scratch memory location KVAL1 is set equal to the difference between ATXD (the mid-value signal) and TXAVG (the present average temperature). Entry is now made to a decision block 148 of the PPR subroutine of FIG. 8 where a test is made to determine if the system should abort from computer control to the temperature analog backup means 36. This test is performed by testing to see if the abort bit DTMABT is set equal to a binary 1 (see block 142 of FIG. 7). If it is a binary 1, the program takes a YES branch into a block 150 wherein the trim signal BTMTEM is decremented a predetermined amount whereby the BTMTEM signal will ramp down toward zero in a step fashion for each pass through the temperature control program. As previously described, the BTMTEM signal is transferred to the analog backup means during execution of the MSP. The PPR then returns control to the MSP for entry thereto from block 150. It will be recalled, as previously described in connection with FIG. 2, whenever the trim signal BTMTEM is at zero, that signal is no longer a controlling factor and thus the output of the amplifier 68 is representative of the algebraic sum of the mid-value signal ATXD and the analog reference ATREF. It is in this manner, when the computer output is aborted by the BTMTEM signal going to zero, that the analog backup means takes over control of the turbine to provide the temperature fuel control signal TFC on conductor 58 to the low value gate 34 to control fuel flow to the turbine. It is also significant to point out that most industrial control computers of the type contemplated by the present invention usually encompass test routines to check for the validity of computer operation (e.g., memory parity, analog input/output accuracy, etc.). Additionally, some type of "watch dog" timer is sometimes included. This timer is periodically interrogated by the program to insure that the computer is operating properly. The detection of any computer failure may also be used to cause the BTMTEM signal to be ramped to zero in a manner similar to that described in block 150.

Again referring to block 148, if the abort flag DTMABT is not set, the program will exit through the NO branch entering into an action block 152. In this block a delta temperature bias reference DELR1 is set up in memory to a value equal to the temperature base (TBASE) minus the value of the analog temperature reference (ATREF). TBASE is a turbine temperature set point normally operator specified. The DELR1 reference is used as one factor in developing the correct value for the BTMTEM signal. It has application because of the expected differences between the values of TBASE (e.g., 850° F.) and ATREF (e.g., 800° F.) and the difference value (DELR1) between TBASE and ATREF serve as the desired temperature reference or bias for summation with temperature variables to be described to develop the trim signal BTMTEM.

It will be recalled that ATREF always has a value which is safe for all turbine temperature operating conditions. Additionally, in block 152, a memory location KVALR1 is set equal to the correction value of KVAL1 previously established in block 147 of FIG. 7 whereby KVAL1 is a ramped value which causes the BTMTEM signal to change as an integrated signal to thereby precisely control the operation of the turbine so that radical changes in fuel flow do not occur.

The program now proceeds to a block 155 wherein a test is performed to see if the system is on temperature control (TEMP CONTROL?) by testing to see if a flag bit L26TC in the scratch portion of memory is a binary 1. It will be recalled that the signal L26TC on conductor 55 of FIGS. 1 and 2 was read into the controller by the MSP. Referring to the threshold detector 59 of FIG. 2, the L26TC will go to a binary 1 when the value of the TFC signal reaches a predetermined magnitude indicating that the turbine has cycled through a suitable warm-up period during system start-up. When the L26TC signal goes from a binary 0 to a binary 1, that binary 1 is stored in location L26TC and indicates to the program that the turbine is at the proper temperature to now go on complete temperature control.

If the system is not on temperature control (L26TC=1), the program enters into a block 154 via a NO branch of block 155. Assume, however, that the system is on temperature control, and thus the program exits block 155 through a YES branch into a block 157. In block 157 the difference between the base temperature (TBASE) and the highly accurate calculated average temperature (TXAVG) is calculated. A value proportional to this difference is stored in a location KVAL2 in the scratch or working storage portion of memory.

A block 159 is now entered and the value of KVAL2 is tested to see if it is less than or equal to a predetermined constant shown as zero (0). If there is a difference between KVAL2 and the constant zero, a location KVALR2 in scratch memory is appropriately changed by incrementing or decrementing its value. As will subsequently be described, KVALR2 is a second correction factor used in the equation for developing the temperature trim signal to control fuel flow to the turbine. The purpose of changing KVALR2 is to narrow the gap or difference between the TBASE and the TXAVG. KVALR2 is incremented or decremented by a vernier constant such as one or some other value. In this manner KVALR2 has a very slow ramp or rate of change so that the difference between the TBASE and the TXAVG is gradually tuned out to thus compensate for the system offset and drift errors introduced by the aforementioned electronic elements. With the difference tuned out, the total system error is reduced to that of only the temperature sensing portion of the system since there will be no discrepancy between the base temperature and the calculated average temperature.

The value of KVALR2 also has maximum positive and negative limits as specified by two locations in the constants portion of memory shown in block 159 as ±LKVAL2.

Upon completion of the test in block 159, a decision block 161 is entered wherein a test is performed to see if the absolute value of KVALR2 has exceeded either the positive or negative limits specified by locations ±LKVAL2. If KVALR2 has exceeded either of the limits, the program enters a block 163 through a YES branch. In block 163 an alarm flag in the output data portion of memory is set. This flag may be used to turn on an alarm when the master status program (MSP) sends the output data from the output data portion of the memory. When used to turn on an alarm, it can signal an operator that some malfunction exists causing an error so large that it cannot be calibrated out or compensated for by the adjustment of KVALR2. Such errors could exist in the controller output digital to analog converter, various control amplifiers, summing resistor tolerances, etc.

Once the alarm flag is set, the program enters into a block 154, the purpose of which will subsequently be described. Let it now be assumed that KVALR2 is within the limits of ±LKVAL2. As a result a NO branch from block 161 is taken into the action block 154.

In block 154, the value of the temperature trim signal BTMTEM is calculated by storing in a location BTMTEM in the output data portion of the memory the algebraic sum of the contents of locations DELR1, KVALR1 and KVALR2. The program will now proceed back to the master status program MSP wherein BTMTEM is transferred to the analog backup means.

For completeness of disclosure a copy of an assembly program listing of the temperature control program for operation in the aforementioned "Directo-Matic" logic controller is annexed hereto as "Appendix A" forming a part of this specification. It is recognized that system software (i.e., programs) are sometimes characterized with minor faults known as bugs which sometimes take long periods of time to detect and/or diagnose. Ordinarily the correction of such faults is within the skill and control of system programmers. Accordingly, the appended listing may be expected to contain some faults of this kind but all such faults which have been detected required only a programmer's skill for correction.

Figure 9:
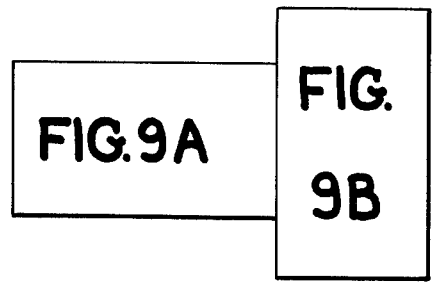
FIG. 9 is a legendary drawing showing the interrelationships of FIGS. 9a and 9b.
Figure 9A:
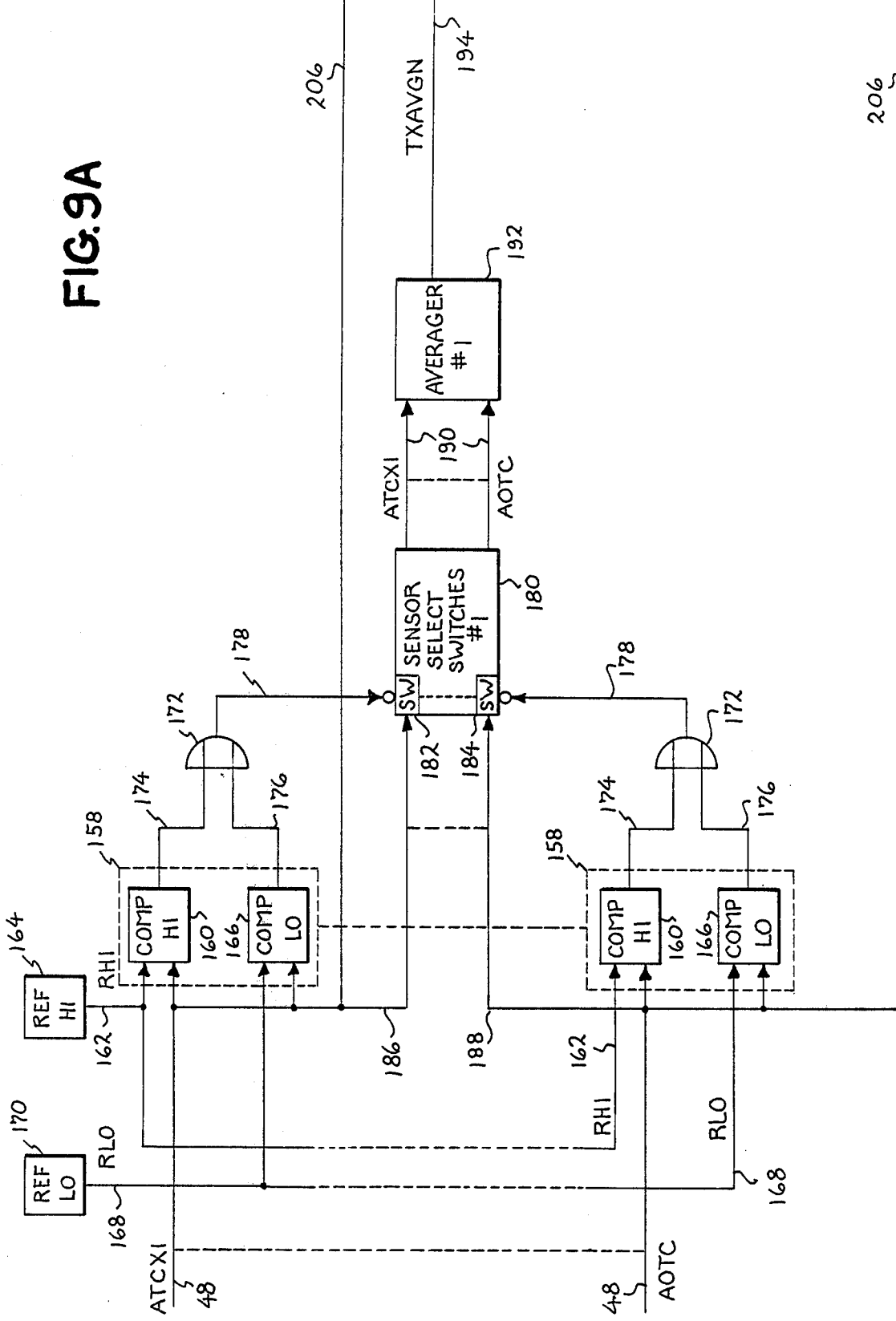
FIGS. 9a and 9b collectively comprise a block diagram schematic of an analog controller as another embodiment of the invention.
Figure 9B:
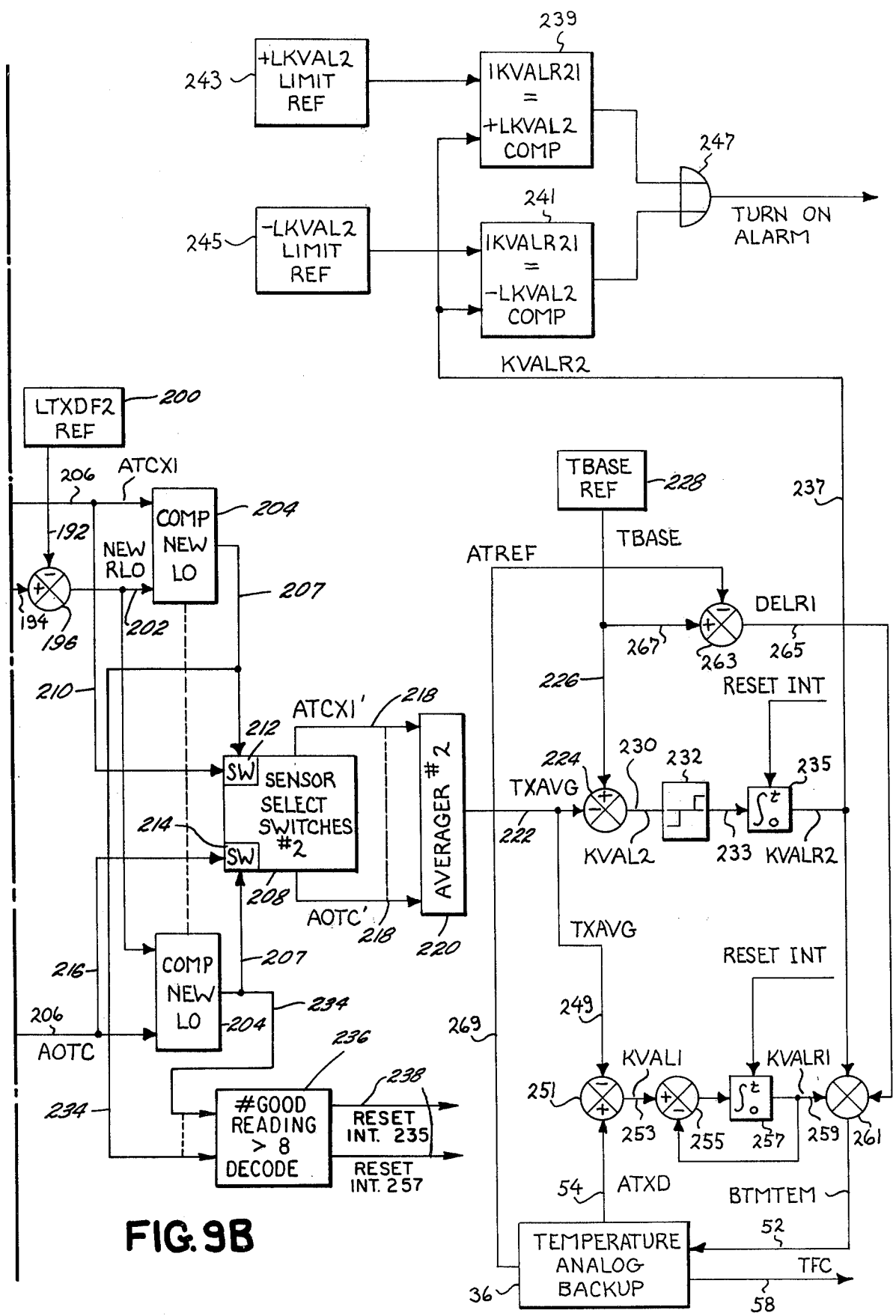

Reference is now made to FIGS. 9, 9a and 9b. FIG. 9 is a legendary drawing showing the interrelationship between FIGS. 9a and 9b. FIGS. 9a and 9b illustrate, as a second embodiment of the invention, an analog controller for monitoring the sensor signals ATCX1 through AOTC on conductors 48 from the turbine sensors 26. In this embodiment the analog controller of FIGS. 9a and 9b replace the programmable controller 42 of FIG. 1. In this embodiment the temperature analog backup means 36 is utilized in controlling the operation of fuel flow to the turbine. This is illustrated in FIG. 9b where the TFC signal from the analog means 36 is applied directly to the low value gate 34 as previously described in connection with FIG. 1.

Reference is now made to FIG. 9a. As shown there, each of the ATCX1 through AOTC sensor signals on conductors 48 is applied to a corresponding comparator 158 shown within dashed lines. While only two pairs or groups of comparators 158 are shown, it is to be understood that there is one comparator for each of the sensor signals. Each of two comparator circuits in the comparators 158 receive a reference signal from a corresponding reference source. For example, a comparator circuit 160, designated COMP HI, in each of the comparators 158 receives a high reference signal RHI on a conductor 162 from a high reference source 164 REF HI. In a similar fashion, a low comparator circuit 166, COMP LO, in each of the comparators 158 receives a low reference value signal RLO on a conductor 168 from a low reference signal source 170 designated REF LO.

In the embodiment of FIGS. 9a and 9b, the validity of the sensors 26 (FIG. 1) is accomplished by the comparators 158 comparing the values of the ATCX1 through AOTC signals with the RLO and RHI signals. In normal operation, the values of the ATCX1 through AOTC signals are within the limits prescribed by the RLO and RHI signals, and the output of each of the comparator circuits 160 and 166 is a binary 0. The outputs from each pair of comparators is applied to a corresponding OR gate 172 via respective conductors 174 and 176. So long as the signals on conductors 174 and 176 to an OR gate 172 are both binary 0's, the output of that OR gate is a binary 0 on a corresponding conductor 178. The output of each of the OR gates 172 is connected to a corresponding one of a plurality of switches in a sensor select switches 1 circuit 180. Two of these switches 182 and 184 are shown. Additionally, each of the switches receives the sensor signal corresponding to each switch's comparator. For example, switch 182 receives the ATCX1 sensor signal feeding that switch's corresponding comparator and switch 184 receives the AOTC signal, etc. Each of the plurality of switches (e.g., 182 and 184) has an inverter input terminal and each is enabled to pass its sensor input signal to an averager 1 circuit 192 via a plurality of corresponding conductors when that switch's input on conductor 178 is a binary 0. When the signal on conductor 178 is a binary 1, the switch receiving that signal is disabled to inhibit passage of its input sensor signal.

As an example of how the comparators 158 and select switches 180 operate, let it be assumed that the ATCX1 signal exceeds either the low or high limit as specified by the RLO and RHI signals. In this situation, the appropriate one of the comparators 160 and 166 will selectively determine the validity of the sensor generating the ATCX1 signal by generating a binary 1 signal on one of the conductors 174 or 176 as determined by the activated comparator. When this occurs, the binary 1 signal enables OR gate 172 to apply a binary 1 disable signal to switch 182, thus preventing the ATCX1 signal from being passed through the select switches 180 to the averager 192.

The averager 192 generates an output signal TXAVGN on a conductor 194. The value of the TXAVGN signal is always proportional to the average of the values of the ATXC1 through AOTC signals passed by the select switches 180. The TXAVGN signal is applied to the positive (+) terminal of an algebraic summer 196. The summer 196 also receives an input signal on a conductor 192 from an LTXDF2 reference source 200. It will be recalled, from the description of the first embodiment, that the LTXDF2 reference source specifies a lower limit temperature deviation of the average of the turbine temperature as specified by the TXAVGN signal.

The output of the summer 196 provides a low turbine temperature reference (NEW RLO) having the value TXAVGNLTXDF2 on a conductor 202. The NEW RLO signal is applied to each one of a plurality of comparators 204 designated COMP NEW LO. It will be noted that there is a corresponding comparator 204 associated with each of the ATCX1 to AOTC sensor signals with only two being shown. The purpose of each of the comparators 204 is to compare the NEW RLO value with each comparator's corresponding sensor input signal to determine if a potential combustion problem or abnormal sensor reading exists in the turbine in the area of the sensor generating the corresponding sensor signal. In normal operation when each of the ATCX1 through AOTC signals are within the temperature deviation limits as specified by the NEW RLO signal, the output of each of the comparators 204 will be a binary 0. The output of each of the comparators 204 is applied via a corresponding one of a plurality of conductors 207 to a sensor select switches 2 circuit 208. The select switches 208 are similar to the select switches 180 and operate in the same manner as previously described for the latter switches. It will be noted that a switch exists in the select switches 208 for each of the sensor signals ATCX1 through AOTC. For example, the ATCX1 signal is applied via a conductor 210 to the top switch 212 of select switches 208 and the AOTC signal is applied to a switch 214, the bottom switch, via a conductor 216. So long as the outputs of each of the comparators 204 are binary 0's, their corresponding switches 212 through 214 will be enabled to pass the ATCX1 through AOTC signals on a plurality of conductors 218 as signals ATCX1' through AOTC' to a second averager 2 circuit 220.

The averager 220 is the same type as the previously described averager 192. The averager 220 generates an output signal TXAVG on a conductor 222. The TXAVG signal has a value proportional to the average calculated turbine temperature.

Reference is now made back to the comparator circuits 204 of FIG. 9b. If any one of the ATCX1 through AOTC signals is greater than the low reference limit signal NEW RLO, the output of the comparator(s) receiving the out of limits sensor signal will go to a binary 1. This binary 1 signal, via conductors 207, will disable the switch receiving the signal to prevent the passage of its sensor input signal to the select switches 208. Thus, it can be seen that the output of the averager 220 always generates a TXAVG signal having a value representative of the average of the signals passed by the select switches 208.

The TXAVG signal on conductor 222 is applied to a negative (−) input terminal of a second algebraic summer 224. Summer 224 also receives a temperature base reference signal TBASE on a conductor 226 from a TBASE REF source 228. The output of the summer 224 is the previously described KVAL2 signal on a conductor 230 having a value of TBASE minus TXAVG. The KVAL2 signal is applied to a conventional deadband threshold detector amplifier circuit 232 which generates either a zero, positive, or negative output signal in accordance with the value of the KVAL2 signal. If the KVAL2 signal is zero, the output of detector 232 is zero. However, if the KVAL2 signal is above zero, the output of detector 232 will go to a positive value. The reverse is true if the KVAL2 signal goes below zero. Then, the output of detector 232 goes negative.

The output of detector 232 is applied via a conductor 233 to a conventional integrator amplifier 235 which integrates the input signal at a vernier constant slow rate over a period of time to generate the aforedescribed KVALR2 correction signal on a conductor 237. The KVALR2 signal is applied to two conventional limit comparator circuits 239 and 241 and compared with positive and negative reference limit signals from +LKVAL2 and −LKVAL2 limit reference sources 243 and 245, respectively. The output of each of the comparators 239 and 241 is applied to respective inputs of an OR gate 247. When the KVALR2 signal is within the limits of the ±LKVAL2 reference signals, the output of the comparators are both binary 0 keeping OR gate 247 disabled. If a system offset or drift error occurs which is outside of the limits prescribed by the ±LKVAL2 reference signals, the appropriate one of the comparators 239 or 241 will detect the out of limits condition and apply a binary 1 signal to OR gate 247 enabling the latter to generate a binary 1 signal to turn on an alarm not shown. As previously described, the alarm can be used to indicate to an operator an out of limits condition representative of the possible failure of one of the aforementioned elements.

Still referring to FIG. 9b, the calculated average temperature signal TXAVG is applied on a conductor 249 to a negative (−) input terminal of a summer 251. Summer 251 also receives the ATXD mid-value signal at a positive (+) input terminal from the analog backup means 36 via conductor 54. The TXAVG and ATXD signals are algebraically combined in summer 251 to generate the previously described correction signal KVAL1 on a conductor 253. The KVAL1 signal is proportional to the difference between the calculated average temperature (TXAVG) and the mid-value signal (ATXD). It will be recalled that the ATXD signal is derived from the AOTA-AOTC signals and that the ATXD signal has a value substantially equal to the average of the values of the AOTA-AOTC signals. Thus, the ATXD signal is substantially proportional to the average turbine temperature derived from the three sensors generating the AOTA-AOTC signals.

The purpose of combining the ATXD and TXAVG signals is to compensate or correct for the expected differences which exist between the highly accurate TXAVG signal (calculated from a possible 15 sensors) and the less accurate ATXD signal derived from three sensors to generate the correction value signal KVAL1.

The KVAL1 signal conductor 253 is applied to a positive (+) terminal of another summer 255 having an output connected to the input of a conventional integrator amplifier circuit 257. The output of amplifier 257 is the aforementioned KVALR1 signal on a conductor 259 applied to a negative (−) input terminal of the summer 255 and an output summer 261.

The KVALR1 signal is fed back to summer 255 and combined with the KVAL1 signal to provide damping so that radical changes in the KVAL1 signal are not reflected in the KVALR1 signal. It is significant to note that the KVALR1 signal is a much faster changing signal than the KVALR2 signal and serves as the primary fuel control parameter for the development of the BTMTEM signal on conductor 52.

The KVALR1 and KVALR2 signals are algebraically combined in summer 261. Summer 261 also receives the aforementioned delta temperature bias reference signal DELR1 from a summer 263 via a conductor 265. The DELR1 signal has a value proportional to the difference between the TBASE on a conductor 267 and the ATREF on a conductor 269 from the analog means 36. The output of summer 261 is the BTMTEM signal on conductor 52 having a value proportional to the algebraic sum of the DELR1, KVALR1 and KVALR2 signals. By referring to FIG. 2, it can be seen how the BTMTEM signal is combined with the ATXD and ATREF signals in the analog means to generate the temperature fuel control signal TFC to the low value gate 34 of FIG. 1.

Reference is now made back to the output of each of the comparators 204 of FIG. 9b. It will be noted that each of those comparators is connected via a corresponding conductor 234 to the input of a # good readings <8 decode circuit 236. The circuit 236 is a conventional decode network which monitors the binary signals on conductors 234 (15 in the preferred embodiments) to determine if the number of good readings as determined by the output of the comparators 204 is less than 8. So long as 8 or more of the signals on conductors 234 are binary 0's, the output of the decode network 236 is a binary 0 on a conductor 238. The output signal on conductor 238 from decode 236 is designated as a RESET INT signal to reset the two integrators 235 and 257 when that signal goes to a binary 1. If less than 8 of the sensors 26 are generating out of limits or invalid readings, the decode 236 generates a binary 1 output signal to reset the integrators 235 and 257. This resetting causes the output signal BTMTEM of the summer 261 to be ramped to zero, thus allowing the analog backup means 36 to operate the turbine at reduced safe temperature in a fail safe mode as previously described.

Figure 10:
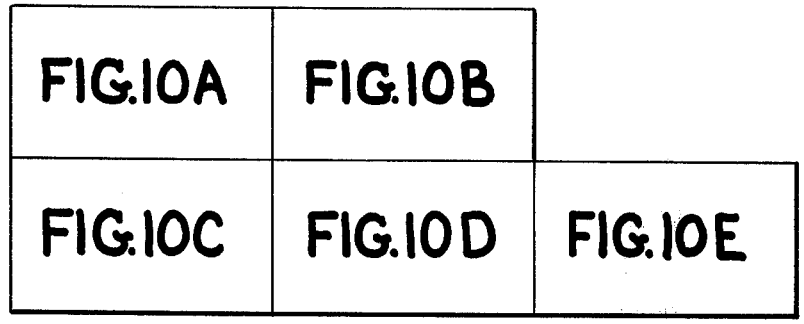
FIG. 10 is a legendary drawing showing the interrelationships between FIGS. 10a through 10e.
Figure 11:
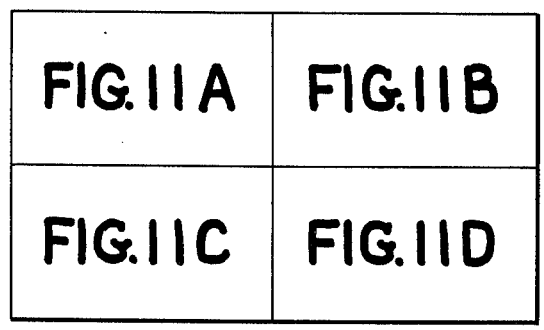
FIG. 11 is a legendary drawing showing the interrelationships between FIGS. 11a through 11d.

Reference is now made to FIGS. 10 and 11 which are legendary drawings showing the interrelationships of FIGS. 10a through 10e and 11a through 11d, respectively. FIGS. 10a through 10e comprise a third embodiment of the invention showing in detailed block diagram form a digital logic controller for calculating the value of the temperature fuel control signal TFC. FIGS. 11a through 11d collectively illustrate a timing diagram of the relationships between the various signals generated by the digital controller of FIGS. 10a-10e. In the ensuing description of the controller, the timing diagram of FIGS. 11a-11d will be referenced.

Figure 10A:
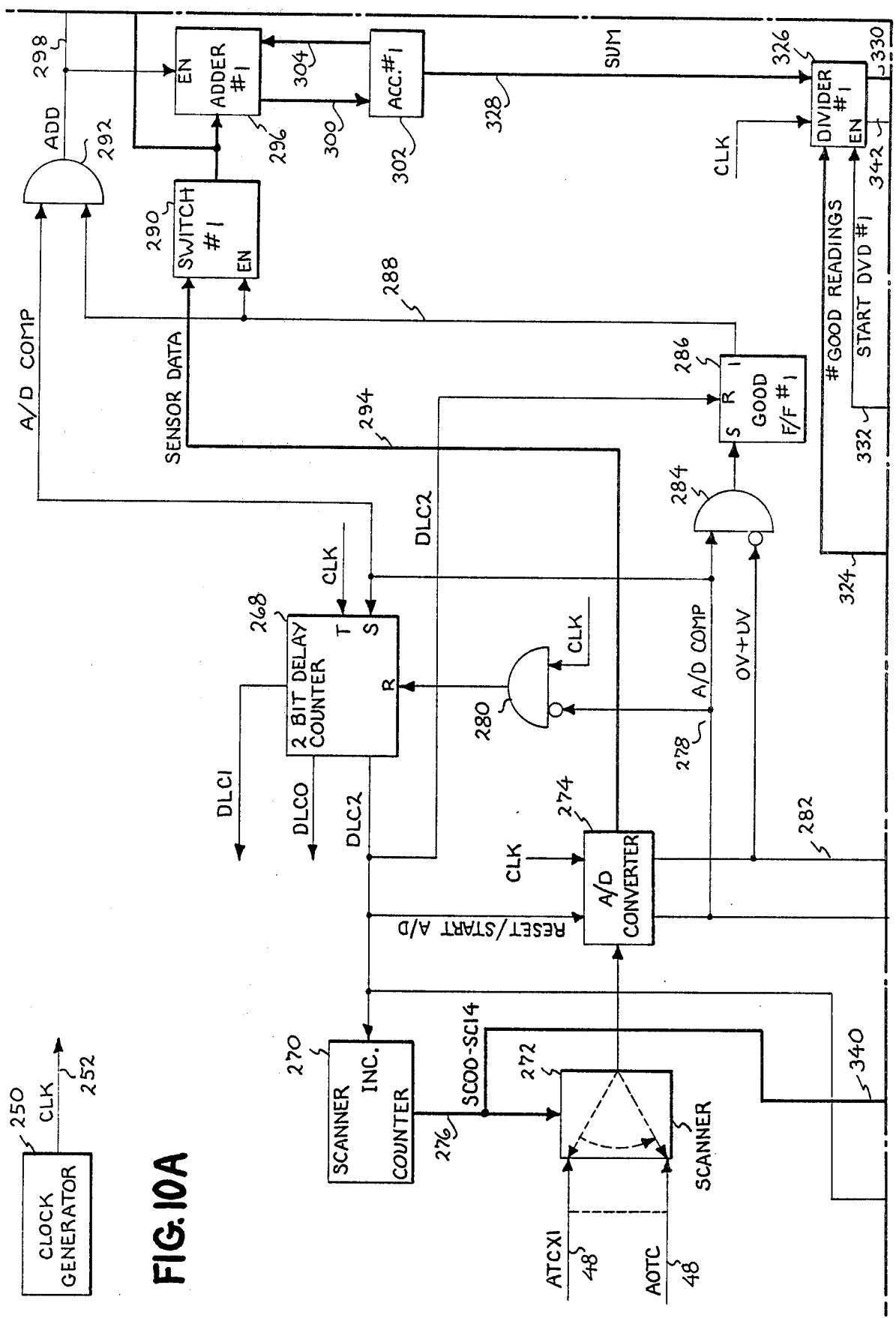
FIGS. 10a through 10e collectively comprise a block diagram schematic of a digital controller as a further embodiment of the invention.

Reference is first made to FIG. 10a which shows a clock generator 250 providing a sequentially occurring clock signal CLK on a conductor 252 for application to various logic circuits and elements in the controller. The CLK signal is shown at the top of FIGS. 11a and 11b. In FIG. 10c there is shown a manual reset (MAN RESET) switch 254 having one terminal connected to a voltage source V. When the MAN RESET switch is placed in the closed position, a system reset signal is generated on a conductor 256. This latter signal is applied to the various registers, counters, flip-flops and elements in the controller to initialize or reset the system at start-up. The MAN RESET switch also applies the system reset signal as one input to an OR gate 258, enabling that OR gate to apply a binary 1 trigger pulse to a delay one-shot multivibrator 260. The delay one-shot generates a present output pulse on a conductor 262 to preset two counters designated # Good Reading Counters 1 and 2 circuits 264 and 266 in FIGS. 10c and 10b, respectively. Counters 264 and 266 are the equivalent to those counters previously described in connection with FIGS. 5 and 6 designated by blocks 108, 124 and 132. At the time of system initialization, each of these counters is preset to a count equal to the number of sensor input signals ATCX1 through AOTC (15 in the present embodiment).

Prior to proceeding with an operational description of the controller of FIGS. 10a-10e, it is considered first advantageous to briefly describe the operation of a two-bit delay counter 268, a scanner counter 270, a scanner 272 and an analog-to-digital converter 274. Each of these elements is illustrated in FIG. 10a. The two-bit delay counter 268 is a conventional binary counter having set (S), reset (R) and trigger (T) input terminals for generating three sequentially delayed output signals DLC0, DLC1 and DLC2. The timing relationships of these signals are shown in FIGS. 11a and 11b. The DLC2 signal from counter 268 is applied to the scanner counter 270 to an INC input terminal to cause that counter to be incremented by 1 each time the analog-to-digital converter 274 starts a conversion of one of the sensor input signals ATCX1 through AOTC on conductors 48. As can be seen, the scanner counter 270 provides a plurality of scanner count output signals SC00-SC14 on conductors 276 to the conventional scanner 272 to cause that element to sequentially scan or select the sensor input signals in accordance with each count in the scanner counter 270.

At the start of each analog-to-digital conversion, the DLC2 signal is applied to the A/D converter 274 as a reset/start A/D signal. The reset/start A/D signal initializes the A/D converter 274 to start its operation and simultaneously causes an A/D COMP signal on a conductor 278 to go to a binary 0 as shown in FIG. 11a.

When the A/D COMP signal goes to a binary 0, that signal is applied as a binary 1 through an inverter input terminal of an AND gate 280. AND gate 280 is enabled when the first CLK signal, following the A/D COMP signal, is applied to that gate to provide a reset signal to the R terminal of counter 268. This effects the generation of the DLC0 signal at the time shown in FIGS. 11a and 11b. At the completion of the analog-to-digital conversion, the A/D COMP signal goes to a binary 1 applying a set input signal to the S input terminal of the delay counter 268.

As shown in FIGS. 10a, 11a and 11b, the delay counter 268 is now enabled by the A/D COMP binary 1 signal to generate the DLC1 and DLC2 signals in response to the two CLK signals applied to the T terminal of counter 268. As previously described, each time the DLC2 signal is generated the scanner counter 270 is incremented to cause the scanner to sequentially select the next sensor input signal and simultaneously reset and start the A/D converter 274. The functions just described are repeated for each A/D conversion which the controller performs on the various sensor input signals ATCX1 through AOTC.

Let it now be assumed that the system has been initialized and that the controller has just completed an analog-to-digital conversion on the ATCX1 signal. As illustrated in FIG. 11a, the scanner counter 270 is at an all binary 0 state, thus generating a binary 1 SC00 signal to cause the scanner 272 to select the ATCX1 signal as shown in FIG. 10a. The A/D converter 274 is also capable of generating an output signal OV+UV on a conductor 282. The A/D converter 274, which is conventional by design, will generate a binary 1 output signal on conductor 282 when it detects either an overflow or an underflow condition. The OV+UV signal on conductor 282 is representative of such a detected overflow or underflow condition. In normal operation, if the sensor providing the selected ATCX1 through AOTC signal is not opened or shorted, the OV+UV signal will remain at a binary 0. As shown in FIG. 10a, the OV+UV signal is applied on conductor 282 to an inverter input terminal of an AND gate 284 in conjunction with the A/D COMP signal. Thus, it can be seen, if the A/D converter 274 does not detect an overflow or underflow condition, AND gate 284 will be enabled to provide a binary 1 set input signal to an S terminal of a Good F/F #1, 286. The timing for the setting and resetting of flip-flop 286 is illustrated in FIGS. 11a and 11b in dashed line form. The dashed lines indicate that flip-flop 286 will set if there is no overflow or underflow condition, otherwise it will remain reset. It is to be noted that flip-flop 286 is always reset by the DLC2 signal from the delay counter 268 each time an analog-to-digital conversion is started.

Let it now be assumed that the Good F/F #1, 286, is in a set state. Thus, that flip-flop generates a binary 1 output signal on a 1 terminal which is applied via a conductor 288 to an enable EN input terminal of a Switch #1, 290, and as one input to an AND gate 292. Switch 290 is also receiving the converted sensor data in digital form from the A/D converter on a plurality of conductors 294. With switch 290 now enabled, the sensor data is passed through switch 290 to the input of a conventional parallel type adder designated Adder #1, 296. Adder 296 is now enabled by an ADD signal on a conductor 298 from AND gate 292 which is enabled by the A/D COMP signal on conductor 278 from the A/D converter 274. The generation of the ADD signal on conductor 298 is shown in FIGS. 11a–11b in dashed line form indicating that that signal will be generated only when flip-flop 286 is set. If flip-flop 286 is not set, indicating an invalid condition of the sensor being monitored by the A/D converter, the adder 296 is not enabled to perform its add function.

Let it now be assumed that the adder 296 is enabled to perform its add function. As shown in FIG. 10a, the adder 296 provides output signals on a plurality of conductors 300 to a conventional accumulator register 302 designated ACC #1 and receives input signals via a plurality of conductors 304 from the accumulator 302. Thus, it can be seen that, each time adder 296 performs an add function, the contents of the accumulator 302 are added to the sensor data input signals from switch 290 and the sum of the addition is provided back to the accumulator 302.

Figure 10B:
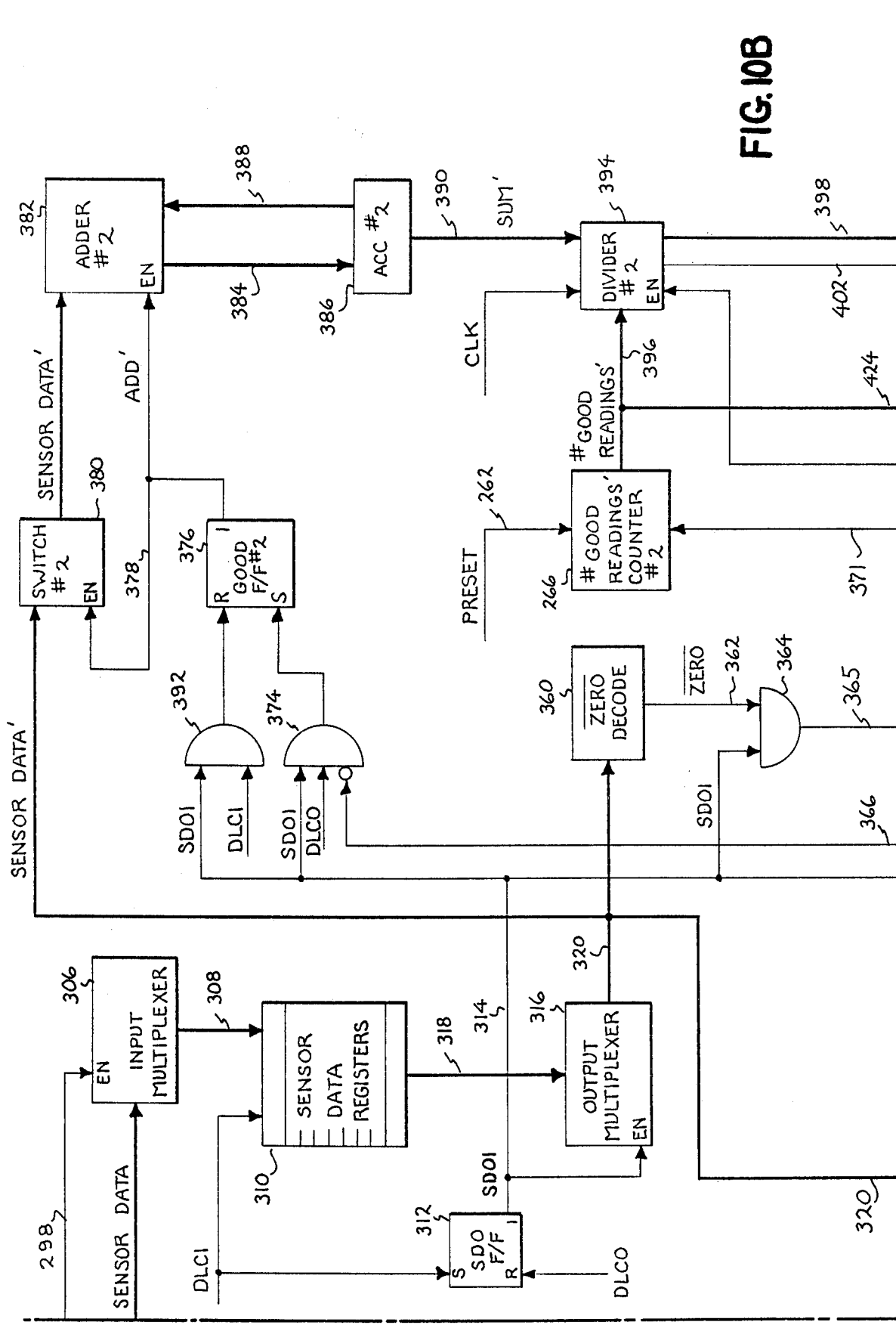
Figure 10C:
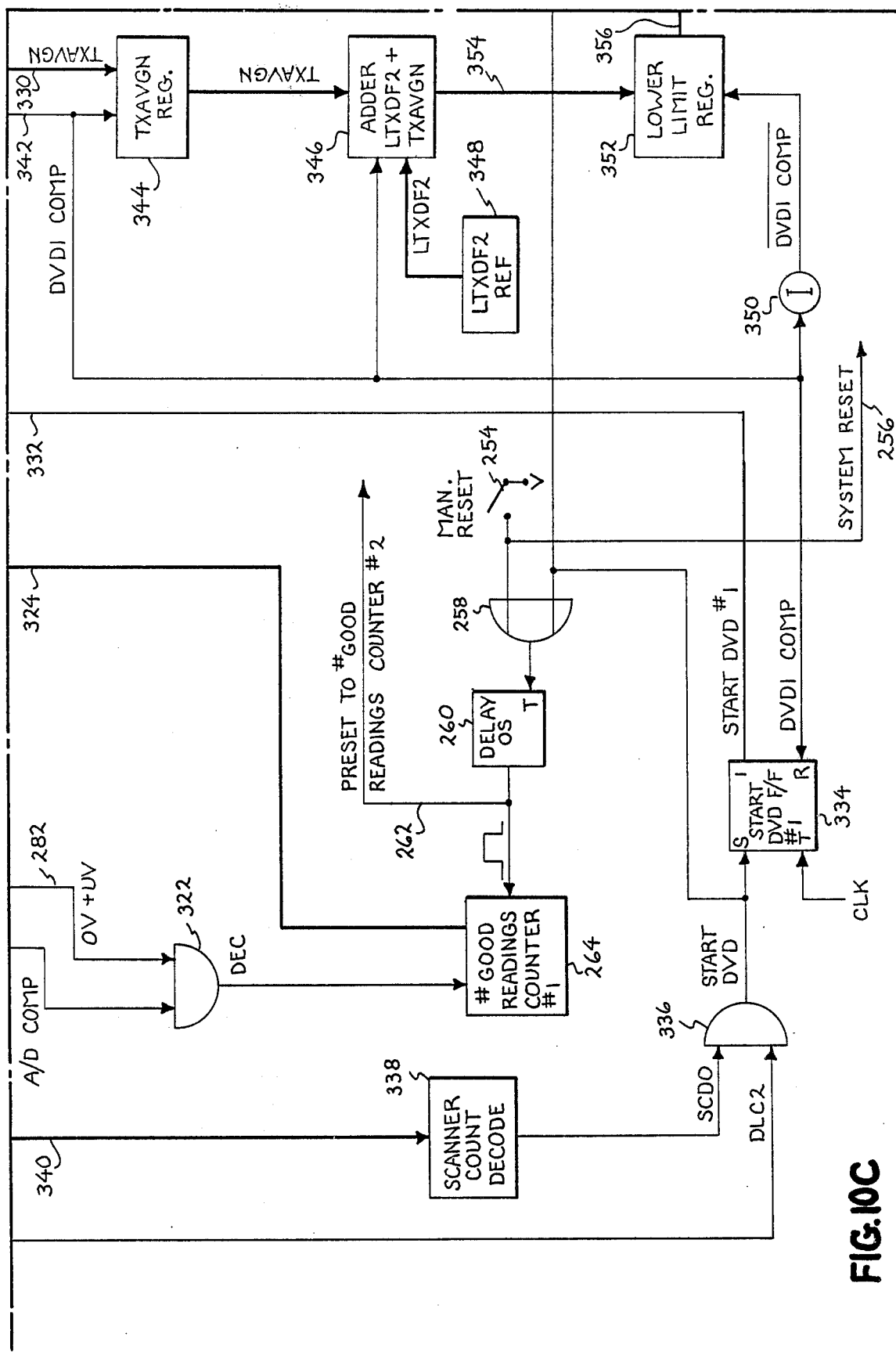
Figure 11A:
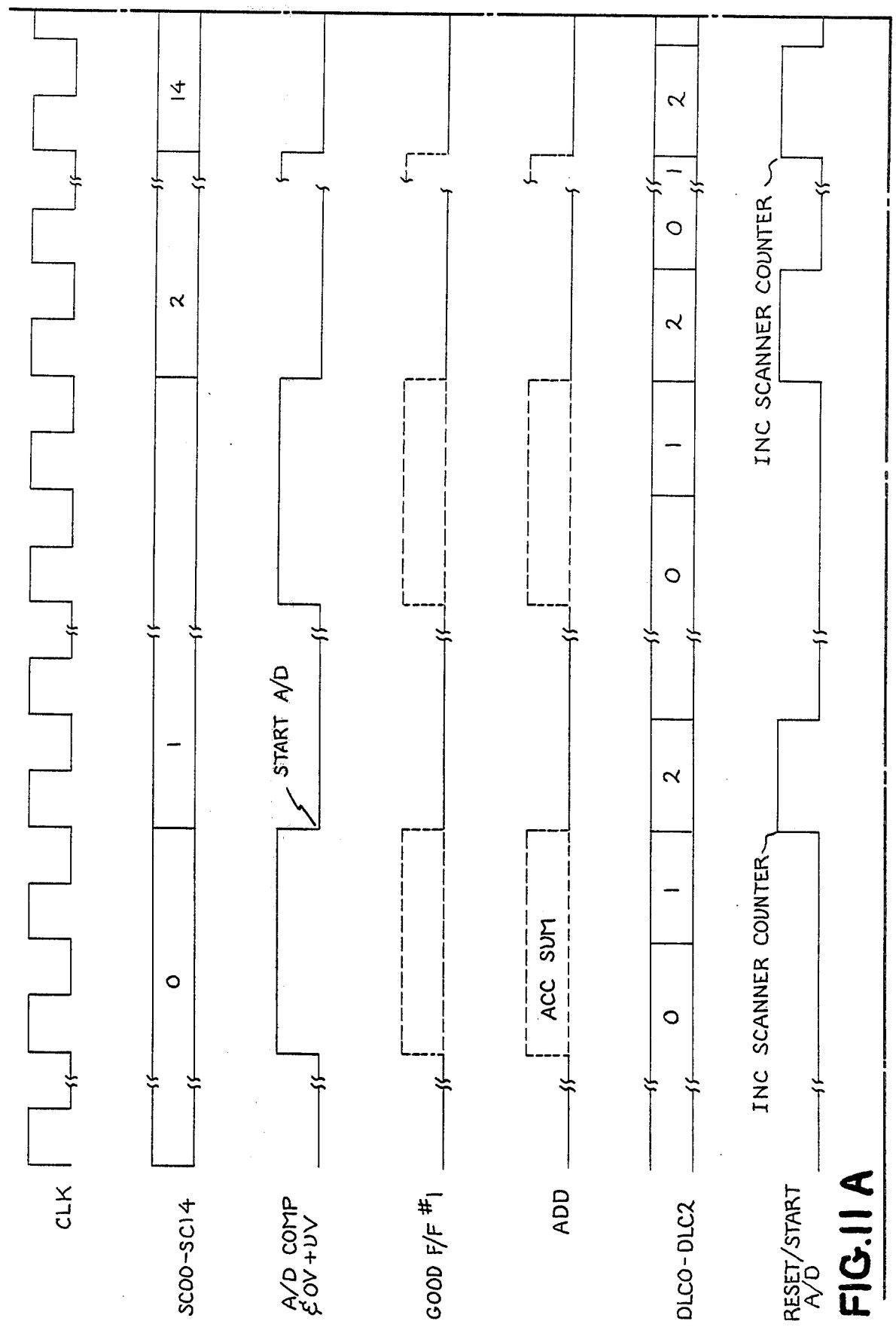
Figure 11:
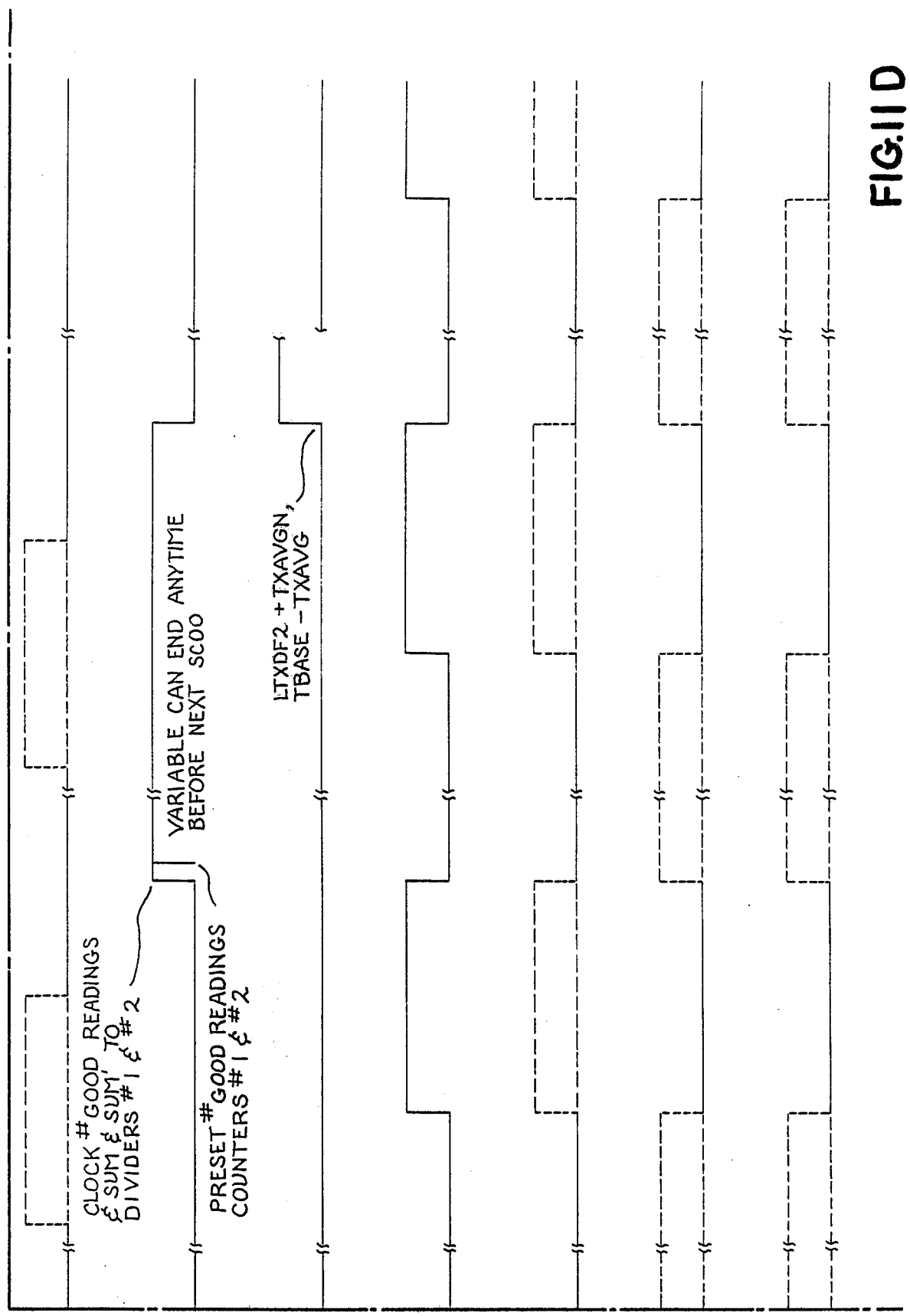

Reference is now made to FIGS. 10a and 10b and the timing diagram of FIGS. 11a and 11b. It will be noted that the ADD signal on conductor 298 is also provided to an enable EN input terminal of a conventional input multiplexer circuit 306. The multiplexer 306 also receives the sensor data from the output of switch 290. When the ADD signal is generated by gate 292, multiplexer 306 is enabled to pass the sensor data via a plurality of conductors 308 into the top register of a plurality of sensor data registers 310. Sensor data registers 310 preferably are comprised of a converter pushdown type stack, whereby the information entering into the top register is sequentially shifted down into the next register upon activation of the sensor data registers by the DLC1 signal.

By referring to FIGS. 11a and 11b, it can be seen that while the sum is being accumulated in accumulator 302, the sensor data is placed into the sensor data registers 310 by the DLC1 signal gating registers 310. Also at this time, it will be noted that the DLC1 signal is applied to a set S input terminal of a sensor data operation flip-flop SDO F/F 312. Flip-flop 312 is set at CLC1 time to generate an SDO1 binary 1 signal on a conductor 314 as shown in the timing diagram of FIGS. 11c and 11d. The SDO1 signal is applied to an enable EN input terminal of a conventional output multiplexer circuit 316. The last register stage of the sensor data registers 310 provides sensor data via a plurality of conductors 318 to the input of the output multiplexer 316. Thus, it can be seen that multiplexer 316 is enabled by the SDO1 signal to pass the sensor data from the final output stage of registers 310 on a plurality of conductors 320.

Reference is now made back to the sensor data registers 310 of FIG. 10b. Preferably, registers 310 contain a number of registers equal to the number of sensor input signals ATCX1 through AOTC (15 in the present embodiment). As such, it can be seen that it will take 15 A/D conversions before the sensor data registers 310 are each filled with digital data representative of the temperature values of their corresponding ATCX1 through AOTC signals. Further, it should be noted that, at the beginning of each new scan by scanner 272, the ATCX1 sensor signal is the first signal to be entered into the sensor data registers 310. Thus, after 15 A/D conversions, the ATCX1 signal contents will be in the final output register of registers 310.

It is also significant to note at this time, that any sensor input signal which is detected as either opened or shorted, indicating an invalid sensor condition, prevents generation of the ADD signal on conductor 298. As a result, the input multiplexer 306 is not enabled and binary 0's are thus passed into the top register of the sensor data registers 310 for that particular sensor. As a result, registers 310 always contain representations of the values of only those sensor readings ATCX1 through AOTC which are considered to be valid. All invalid conditions are held in registers corresponding to their sensor signals as binary 0's.

Figure 10D:
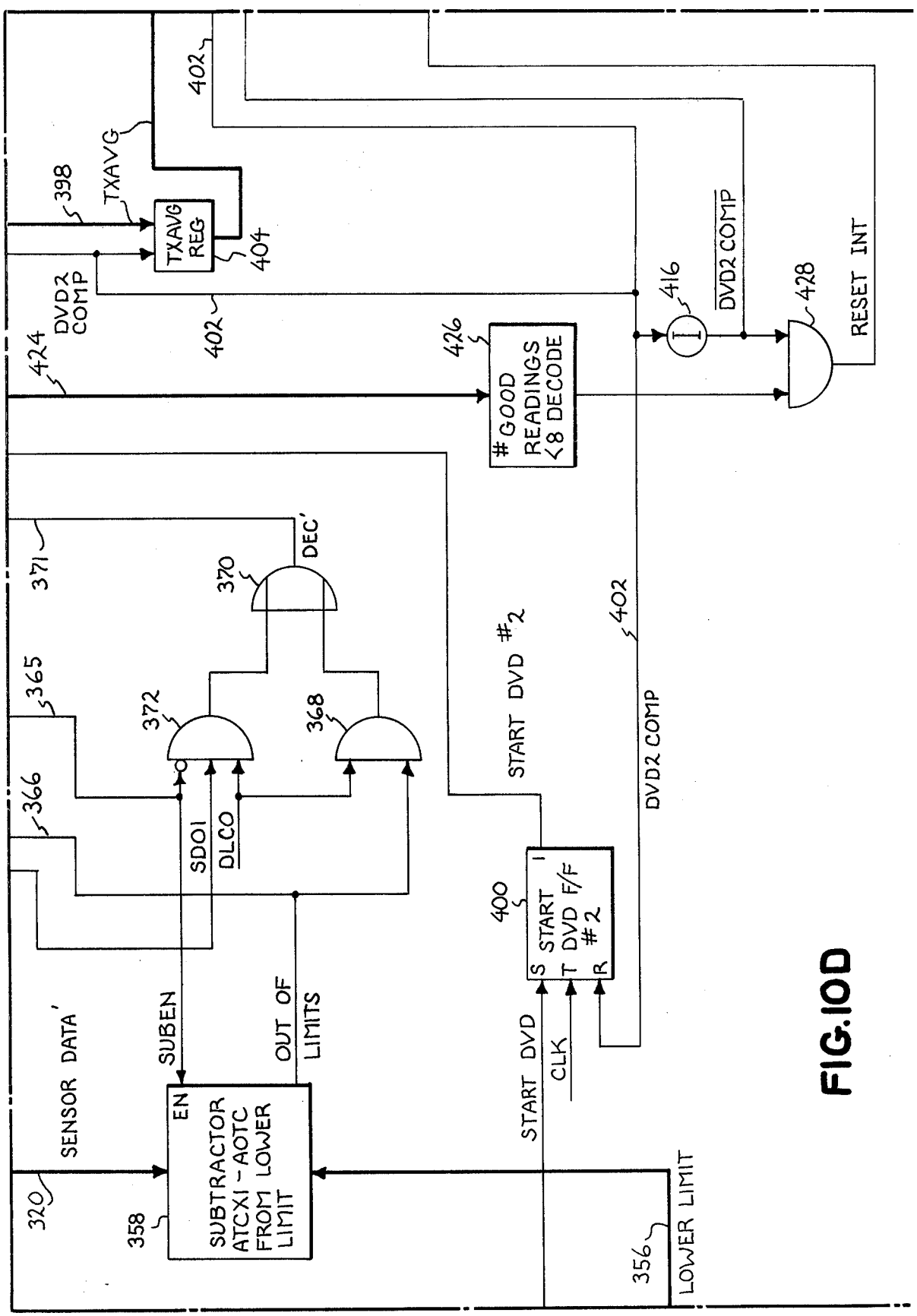
Figure 10E:
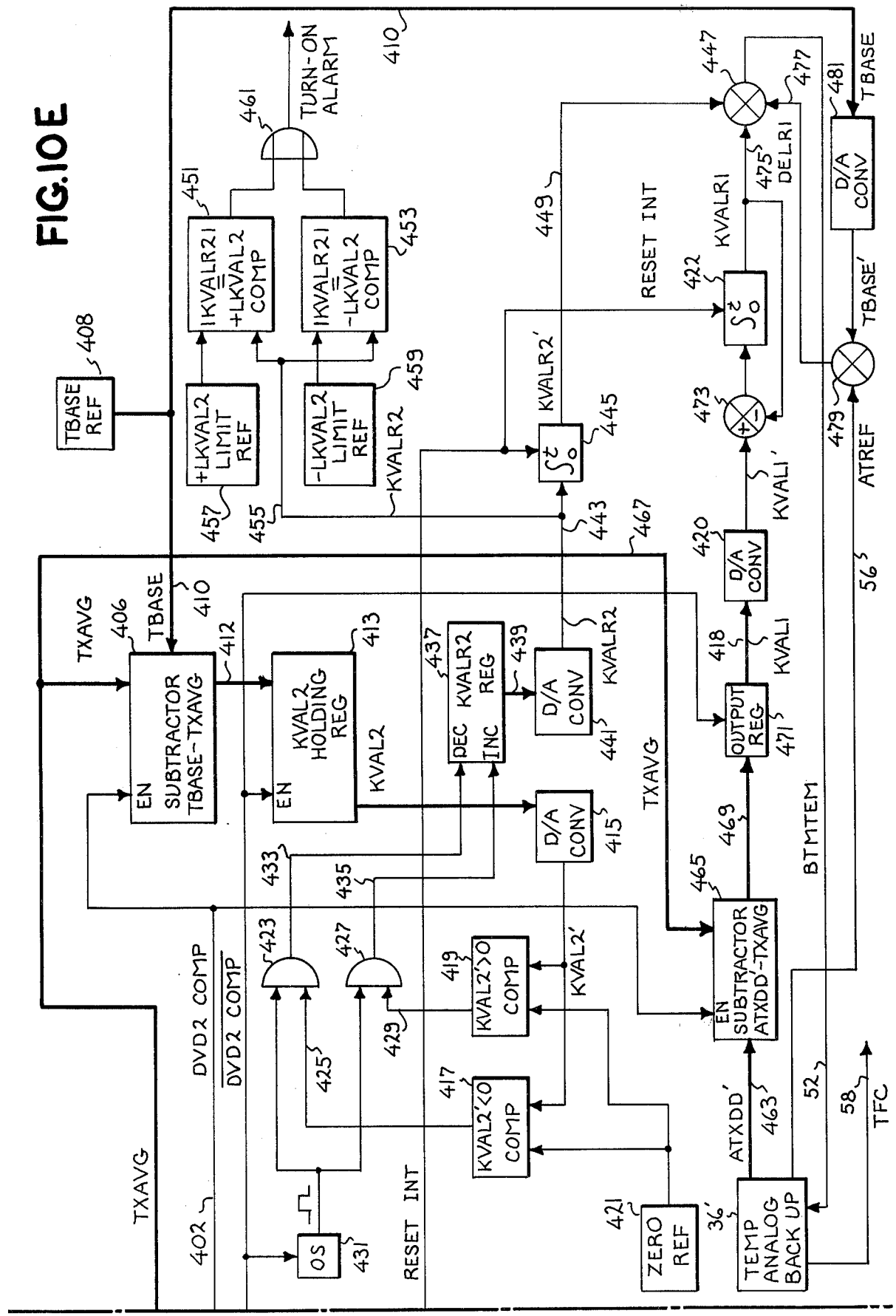

To understand the operation of the logic shown in FIGS. 10b, 10d and 10e, it is now considered advantageous to refer back to the A/D converter 274 of FIG. 10a. The A/D COMP and OV+UV output signals from converter 274 are applied via conductors 278 and 282 to an AND gate 322. The output of AND gate 322 is a decrement DEC signal which is applied to the # Good Readings counter #1, 264, to decrement that counter each time the A/D converter detects either an overflow or underflow condition resulting from an invalid sensor reading. Since counter 264 is preset at the beginning of each scan, it always contains a count representative of the number of good or unrejected readings taken by the A/D converter 274. Signals representative of the number of good readings in counter 264 are applied via a plurality of conductors 324 to a conventional divider circuit designated Divider #1, 326. Divider 326 also receives signals representative of the accumulated sum in accumulator 302 via a plurality of conductors 328. When the divider 326 is activated to perform a divide function, it divides the number of good readings on conductors 324 into the accumulated sum from accumulator 302. The result of this division is the calculated average temperature shown as a TXAVGN signal from the output of divider 326 on a plurality of conductors 330.

The divide operation is enabled by a start DVD #1 signal applied to an EN input terminal of divider 326 via a conductor 332 from a 1 output terminal of a START DVD F/F #1, 334. The flip-flop 334 is set by a binary 1 START DVD signal from the output of an AND gate 336. By referring to FIGS. 11c and 11d, it can be seen that AND gate 336 is enabled when the two-bit delay counter 268 generates the DLC2 signal and a scanner count decode generates a binary 1 scanner count decode zero signal SCD0. The decode network 338 receives the SC00 through SC14 signals via a plurality of conductors 340 from the scanner counter 270. As shown in FIGS. 11b and 11d, whenever the scanner counter 270 achieves a count of zero, the output of the scanner count decode 338 generates the SCD0 signal to enable AND gate 336 at DLC2 time, thus generating the START DVD signal. The first CLK signal applied to a T terminal of flip-flop 334 following the generation of the START DVD signal, sets flip-flop 334 generating a binary START DVD1 signal on a conductor 332. When the START DVD1 signal is applied to divider 326, the # of good readings signals on conductors 324, and the accumulated sum on conductors 328 are clocked into the divider 326 where they are stored in registers internal thereto and not shown. The CLK signal applied to divider 326 controls the timing of that circuit in performing the divide function.

The divider, upon the completion of the divide operation, generates a DVD1 COMP binary signal on a conductor 342. The DVD1 COMP signal is applied to a reset R input terminal of flip-flop 334 resetting that flip-flop. The length of time for performing the divide can be variable, so long as the divide operation is completed before the next SC00 signal is generated. Also, the DVD1 COMP signal is applied to a TXAVGN register 344 which receives the calculated average temperature TXAVGN at the time the DVD1 COMP signal is generated. Additionally, the DVD1 COMP signal is applied to a conventional adder circuit 346 which algebraically adds the calculated average temperature TXAVGN to a lower limit temperature deviation limit or value LTXDF2 from an LTXDF2 reference source 348. The DVD1 COMP signal is a binary 1 pulse having a duration of approximately one CLK period, which is sufficiently long to allow the adder 346 to perform the addition of the LTXDF2 and TXAVGN signals.

When the $\overline{\text{DVD1 COMP}}$ signal returns to a binary 0, that signal is inverted to a binary 1 to a $\overline{\text{DVD1 COMP}}$ signal through an inverter 350 of FIG. 10c. When the DVD1 COMP signal goes to a binary 1, the contents of the ADDER 346 are clocked into a lower limit register 352 via a plurality of conductors 354. The contents of the lower limit register represent the maximum lower limit of the calculated average temperature. This lower limit is provided as an output signal reference on a plurality of conductors 356 from Register 352. The lower limit value on conductors 356 is applied to a conventional subtracter 358. Subtracter 358 is also receiving the sensor data output from the multiplexer 316 via conductors 320 as sensor data' signals.

It is to be noted at this time that the divide operation just described is performed only once during each complete cycle of the scanner 272. Each time the scanner count decode 338 of FIG. 10c denotes a count of zero (SCD0=binary 1), signifying the beginning of a new scan, the START DVD signal is generated. The START DVD signal is also applied via OR gate 258 to the delay one-shot 260 which generates a delayed output pulse to preset the # Good Readings counter #1, 264, at the time noted in FIG. 11c. Thus, counter 264 is always preset to the proper value at the beginning of each new scan.

Additionally, the lower limit register 352 always contains the lower limit value resulting from each divide operation. As such, the contents of register 352 can be changed only once during each scan of the sensor input signals ATCX1 through AOTC.

Reference is now made back to FIG. 10d to the subtracter 358. The purpose of the subtracter 358 is to subtract each of the ATCX1 through AOTC readings from the lower limit reference just described to detect for potential combustion problems in the turbine. The operation of the subtracter 358 can best be understood by first referring to a $\overline{\text{zero}}$ decode 360 receiving the sensor data' signals on conductors 320 from the multiplexer 316. The decode 360 is conventional in design and continuously monitors the output of multiplexer 316 to see if any of the ATCX1 through AOTC readings are all binary 0's, indicating a rejected temperature sensor. Under normal conditions, that is when a sensor has not been rejected, the input signals on conductors 320 to the decode 360 will always be representative of some value other than zero. So long as the decode 360 is decoding a $\overline{\text{zero}}$ input on conductors 320, a binary 1 $\overline{\text{zero}}$ output signal on a conductor 362 will be present. The $\overline{\text{zero}}$, signal, in conjunction with the previously mentioned SDO1 signal from flip-flop 312, is applied to an AND gate 364. As shown in FIGS. 11c and 11d, AND gate 364 generates a binary 1 subtract enable signal SUBEN on a conductor 365 each time the SDO1 signal goes to a binary 1 and the $\overline{\text{zero}}$ decode output signal is a binary 1. When the SUBEN signal goes to a binary 1, that signal is applied as an enable input to an EN input terminal of substracter 358 to effect the previously mentioned subtraction. If the subtraction of any one of the ATCX1 through AOTC signals from the lower limit results in an overflow condition in the subtracter, a binary 1 out of limits signal is generated on a conductor 366. The out of limits signal is combined in an AND gate 368 with the DLCO signal to enable that AND gate during an out of limits condition to thus generate a binary 1 signal for application to an OR gate 370. OR gate 370 is enabled each time an out of limits condition occurs to apply a binary 1 decrement DEC' signal to a second # Good Readings Counter #2, 266, to decrement that counter by 1 for each out of limits condition detected by the subtracter 358. The DEC' signal appears on a conductor 371.

Reference is now made back to the output of AND gate 364 of FIG. 10b. As previously described, under normal operating conditions the output of that AND gate is a binary 1 to generate the SUBEN signal. It should be noted that the SUBEN signal is inverted through an inverter input terminal applied to an AND gate 372, also receiving the SDO1 and DLCO signals. Each time the zero decode 360 decodes a binary 0 value from multiplexer 316, AND gate 364 is disabled to provide a binary 0 signal on the SUBEN line. This signal is inverted to a binary 1 to thus enable AND gate 372 at the time indicated by the generation of the DEC' signal in FIGS. 11c and 11d. In other words, any time a zero is decoded by decode 360, indicating that the sensor corresponding to that reading being decoded at that time is a rejected sensor, counter 266 is decremented by 1. This decrementing, in this instance, is provided by the output of AND gate 372 enabling OR gate 370 to generate the DEC' binary 1 signal. It can now be seen that counter 266 always contains a count representative of the number of good readings determined by the rejection of the invalid sensors during the A/D conversion process and by those rejected sensors providing out of limits readings during the subtraction process by subtractor 358.

Reference is now made to FIG. 10b to an inverter input terminal of an AND gate 374 receiving the out of limits signal on conductor 366. AND gate 374 also receives the DLCO and SDO1 signals At the completion of a subtraction operation, if there is no out of limits condition, the binary 0 signal on conductor 366 is inverted to a binary 1 through the inverter of AND gate 374 to thus allow that gate to be enabled upon the occurrence of the DLCO and SDO1 signals to set a Good F/F #2, 376, at the time shown in FIGS. 11a–11d. Setting flip-flop 376 provides a binary 1 output signal ADD' on a conductor 378 to an enable EN input terminal of a switch #2, 380, and to an enabled EN input terminal of an ADDER #2, 382. The switch 380 also receives the sensor data' signals via conductors 320 and passes that data into adder 382 upon the occurrence of the ADD' signal. The operation of switch 380 and adder 382 is the same as previously described for switch 290 and adder 296. Adder 382 provides data via a plurality of conductors 384 to an accumulator ACC #2, 386, and receives data therefrom via a plurality of conductors 388. Accumulator 386 operates in the same fashion as previously described for accumulator 302 to provide SUM' data signals to a divider #2, 394, on a plurality of conductors 390. The Good F/F #2, 376, is reset by the SDO and DLC1 signals applied to an AND gate 392 generating a binary 1 signal to a reset R input terminal of flip-flop 376 to terminate the operation of ADDER 382 at the time shown in FIGS. 11c and 11d.

In FIG. 10b, the Divider #2, 394, functions in the same manner as previously described for divider 326 of FIG. 10a. Divider 394 receives a # Good Readings' signals via a plurality of conductors 396 from the # Good Readings Counter #2, 266. Divider 394 divides the # Good Readings' value into the SUM' value to generate the final calculated average output temperature signal TXAVG on a plurality of conductors 398. The divider 394 is put into operation by a START DVD #2 signal applied to an enable EN input terminal from a START DVD F/F #2, 400, of FIG. 10d. Flip-flop 400 is enabled to be set by the previously described START DVD signal from the output of AND gate 336 of FIG. 10c and sets when the CLK signal is applied to its trigger T input terminal. Flip-flop 400 is reset by DVD2 COMP binary 1 signal from divider 394 via conductor 402 at the completion of the divide operation.

The DVD2 COMP signal is also applied to a TXAVG REG 404 and to an enable EN input terminal of a second SUBTRACTER 406 of FIG. 10c. As shown in the timing diagram of FIG. 11d, the DVD2 COMP signal clocks the TXAVG signals into register 404 and into the subtracter 406 to enable the subtraction of TXAVG from the temperature base reference TBASE. The TBASE reference value is provided to subtracter 406 from a temperature base reference TBASE REF 408 via a plurality of conductors 410.

Referring to FIG. 10e, the results of the subtraction are gated into a KVAL2 holding register 413 by a $\overline{\text{DVD2 COMP}}$ signal from an inverter 416. The $\overline{\text{DVD2 COMP}}$ signal goes to a binary 1 when the DVD2 COMP signal goes to a binary 0 as shown in FIG. 11d. Register 413 now contains the calculated correction value KVAL2. This value is applied in digital form on a plurality of conductors to a digital to analog (D/A) converter 415 as the KVAL2 signal.

Converter 415 converts the KVAL2 signal to an analog signal KVAL2', the latter being applied to two comparator circuits KVAL2'<0, 417 and KVAL2'>0, 419. Each of the comparators 417 and 419 also receives a reference signal from a zero reference source 421 for comparison with the KVAL2' signal. If the KVAL2' signal is less than the reference value (zero), comparator 417 is activated to apply a binary 1 enable signal as one input to an AND gate 423 via a conductor 425. In a similar fashion, if the KVAL2' signal is greater than the reference value, comparator 419 applies a binary 1 signal to one input of a second AND gate 427 via a conductor 429. So long as the value of KVAL2' is equal to the reference value (zero), each of the comparator outputs on conductors 425 and 429 will remain at a binary 0 state preventing either of the AND gates 423 or 427 from being enabled. This would be the condition when there is no difference between the base temperature (TBASE) and the calculated average temperature (TXAVG). So long as any difference exists between these signals (positive or negative) the appropriate one of the comparators 417 or 419 will generate a binary 1 signal.

Reference is now made to a delay one-shot (OS) multivibrator 431 of FIG. 10e receiving the $\overline{\text{DVD2 COMP}}$ signal from inverter 416 of FIG. 10d. The one-shot 431 generates sufficient delay for the signals on conductors 425 and 429, resulting from the D/A conversion of the KVAL2 signals and a comparison of the KVAL2' signal, to settle down before applying the output of one-shot 431 to a second input of each of the AND gates 423 and 427.

When one-shot 431 applies a binary 1 pulse to gates 423 and 427, the gate receiving a binary 1 signal on one of the conductors 425 or 429 will be enabled. If neither one of the comparators 417 and 419 is generating a binary 1 signal, neither of the AND gates will be enabled by the output pulse from one-shot 431.

It will be noted that the outputs of AND gates 423 and 427 are applied to DEC (decrement) and INC (increment) input terminals of an up/down counter (KVALR2 REG) 437 via conductors 433 and 435, respectively. The KVALR2 register 437 is reset to zero at system start-up by the system reset signal on conductor 256, thus KVALR2 will always count up or down from zero. If the value of KVAL2' is greater than the reference (zero), AND gate 427 will be enabled when one-shot 431 is triggered to apply a binary 1 increment signal to the KVALR2 register on conductor 435. In contrast, if the value of KVAL2' is less than the reference, AND gate 423 will be enabled to apply a binary 1 decrement signal to the KVALR2 register.

The increment and decrement signals to the KVALR2 register cause the count in that register to be increased or decreased by a vernier constant as specified by the designer's choice. In the preferred embodiment, the value of KVALR2 is changed by a vernier constant or count of one for each increment or decrement signal applied to the KVALR2 register. Thus, it can be seen that, at the termination of each divide operation by the controller of FIGS. 10a-10e, the value of KVALR2 will be adjusted or not adjusted in accordance with the difference between the values of the TBASE and the TXAVG signals.

The output of the KVALR2 register is applied in digital form on a plurality of conductors 439 to a digital to analog (D/A) converter 441. Converter 441 converts the digital value from the register 437 to an equivalent analog signal KVALR2 on a conductor 443. The KVALR2 signal is applied to a conventional integrator amplifier 445 which provides an integrated output signal KVALR2' to a positive input terminal of a summer 47 via a conductor 449.

The KVALR2 signal from converter 441 is also applied as one input to each of two conventional comparator circuits 451 and 453 via conductor 443 and a conductor 455. Comparators 451 and 453 also each receive at respective input terminals a +LKVAL2 and a −LKVAL2 reference limit signal from corresponding reference sources 457 and 459. The purpose of comparators 451 and 453 is to compare the absolute value of KVALR2 with their respective positive and negative reference limits +LKVAL2 and −LKVAL2.

When the value of KVALR2 is within the limits specified by the + and − LKVAL2 signals, the output signal of each of the comparators 451 and 453 is a binary 0. These output signals are applied to an OR gate 461. If the value of KVALR2 exceeds either of the + or − LKVAL2 limits, the corresponding comparator detecting an out of limit condition will apply a binary 1 enable signal to OR gate 461. When OR gate 461 is enabled, it generates a binary 1 signal which may be used to turn on an alarm for the purposes previously described in connection with FIGS. 9a and 9b.

Reference is now made to an analog backup means 36' of FIG. 10e which is generating a mid-value signal ATXDD' in digital form on a plurality of conductors 463. The ATXDD' signals are applied to a conventional subtractor 465 also receiving the TXAVG signals on conductors 467. Subtractor 465 is enabled to subtract the TXAVG value from the ATXDD' value in response to the binary 1 DVD2 COMP signal applied to its enable (EN) input terminal at the time shown in FIG. 11d.

The highly accurate calculated average turbine temperature (TXAVG) is subtracted from ATXDD' (mid-value signal) approximately equal to the average turbine temperature because of the expected differences between these two values. The subtraction yields a second correction value in the form of digital signals on a plurality of conductors 469.

The signals on conductors 469 are gated into an output register 471 by the $\overline{DVD2\ COMP}$ binary 1 signal from inverter 416.

The output of register 471 is provided via a plurality of conductors 418 to a conventional digital-to-analog (D/A) converter 420 as a correction value KVAL1. Converter 420 converts the KVAL1 signals to an analog signal KVAL1' for application to a positive terminal of a summer 473.

The output of summer 473 is applied to a conventional integrator amplifier 422 which generates an integrated fuel correction signal KVALR1 on a conductor 475 to one input terminal of a summer 447. The KVALR1 and KVALR2' signals are algebraically combined in summer 447 with the aforementioned DELR1 signal on a conductor 477 to generate the temperature trim signal BTMTEM on conductor 52.

The DELR1 delta reference signal is generated by a summer 479 receiving the ATREF signal (safe temperature reference) and a TBASE' signal having a value proportional to the turbine base temperature or set point. As previously described, the DELR1 signal has a value proportional to the difference between the ATREF and TABSE' signals and serves as a temperature bias reference for maintaining the turbine temperature at a desired value.

The TBASE' signal is analog in nature and is generated by a digital-to-analog (D/A) converter circuit 481 which converts the digital signals TBASE on conductors 410 supplied by the TBASE REF source 408.

The BTMTEM signal is combined in the analog means 36' with the ATXDD and ATREF signals to generate the temperature fuel control signal TFC on conductor 58 for application to the low value gate 34 of FIG. 1.

The KVALR1 signal from amplifier 422 is fed back to a negative input terminal of summer 473 where that signal is combined with the KVAL1' signal for the same reason previously described in connection with amplifier 257 of FIG. 9b.

The # Good Readings' signals from the output of counter 266 of FIG. 10b are applied via conductors 424 to a # Good Readings <8 decode logic 426 of FIG. 10d. Decode 426 functions in the same manner as previously described for the Decode Logic 236 of FIG. 9b. Whenever the number of good readings in counter 266 is less than 8, the decode 426 generates a binary 1 output signal to an AND gate 428. AND gate 428 also receives the $\overline{DVD2\ COMP}$ signal from inverter 416. As previously described in the previous embodiments, if the number of good readings is less than 8, it is deemed necessary to place the turbine under control of the analog backup means. When the $\overline{DVD2\ COMP}$ signal goes to a binary 1 and if the output of decode 426 is a binary 1, AND gate 428 is enabled to apply a binary 1 RESET INT signal to integrators 422 and 445 causing the BTMTEM signal to be ramped to zero, thus causing the TFC signal to take on the value of the algebraic sum of the ATREF and ATXDD signals.

Figure 12:
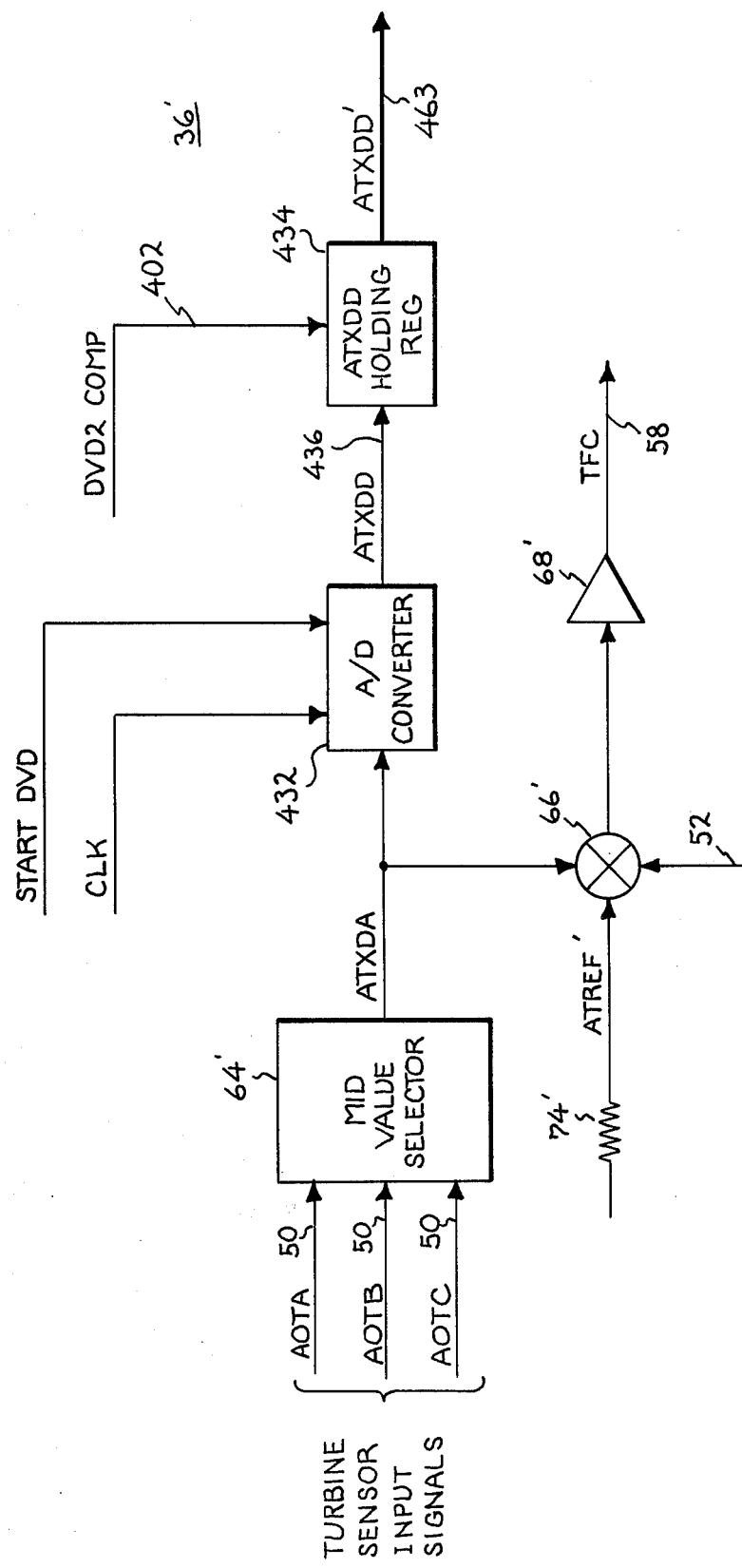
FIG. 12 is a block diagram schematic illustrating the implementation of a different embodiment of the analog backup means into the digital controller of FIGS. 10a through 10e.

Reference is now made to FIG. 12, which is a modified form of the temperature analog backup means 36' for use in the embodiment of FIGS. 10a–10e. The temperature analog backup means of FIG. 12 contains like numerals with prime designations corresponding to those components previously described in connection with FIGS. 1 and 2. For example, the mid-value selector 64 of FIG. 2 is shown as 64' in FIG. 12. The analog backup means 36' of FIG. 12 is basically the same as that previously described in connection with FIG. 2, with the exception of the inclusion of an A/D converter 432 and an ATXDD holding register 434. In the embodiment of FIG. 12, the selector 64' continuously monitors the AOTA through AOTC turbine sensor signals as previously described to generate an analog mid-value signal shown as ATXDA for input to the A/D converter 432. The A/D converter 432 functions similarly to that described in connection with the A/D converter 274 of FIG. 10a. Converter 432 receives the CLK clock signal from generator 250 and the START DVD signal from the output of AND gate 336 of FIG. 10c to reset and start that converter when the START DVD signal goes to a binary 1. At the termination of an A/D conversion, the output of the converter 432 is a digital value representative of the mid-value signal shown on a plurality of conductors 436 as the ATXDD signals. The ATXDD signals are applied to the input of the ATXDD holding register 434. At the completion of the divide by the divider 394, the DVD2 COMP signal on conductor 402 goes to a binary 1 gating the ATXDD signals into register 434. Also at this time, the contents of the register 434 are gated as signals ATXDD' on conductors 463 into the subtracter 465 by the DVD2 COMP signal (see FIG. 10e).

Still referring to FIG. 12, the ATXDA signal, in conjunction with the ATREF' and BTMTEM signals, is applied to summer 66' to provide the temperature fuel control signal TFC through amplifier 68' as previously described in connection with FIG. 2. In normal operation, the output signal TFC on conductor 58 from amplifier 68' is representative of the algebraic sum of the ATXDA, ATREF' and BTMTEM signals. However, when the number of good readings is less than 8, as decoded by decode 426, AND gate 428 is enabled to generate the RESET INT signal to reset the integrators 422 and 445 causing the output signal BTMTEM to ramp down to zero. When this occurs, the analog backup means 36' takes over in the manner as previously described to now provide the TFC signal to the turbine through the low value gate 34. In this latter instance, the value of the TFC signal is representative of the algebraic sum of the ATXDA and ATREF' signals since the BTMTEM signal now have an ineffective value.

The comparator and latch circuits for generating the fuel trip signal on conductor 60 (see FIG. 2) are not shown in FIG. 12. These circuits have been left off of FIG. 12 to simplify the drawing; however, it is to be understood that those circuits could be connected to the output of the selector 64' in the same manner as shown in FIG. 2.

While illustrative embodiments of the invention have been described herein, modifications and adaptations thereof may be made by those skilled in the art without departure from the spirit and true scope of the invention as defined by the appended claims.

What is claimed is:

APPENDIX A

```
                                                                                    TCC01000 5939
                                                                                    TCC01010 5940
                                                                                    TCC01020 5941
                                                                                    TCC01030 5942
         c  o  *  *  c  c  c  c  p  o  o  c  c  c  c  c  c  c  c  c  *  *  c       TCC01040 5943
                                                                                    TCC01050 5944
              THERMOCOUPLE  CALCULATIONS, CONTROL , TCC PROGRAM                     TCC01060 5945
                                                                                    TCC01070 5946
                                                                                    TCC01080 5947
                                                                                    TCC01090 5948
                                                                                    TCC01100 5949
                                                                                    TTCC01110 5950
         c  c  c  c  c  c  c  c  c  c  c  c  c  c  c  c  c  c  c  c  c             TCC01120 5951
                   OBJ  1                                                           TCC01130 5952
                   INS  2                                                           TCC01140 5953
                                                                                    TCC01150 5954
                   FOR/EQU STATEMENTS                                               TCC01160 5955
                                                                                    TCC01170 5956
         04DC      OTERHT EQU THERWD,#C          BIT C OF ERRONEOUS READING MAP,THERWD   TCC01180 5957
         04C0      RTDEPR EQU TCCFLG,#0          RTD ERRONEOUS READING FLAG         TCC01190 5958
                                                 ARTD1 USES TCCFLG,#0               TCC01200 5959
                                                 ARTD2 USES TCCFLG,#1               TCC01210 5960
         04C2      UFIERR EQU TCCFLG,#2          AMPL OFFSET ERROR BIT              TCC01220 5961
         04C4      OTNFGB EQU TCCFLG,#4          OT READING IS NFG                  TCC01230 5962
         03F5      TCCRUN EQU RUNWD,#5           TCC RUN FLAG                       TCC01240 5963
                  *DEDICATED STORAGE                                                TCC01250 5964
         0250      ATCX10 EQU DSTOR5             LINEARIZED,COMPENSATED TEMPERATURES,   TCC01260 5965
                                                 ATCX1 THRU ATCX12 ARE STORED IN DSTOR5   TCC01270 5966
                                                 THRU DSTOR5+B                      TCC01280 5967
         025C      AOTAD EQU DSTOR5+0C           SCALED TEMPERATURES AOTA,B,CATX ARE   TCC01290 5968
                                                 STORED IN DSTOR5+C THRU F          TCC01300 5969
                  *TEMPORARY SCRATCH STORAGE                                        TCC01310 5970
         00C8      TMBK1S EQU SCRT1                                                 TCC01320 5971
         00C9      TMBK2S EQU SCRT1+1                                               TCC01330 5972
         00D0      RTD1S  EQU SCRT2                                                 TCC01340 5973
         00D1      RTD2S  EQU SCRT2+1                                               TCC01350 5974
         00D2      CNTTC  EQU SCRT2+2                                               TCC01360 5975
         00D3      ATCOFS EQU SCRT2+3                                               TCC01370 5976
         00D4      TEM51  EQU SCRT2+4                                               TCC01380 5977
         00D5      TEM52  EQU SCRT2+5                                               TCC01390 5978
         00D6      TEM53  EQU SCRT2+6                                               TCC01400 5979
         00D7      TEM54  EQU SCRT2+7                                               TCC01410 5980
         00D8      TEM55  EQU SCRT3                                                 TCC01420 5981
         00D9      TEM56  EQU SCRT3+1                                               TCC01430 5982
         00DA      TEM57  EQU SCRT3+2                                               TCC01440 5983
         00DB      TEM58  EQU SCRT3+3                                               TCC01450 5984
```

THERMOCOUPLE CALCULATIONS, CONTROL—Continued

```
            00DC         TEM59  EQU  SCRT3+4                                              TCC01460 5985
            00DD         TEM510 EQU  SCRT3+5                                              TCC01470 5986
            00DE         TEM511 EQU  SCRT3+6                                              TCC01480 5987
            00DF         TEM512 EQU  SCRT3+7                                              TCC01490 5988
                                                                                          TCC01500 5989
                         *      SYSTEM SYMBOLS                                            TCC01510 5990
                         *                                                                TCC01520 5991
                         *TCERBT      TMERWD,=0     REF BIT ,ERRONEOUS READING MAP,TMERWD TCC01530 5992
                         *TCCERR      TCCFLG,=3     TCC INPUT ERROR FLAG                  TCC01540 5993
                         *TMERWD                    ERRONEOUS READING WORD                TCC01550 5994
                         *AICXL                     ANALOG INPUTS,TWELVE EXHAUST TEMP TC'S TCC01560 5995
                         *AOTA                      ANALOG INPUTS,THREE OVERTEMP READINGS TCC01570 5996
                         *AIX                       ANALOG INPUT,MID VALUE SELECTOR       TCC01580 5997
                         *ARTD1                     ANALOG INPUTS,TWO RTD INPUTS          TCC01590 5998
                         *ATCOFT                    ANALOG INPUT,TEMP AMPL OFFSET         TCC01600 5999
                         *TCCFLG                    TCC FLAG WORD                         TCC01610 6000
                         *                                                                TCC01620 6001
                         *                                                                TCC01630 6002
                         *      TCC PROGRAM STARTS HERE                                   TCC01640 6003
                         *                                                                TCC01650 6004
    1170 0000 0000              ORG   TCCSRT,A                                            TCC01660 6005
            0000         TCCA01 EQU   *                                                   TCC01670 6006
    117G 0000 F800              CLR                                                       TCC01680 6007
    1171 0001 43F5              SST  TCCRUN        CLEAR TCC RUN FLAG                     TCC01690 6008
    1172 0002 A8C0              LAP  TEMBK1        TRANSFER CONSTANTS INTO FIRST 1K       TCC01700 6009
    1173 0003 80C8              SAN  TMBK1S                                               TCC01710 6010
    1174 0004 A8C3              LAP  TEMBK2                                               TCC01720 6011
    1175 0005 80C9              SAN  TMBK2S                                               TCC01730 6012
  W 1176 0006 7142              LAN  ATCOFT        TEMPERATURE AMPLIFIER OFFSET           TCC01740 6013 #
    1177 0007 A372              ANA  TWO           CHECK ERROR BIT                        TCC01750 6014
    1178 0008 9371              SUB  ONE                                                  TCC01760 6015
    1179 0009 F880              TGR                POS=ERROR                              TCC01770 6016
  W 117A 000A 44C2              SST  OFTERR        SET /CLEAR OFFSET ERROR FLAG           TCC01780 6017
    117B 000B 88CF              BKC  *+4                                                  TCC01790 6018
  W 117C 000C 7370              LAN  ZERO                                                 TCC01800 6019
    117D 000D 80D3              SAN  ATCOFS        IF ERROR,USE ZERO OFFSET               TCC01810 6020
    117E 000E C011              BRU  *+3                                                  TCC01820 6021
  W 117F 000F 7142              LAN  ATCOFT        GET OFFSET READING                     TCC01830 6022
    1180 0010 80D3              SAN  ATCOFS        STORE FOR FUTURE                       TCC01840 6023
                                                                                          TCC01850 6024
                         *      RTD CALC: RTD1S=(-ARTD1+ATCOFS)SCLRTD+TMOFT1-ATCOFS       TCC01860 6025
                                                                                          TCC01870 6026
  W 1181 0011 7370              LAN  ZERO                                                 TCC01880 6027
    1182 0012 80D4              SAN  TEM51                                                TCC01890 6028
    1183 0013 A8BD              LAP  SCLRTD        RTD SCALING FACTOR                     TCC01900 6029
    1184 0014 80D6              SAN  TEM53                                                TCC01910 6030

W 1185 0015 7371              LAN  ONE                                                  TCC01920 6031 #
    1186 0016 80D5              SAN  XD                                                   TCC01930 6032
            0017         TCCA10 EQU   *                                                   TCC01940 6033
  W 1187 0017 7524              LAN  ARTD1,X       RTD READING                            TCC01950 6034
    1188 0018 A372              ANA  TWO           CHECK ERROR BIT                        TCC01960 6035
    1189 0019 9371              SUB  ONE                                                  TCC01970 6036
    118A 001A F880              TGR                POS=ERROR                              TCC01980 6037
  W 118B 001B 4CC0              SST  RTDERR,X      STORE IN RTD ERROR FLAG                TCC01990 6038
    118C 001C 8820              BKC  *+4           SYSTEM CORRECT                         TCC02000 6039
            001D         TCCA12 EQU   *                                                   TCC02010 6040
    118D 001D A8C1              LAP  R1DAMB        TYPICAL AMB TEMP                       TCC02020 6041
    118E 001E 8400              SAN  R1D1S,X                                              TCC02030 6042
    118F 001F C03A              BPU  TCCA15        JUMP TO NEXT CALC                      TCC02040 6043
                                                                                          TCC02050 6044
  W 1190 0020 7370              LAN  ZERO                                                 TCC02060 6045
    1191 0021 9524              SUB  ARTD1,X       NEG NUMBER,RTD RDG                     TCC02060 6045
    1192 0022 98D3              ADD  ATCOFS        AMPL OFFSET                            TCC02070 6046
    1193 0023 80D5              SAN  TEM52         B11                                    TCC02080 6047
    1194 0024 CB52              ESC  .MPY                                                 TCC02090 6048 #
    1195 0025 00D4              PIN  TEM51                                                TCC02100 6049
    1196 0026 00D6              PIN  TEM53                                                TCC02110 6050
    1197 0027 00D7              PIN  TEM54                                                TCC02120 6051
    1198 0028 70D7              LAN  TEM54         B12,TEMP COMPENSATION                  TCC02130 6052
    1199 0029 F808              TAM                CHECK FOR NEG                          TCC02140 6053
    119A 002A 0030              BKS  *+6           NEG JUMP                               TCC02150 6054
    119B 002B A362              ANA  MSKL2         POS,CHECK THAT LEFT TWO BIT ARE ZERO   TCC02160 6055
    119C 002C 9370              SUB  ZERO                                                 TCC02170 6056
    119D 002D F880              TGR                                                       TCC02180 6057
    119E 002E 001D              BKS  TCCA12        SYSTEM WILL OVERFLOW ON B11            TCC02190 6058
    119F 002F C034              BRU  *+5           NORMAL PATH                            TCC02200 6059
    11A0 0030 A362              ANA  MSKL2         NEG,CHECK THAT LEFT TWO BIT ARE ONES   TCC02210 6060
    11A1 0031 B362              ERA  MSKL2                                                TCC02220 6061
    11A2 0032 F840              TEQ                                                       TCC02230 6062
    11A3 0033 881D              BKC  TCCA12        SYSTEM WILL OVERFLOW ON B11            TCC02240 6063 #
    11A4 0034 70D7              LAN  TEM54         B12,TEMP COMPENSATION                  TCC02250 6064
    11A5 0035 E00F              SHC  15            B11                                    TCC02260 6065
    11A6 0036 80D7              SAN  TEM54                                                TCC02270 6066
    11A7 0037 A8C2              LAP  TMOFT1        B11,RTD NULL TEMP                      TCC02280 6067
    11A8 0038 98D7              ADD  TEM54         B11,FROM ABOVE MULTIPLICATION          TCC02290 6068
    11A9 0039 90D3              SUB  ATCOFS        AMPL OFFSET                            TCC02300 6069
            003A         TCCA15 EQU   *                                                   TCC02310 6070
    11AA 003A 8400              SAN  R1D1S,X       B11,RTD COMPENSATION FACTOR            TCC02320 6071
    11AB 003B F805              DMR  XD            TEST FOR FINISH                        TCC02330 6072
    11AC 003C 0017              BKS  TCCA10        NO                                     TCC02340 6073
                                                                                          TCC02350 6074
                         *                                                                TCC02360 6075
                         *      TC CALC                                                   TCC02370 6076
```

THERMOCOUPLE CALCULATIONS, CONTROL—Continued

```
                       003D          TCCA20 EQL *                                                        TCC02380 6077
W   11AD 003D 7370            LAN ELEVEN                                                         TCC02390 6078
    11AE 003E 8005            SAN XD              INITIALIZE INDEX                               TCC02400 6079
    11AF 003F A8BE            LAP SCLTC1          TEMP CORRECTION FACTOR (LESS 650 DEG)          TCC02410 6080
    11B0 0040 8005            SAN TEM52                                                          TCC02420 6081
    11B1 0041 A8BF            LAP SCLTC2          TEMP CORRECTION FACTOR (OVER 650 DEG)          TCC02430 6082
    11B2 0042 80BA            SAN TEM57                                                          TCC02440 6083
W   11B3 0043 7370            LAN ZERO                                                           TCC02450 6084 #
    11B4 0044 80B9            SAN TEM56                                                          TCC02460 6085
W   11B5 0045 7374            LAN FOUR                                                           TCC02470 6086
    11B6 0046 80D2            SAN CNTTC           TC COUNTER,TO DETERMINE WHICH RTD TO USE       TCC02480 6087
                       0047          TCCB10 EQL *                                                        TCC02490 6088
    11B7 0047 70D2            LAN CNTTC                                                          TCC02500 6089
    11B8 0048 F808            TAM                                                                TCC02510 6090
    11B9 0049 B04F            BKS **6             USE RTD1S FOR COMPENSATION                    TCC02520 6091
    11BA 004A 9371            SUB ONE             USE RTD2S FOR COMPENSATION                    TCC02530 6092
    11BB 004B 80D2            SAN CNTTC                                                          TCC02540 6093
    11BC 004C 70D1            LAN RTD2S                                                          TCC02550 6094
    11BD 004D 80FF            SAN TEM511          B11,COMPENSATION                               TCC02560 6095
    11BE 004E C051            BRU **3                                                            TCC02570 6096
    11BF 004F 70D0            LAN RTD1S                                                          TCC02580 6097
    11C0 0050 80FF            SAN TEM511          B11,COMPENSATION                               TCC02590 6098
                       0051          TCCB15 EQL *                                                        TCC02600 6099
W   11C1 0051 7585            LAN ATCX1,X         TC ANALOG INPUT (2047 CNTS =1500 DEG)         TCC02610 6100 #
    11C2 0052 A372            ANA TWO             CHECK ERROR BIT                               TCC02620 6101
    11C3 0053 9371            SUB ONE                                                            TCC02630 6102
    11C4 0054 E8B0            TBR                                                                TCC02640 6103
W   11C5 0055 4CB0            SST TCERB1,X        MAKE ERROR MAP                                TCC02650 6104
W   11C6 0056 7585            LAN ATCX1,X         UNCOMP TC                                     TCC02660 6105
    11C7 0057 A387            ANA MSKL12          BLANK OUT RIGHT FOUR BITS                     TCC02670 6106
    11C8 0058 F808            TAM                                                                TCC02680 6107
    11C9 0059 B063            BES **10                                                           TCC02690 6108
    11CA 005A 98FF            ADD TEM511          COMP                                          TCC02700 6109
    11CB 005B 98BA            ADD CON16           PREVENT OVERFLOW ON ROUND-UP                  TCC02710 6110
    11CC 005C F808            TAM                                                                TCC02720 6111
    11CD 005D B060            BES **3                                                            TCC02730 6112
    11CE 005E 93BA            SUB CON16           TO GET BACK TO CORRECT VALUE                  TCC02740 6113
    11CF 005F C064            BRU **5                                                            TCC02750 6114
W   11D0 0060 73B9            LAN MSKR15                                                         TCC02760 6115
    11D1 0061 A387            ANA MSKL12                                                         TCC02770 6116 #
    11D2 0062 C064            BRU **2                                                            TCC02780 6117
    11D3 0063 98FF            ADD TEM511                                                         TCC02790 6118
    11D4 0064 8006            SAN TEM53                                                          TCC02800 6119
                              **THE ACCUM NOW CONTAINS A COMPENSATED TC READING,REF TO ZERO     TCC02810 6120
                              *DEG F,YIELDING 0 TO 2047 CNTS CORRESPONDING TO 0 TO 1500 DEG F.  TCC02820 6121
                                                                                                 TCC02830 6122

*AND AMPLIFIER OFFSET ACCOUNTED FOR                                TCC02840 6123
    11D5 0065 90C8            SUB TMBK1S          TEMP BK = 650 DEG F                           TCC02850 6124
    11D6 0066 E860            TBR                 POS. TEST.                                    TCC02860 6125
    11D7 0067 B06F            BKS TCCB20          NO.                                           TCC02870 6126
    11D8 0068 CB52            ESC .MPY            MULT ROUTINE FOR TC LESS THAN 650 DEG         TCC02880 6127
    11D9 0069 0004            PIN TEM51                                                          TCC02890 6128
    11DA 006A 0006            PIN TEM53                                                          TCC02900 6129
    11DB 006B 0007            PIN TEM54                                                          TCC02910 6130
    11DC 006C 7006            LAN TEM53                                                          TCC02920 6131
    11DD 006D 9807            ADD TEM54                                                          TCC02930 6132
    11DE 006E C07B            BRU TCCB25                                                        TCC02940 6133
                       006F          TCCB20 EQL *                                                        TCC02950 6134 #
    11DF 006F 90C9            SUB TMBK2S          EQUAL TO 570 DEG F(TC - 650-570)              TCC02960 6135
    11E0 0070 E860            TBR                                                                TCC02970 6136
    11E1 0071 B874            BKC **3                                                            TCC02980 6137
    11E2 0072 7006            LAN TEM53                                                          TCC02990 6138
    11E3 0073 C07B            BRU TCCB25                                                        TCC03000 6139
    11E4 0074 800B            SAN TEM58                                                          TCC03010 6140
    11E5 0075 CB52            ESC .MPY            MULT ROUTINE                                  TCC03020 6141
    11E6 0076 00D9            PIN TEM56                                                          TCC03030 6142
    11E7 0077 000B            PIN TEM58                                                          TCC03040 6143
    11E8 0078 00DC            PIN TEM59                                                          TCC03050 6144
    11E9 0079 7006            LAN TEM53           B11,COMP,TC READING                           TCC03060 6145
    11EA 007A 90DC            SUB TEM59           B11,NEG NUMBER,LINEARIZING CORRECTION         TCC03070 6146
                       007B          TCCB25 EQL *                                                        TCC03080 6147
    11EB 007B 80DF            SAN TEM512          B11,LINEARIZED,COMP TC READING                TCC03090 6148
    11EC 007C A378            ANA EIGHT           ROUND OFF ROUTINE                             TCC03100 6149
    11ED 007D 9371            SUB ONE                                                            TCC03110 6150
    11EE 007E E808            TAM                                                                TCC03120 6151 #
    11EF 007F B063            BKS **4             LESS THAN ONE HALF                            TCC03130 6152
    11F0 0080 70DF            LAN TEM512          ONE HALF OR MORE                              TCC03140 6153
    11F1 0081 98BA            ADD CON16           ROUND UP                                      TCC03150 6154
    11F2 0082 80DF            SAN TEM512                                                         TCC03160 6155
    11F3 0083 70DF            LAN TEM512                                                         TCC03170 6156
    11F4 0084 8650            SAN ATCX10,X        B11,LINEARIZED,COMP,ROUNDED READING           TCC03180 6157
                       0085          TCCC10 EQL *                                                        TCC03190 6158
    11F5 0085 E805            DBR XD              FINISHED TEST                                 TCC03200 6159
    11F6 0086 0047            BKS TCCB10          NO                                            TCC03210 6160
                              *                                                                  TCC03220 6161
                              *                                                                  TCC03230 6162
                              *   SCALING FOR AUTA,B,C,ATX                                      TCC03240 6163
                              *                                                                  TCC03250 6164

0087          TCCC20 EQL *                                                        TCC03260 6165
    11F7 0087 A8BC            LAP SCLUTA          B1,AUTA SCALING CONSTANT                      TCC03270 6166
    11F8 0088 8005            SAN TEM52                                                          TCC03280 6167
W   11F9 0089 7373            LAN THREE                                                          TCC03290 6168
```

THERMOCOUPLE CALCULATIONS, CONTROL—Continued

```
    11FA  008A  8005           SAN  XD                                                 TCC03300  6169
                0088    TCCC30 EQU  *                                                  TCC03310  6170
W   11FB  008B  7511           LAN  AOTA,X        OVERTEMP TC READING                  TCC03320  6171
    11FC  008C  F808           TAM                                                     TCC03330  6172
W   11FD  008D  44C4           SST  OINEGB        SET IE OT IS NEG                     TCC03340  6173 #
    11FE  008E  A372           ANA  TWO           CHECK ERROR BIT                      TCC03350  6174
    11FF  008F  9371           SUB  ONE                                                TCC03360  6175
    1200  0090  F880           TGR                                                     TCC03370  6176
W   1201  0091  4C0C           SST  OTERB1,X      TEMP ERROR MAP                       TCC03380  6177
W   1202  0092  7511           LAN  AOTA,X                                             TCC03390  6178
    1203  0093  A387           ANA  MSKL12        BLANK OUT RIGHT 4 BITS               TCC03400  6179
    1204  0094  8006           SAN  TIM53                                              TCC03410  6180
    1205  0095  CB52           ESC  .HPY                                               TCC03420  6181
    1206  0096  00D4           PIN  TEM51                                              TCC03430  6182
    1207  0097  00D6           PIN  TEM53                                              TCC03440  6183
    1208  0098  00D7           PIN  TEM54                                              TCC03450  6184
    1209  0099  70D7           LAN  TIM54         B12                                  TCC03460  6185
    120A  009A  98AA           ADD  CON16         PREVENT OVERFLOW ON ROUND-UP.        TCC03470  6186
    120B  009B  A382           ANA  MSKL2         CHECK FOR OVERFLOW                   TCC03480  6187
    120C  009C  9370           SUB  ZERO                                               TCC03490  6188 #
    120D  009D  F840           TLO                                                     TCC03500  6189
    120E  009E  D0A6           BKS  *+8           BRANCH IF READING IS CORRECT         TCC03510  6190
W   120F  009F  34C4           LAT  OINEGB                                             TCC03520  6191
    1210  00A0  D0A6           BKS  *+6           BRANCH IF READING IS CORRECT         TCC03530  6192
    1211  00A1  F900           SIR                                                     TCC03540  6193
W   1212  00A2  4C0C           SST  OTERB1,X      SET FLAG IN ERROR MAP                TCC03550  6194
W   1213  00A3  7389           LAN  MSKR15                                             TCC03560  6195
    1214  00A4  A387           ANA  MSKL12        SET UP SATURATION RDG                TCC03570  6196
    1215  00A5  C0AB           BRU  *+3                                                TCC03580  6197
    1216  00A6  70D7           LAN  TEM54         B12                                  TCC03590  6198
    1217  00A7  E00F           SFC  15            B11                                  TCC03600  6199
    1218  00A8  80DF           SAN  TEM512        B11,OVERTEMP TC,SCALED               TCC03610  6200
    1219  00A9  A379           ALA  EIGHT         ROUND OFF ROUTINE                    TCC03620  6201
    121A  00AA  9371           SUB  ONE                                                TCC03630  6202
    121B  00AB  F808           TAM                                                     TCC03640  6203 #
    121C  00AC  D0D0           BKS  *+4           LESS THAN ONE HALF                   TCC03650  6204
    121D  00AD  70DF           LAN  TEM512        ONE HALF OR MORE                     TCC03660  6205
    121E  00AE  98AA           ADD  CON16         ROUND UP                             TCC03670  6206
    121F  00AF  80DF           SAN  TEM512                                             TCC03680  6207
    1220  00B0  70DF           LAN  TEM512                                             TCC03690  6208
W   1221  00B1  865C           SAN  AOTAD,X       B11,OVERTEMP TC,SCALED,ROUNDED OFF   TCC03700  6209
    1222  00B2  E805           DKR  XD            FINISHED TEST                        TCC03710  6210
    1223  00B3  0089           BRS  TCCC30        NO                                   TCC03720  6211
    1224  00B4  7040           LAN  TMEPMO        TC READING ERROR MAP                 TCC03730  6212
    1225  00B5  9370           SUB  ZERO                                               TCC03740  6213
    1226  00B6  F880           TGR                POS=ONE OR MORE ERRONEOUS TC READING TCC03750  6214

W   1227  00B7  14C0           LDT  RIDERP        RTD1 ERRONEOUS READING FLAG          TCC03760  6215
W   1228  00B8  14C1           LDT  RIDERR+1      RTD2 ERRONEOUS READING FLAG          TCC03770  6216
W   1229  00B9  14C2           LDT  OFTERR        AMPLIFIER OFFSET ERRONEOUS RDG FLAG  TCC03780  6217
W   122A  00BA  44C3           SST  TCCERR        STORE IN TCC INPUT ERROR FLAG        TCC03790  6218 #
                00BB    TCCC40 EQU  *                                                  TCC03800  6219
    122B  00BB  CB40           JIS  MSPRTN        RETURN TO MASTER STATUS PROGRAM      TCC03810  6220
                                                                                       TCC03820  6221
                       *       TCC CONSTANTS                                           TCC03830  6222
                       *                                                               TCC03840  6223
    122C  00BC  6AAB   SCLOTA  SCN  D,1.666781    SCALING FACTOR  FOR AOTA,B,C,ATX     TCC03850  6224
    122D  00BD  0800   SCLRTD  SCN  D,.12581      RTD SCALING FACTOR                   TCC03860  6225
    122E  00BE  02B5   SCLTC1  SCN  D,.0196980    TC LINEARIZING CONST BELOW 650 DEG   TCC03870  6226
    122F  00BF  432B   SCLTC2  SCN  D,.0247680    TC LINEARIZING CONST ABOVE 650 DEG   TCC03880  6227
    1230  00C0  3770   TEMBK1  SCN  D,.887.0B11   TEMP BK PT (650 DEG)                 TCC03890  6228
    1231  00C1  0603   RTDAMB  SCN  D,109.2B11    TYPICAL AMB TEMP (80 DEG)         TO TCC03900  6229
                                                  IN CASE OF ERRONEOUS RTD READING     TCC03910  6230
    1232  00C2  0651   INUFT1  SCN  D,99.1B11     RTD NULL TEMP (EQUIV. TO 77 DEGF)    TCC03920  6231
    1233  00C3  3090   TEMBK2  SCN  D,777.86B11   TEMP CALC CONST (570 DEG)            TCC03930  6232
                00C4    TCCEND GEN  TCCSIZ-*      PATCH AREA                           TCC03940  6233
    1234  00C4  E800           DER  0             HALT                                 TCC03950  6234
    1235  00C5  E800                                                                             0
    1236  00C6  E800                                                                             0
    1237  00C7  E800                                                                             0
    1238  00C8  E800                                                                             0
    1239  00C9  E800                                                                             0 #
    123A  00CA  E800                                                                             0
    123B  00CB  E800                                                                             0
    123C  00CC  E800                                                                             0
    123D  00CD  E800                                                                             0
    123E  00CE  E800                                                                             0
    123F  00CF  E800                                                                             0
    1240  00D0  E800                                                                             0
    1241  00D1  E800                                                                             0
    1242  00D2  E800                                                                             0
    1243  00D3  E800                                                                             0
    1244  00D4  E800                                                                             0
    1245  00D5  E800                                                                             0
    1246  00D6  E800                                                                             0
    1247  00D7  E800                                                                             0
    1248  00D8  E800                                                                             0 #
    1249  00D9  E800                                                                             0
    124A  00DA  E800                                                                             0
    124B  00DB  E800                                                                             0
    124C  00DC  E800                                                                             0
    124D  00DD  E800                                                                             0
    124E  00DE  E800                                                                             0
```

```
                *****************************************                    TCA01000 6237
                *                                       *                    TCA01010 6238
                *                                       *                    TCA01020 6239
                *                                       *                    TCA01030 6240
                *                                       *                    TCA01040 6241
                *                                       *                    TCA01050 6242
                *       THERMOCOUPLE  AVERAGING, PROGRAM TCA *                TCA01060 6243
                *                                       *                    TCA01070 6244
                *                                       *                    TCA01080 6245
                *                                       *                    TCA01090 6246
                *                                       *                    TCA01100 6247
                *****************************************                    TCA01110 6248
                                                                             TCA01120 6249
                       OBJ 1                                                 TCA01130 6250
                       INS 2                                                 TCA01140 6251
                * *                                                          TCA01150 6252
                *    EQU/EQL STATEMENTS                                      TCA01160 6253
                * *                                                          TCA01170 6254
       03F6     TCAREG   EQR  RUNWD,#6          TCA RUN FLAG,BIT             TCA01180 6255
       0420     HFLB1    EQR  HFLWRD,#0         HOT SPOT REF BIT             TCA01190 6256
       0430     LFLB1    EQR  LFLWRD,#0         COLD SPOT REF BIT            TCA01200 6257
       04B0     TCMRJB   EQR  TCAMLR,#0         TC MANUAL REJECT REF BIT     TCA01210 6258
       0416     TCAFPT   EQR  TCAFLG,#6         FIRST TC POINT CHECKED       TCA01220 6259
       041A     TCAPSS   EQR  TCAFLG,#A         SECOND PASS FLAG,INT USE ONLY TCA01230 6260
                                                                             TCA01240 6261
                                                                             TCA01250 6262
       0260     TXSUM    EQL  DSTOR6            EXHAUST TEMP SUM             TCA01260 6263
                *TXAVG         AVERAGE EXHAUST TEMP                          TCA01270 6264
       0262     KVAL1    EQL  DSTOR6+2          CORRECTION #1(ATXD-TXAVG)    TCA01280 6265
                *TXSPD         EXHAUST TEMP SPREAD                           TCA01290 6266
                *                                                            TCA01300 6267
                *                                                            TCA01310 6268
       0008     TXAVGN   EQL  SCRT3             NEW EXHAUST AVG              TCA01320 6269
       0009     GTCCT1   EQL  SCRT3+1           GOOD TC COUNTER #1           TCA01330 6270
       000A     GTCCT2   EQL  SCRT3+2           GOOD TC COUNTER #2           TCA01340 6271
       000B     TXMAX    EQL  SCRT3+3           MAX EXHAUST TEMP             TCA01350 6272
       000C     TXMIN    EQL  SCRT3+4           MIN EXHAUST TEMP             TCA01360 6273
       000D     TEM61    EQL  SCR12             TCA01370 6274
       0001     TEM62    EQL  SCR12+1           TCA01380 6275
       0002     TEM63    EQL  SCR12+2           TCA01390 6276
       0003     TEM64    EQL  SCR12+3           TCA01400 6277
       0004     TEM65    EQL  SCR12+4           TCA01410 6278
                * *                                                          TCA01420 6279
                *    SYSTEM SYMBOLS                                          TCA01430 6280
                * *                                                          TCA01440 6281
                *ATCX1D    DSTOR5       COMP,LINEARIZED,TEMP RDGS            TCA01450 6282

025F     ATXD     EQL  DSTOR5+#F         TEMP MID VALUE               TCA01460 6283
                *TMERWD        TC READING ERROR MAP                          TCA01470 6284
                *TCERRT        TMERWD,#0    TC READING ERROR REF BIT         TCA01480 6285
                *TCAMLR        TC MANUAL REJECT MAP                          TCA01490 6286
                *LFLWRD        COLD SPOT MAP                                 TCA01500 6287
                *HFLWRD        HOT SPOT MAP                                  TCA01510 6288
                *TCASPD        EXCESSIVE TEMP SPREAD                         TCA01520 6289
                *TCACS         COLD SPOT                                     TCA01530 6290
                *TCAHS         HOT SPOT                                      TCA01540 6291
                *TCAICN        EXCESSIVE TEMP'S OUT OF LIMITS                TCA01550 6292
                *TCAAVG        EXCESSIVE CHANGE IN TX AVG                    TCA01560 6293
                *TCAABT        TEMP SYSTEM ABORT                             TCA01570 6294
                *TCAMRJ        TEMP MANUAL REJECT FLAG                       TCA01580 6295
                *TCAMXB        MAX TEMP READING EXCEEDS LIMIT                TCA01590 6296
                * * *                                                        TCA01600 6297
                *                                                            TCA01610 6298
                *    TCA PROGRAM STARTS HERE                                 TCA01620 6299
                *                                                            TCA01630 6300
                * * *                                                        TCA01640 6301
 1280 0000 0000          ORG  TCASRI,A          ORIGINATION STATEMENT        TCA01650 6302
      0000     TCAA01   EQL  *                                               TCA01660 6303
 1280 0000 F800          CLR                                                 TCA01670 6304
 1281 0001 43F6          SST  TCAREG            CLEAR TCA RUN FLAG           TCA01680 6305
 1282 0002 C040          BRU  TCAP01            JUMP TO PATCH AREA           TCA01690 6306
W 1283 0003 737E TCAA05  LAN  CON14                                          TCA01700 6307
 1284 0004 8005          SAN  XII               SET INDEX                    TCA01710 6308
W 1285 0005 737F         LAN  CON15                                          TCA01720 6309
 1286 0006 8009          SAN  GTCCT1            INIT GOOD TC COUNTER #1      TCA01730 6310
 1287 0007 800A          SAN  GTCCT2            INIT GOOD TC COUNTER #2      TCA01740 6311
W 1288 0008 7370         LAN  ZERO                                           TCA01750 6312
 1289 0009 8260          SAN  TXSUM             INIT TX SUMMING STORAGE WORD TCA01760 6313
 128A 000A 8042          SAN  HFLWRD            HOT FLAG WORD                TCA01770 6314
 128B 000B 8043          SAN  LFLWRD            COLD FLAG WORD               TCA01780 6315
 128C 000C F900          SIR                                                 TCA01790 6316
W 128D 000D 4416         SST  TCAFPT                                         TCA01800 6317
      000E     TCAA10   EQL  *                                               TCA01810 6318
W 128E 000F 3C00         LAT  TCERRT,X          TEST ERROR BIT               TCA01820 6319
 128F 000F B812          BRC  **3               POINT IS CORRECT             TCA01830 6320
 1290 0010 F809          DMR  GTCCT1                                         TCA01840 6321
 1291 0011 C02F          BRU  TCAA15                                         TCA01850 6322
W 1292 0012 3C09         LAT  TCMRJB,X          TEST FOR MANUAL REJECT       TCA01860 6323
 1293 0013 B817          BRC  **4               TC NOT REJECTED              TCA01870 6324
W 1294 0014 4418         SST  TCAMRJ            SET TC MANUAL REJ FLAG       TCA01880 6325
 1295 0015 E809          DMR  GTCCT1            DECREMENT GOOD TC COUNTER    TCA01890 6326
 1296 0016 C02F          BRU  TCAA15                                         TCA01900 6327
 1297 0017 7650          LAN  ATCX1D,X          COMP,LINEAR,TC READING       TCA01910 6328
```

THERMOCOUPLE AVERAGING—Continued

```
     1298 001B 8000            SAN  TEM61                                      TCA01920 6329
W    1299 0019 3416            LAT  TCAFPT         FIRST GOOD POINT            TCA01930 6330
     129A 001A B81F            BRC  **5            NO                          TCA01940 6331
     129B 001B 800B            SAN  TXMAX                                      TCA01950 6332
     129C 001C 800C            SAN  TXMIN                                      TCA01960 6333
     129D 001D F800            CLR                                             TCA01970 6334
W    129E 001E 4416            SST  TCAFPT         CLEAR FIRST GOOD PT. FLAG   TCA01980 6335
     129F 001F 90DC            SUB  TXMIN                                      TCA01990 6336 #
     12A0 0020 F880            TGR                                             TCA02000 6337
     12A1 0021 0024            BRS  **3            POS=NO CHANGE IN DATA       TCA02010 6338
     12A2 0022 70D0            LAN  TEM61                                      TCA02020 6339
     12A3 0023 800C            SAN  TXMIN          NEW MIN TX                  TCA02030 6340
     12A4 0024 70DB            LAN  TXMAX                                      TCA02040 6341
     12A5 0025 90D0            SUB  TEM61                                      TCA02050 6342
     12A6 0026 F880            TGR                                             TCA02060 6343
     12A7 0027 002A            BRS  **3            POS=NO CHANGE IN DATA       TCA02070 6344
     12A8 0028 70D0            LAN  TEM61                                      TCA02080 6345
     12A9 0029 800B            SAN  TXMAX          NEW MAX TX                  TCA02090 6346
     12AA 002A 70D0            LAN  TEM61                                      TCA02100 6347
     12AB 002B F808            TAM                                             TCA02110 6348
     12AC 002C F004            SRR  4              B15 NUMBER                  TCA02120 6349
     12AD 002D 9A60            ADD  TXSUM                                      TCA02130 6350
     12AE 002E 8260            SAN  TXSUM                                      TCA02140 6351 #
          002F       TCAA15    EQU  *                                          TCA02150 6352
     12AF 002F F865            DMR  XD             DECREMENT INDEX             TCA02160 6353
     12B0 0030 D00E            BRS  TCAA10         FINISHED TEST,NO=RETURN TO TCAA10  TCA02170 6354
     12B1 0031 ABB5            LAP  LTXMAX         MAX TEMP LIMIT              TCA02180 6355
     12B2 0032 90DB            SUB  TXMAX          MAX TEMP READING            TCA02190 6356
     12B3 0033 F808            TAM                                             TCA02200 6357
W    12B4 0034 4419            SST  TCAMXR         SET FLAG IF MAX TEMP EXCESSIVE  TCA02210 6358
                                                                               TCA02220 6359
                        *  DETERMINE NEW TX AVG ,TXAVGN                        TCA02230 6360
                        *                                                      TCA02240 6361
          0035       TCAA20    EQU  *                                          TCA02250 6362
W    12B5 0035 7370            LAN  ZERO                                       TCA02260 6363
     12B6 0036 8001            SAN  TEM62                                      TCA02270 6364
     12B7 0037 7260            LAN  TXSUM          B15                         TCA02280 6365
     12B8 0038 80D0            SAN  TEM61                                      TCA02290 6366
     12B9 0039 70D9            LAN  GICCT1         B15                         TCA02300 6367
     12BA 003A E005            SRC  5              B4                          TCA02310 6368
     12BB 003B 80D2            SAN  TEM63                                      TCA02320 6369
     12BC 003C CB53            ESC  .DVD                                       TCA02330 6370
     12BD 003D 00D0            PIN  TEM61                                      TCA02340 6371 #
     12BE 003E 00D2            PIN  TEM63                                      TCA02350 6372
     12BF 003F 00D3            PIN  TEM64                                      TCA02360 6373
     12C0 0040 70D4            LAN  TEM65          B11                         TCA02370 6374

12C1 0041 8008            SAN  TXAVGN         B11                         TCA02380 6375
                                                                               TCA02390 6376
                        *CHECK FOR EXCESSIVE SPREAD BETWEEN TXMIN AND TXMAX    TCA02400 6377
                        *                                                      TCA02410 6378
          0042       TCAA30    EQU  *                                          TCA02420 6379
     12C2 0042 ABB1            LAP  LTXSPD         TEMP SPREAD LIMIT           TCA02430 6380
     12C3 0043 80D0            SAN  TEM61                                      TCA02440 6381
     12C4 0044 70DB            LAN  TXMAX          TX MAX RDG                  TCA02450 6382
     12C5 0045 90DC            SUB  TXMIN          TX MIN RDG                  TCA02460 6383
     12C6 0046 C054            BRU  TCAP07         JUMP TO PATCH AREA          TCA02470 6384
          12C7 0047 90D0  TCAA31  SUB  TEM61       TEMP SPREAD LIMIT           TCA02480 6385
     12C8 0048 F880            TGR                 POS=EXCESSIVE SPREAD        TCA02490 6386
     12C9 0049 004F            BRS  **6            EXCESSIVE SPREAD            TCA02500 6387
W    12CA 004A 4410            SST  TCASPD         CLEAR EXCESSIVE SPREAD FG   TCA02510 6388
W    12CB 004B 4413            SST  TCATCN         CLEAR EXCESSIVE TC'S OUT OF LIMIT FG  TCA02520 6389
W    12CC 004C 4412            SST  TCAHS          CLEAR HOT SPOT FG           TCA02530 6390 #
W    12CD 004D 4411            SST  TCACS          CLEAR COLD SPOT FG          TCA02540 6391
     12CE 004E C04C            BRU  TCAP04         JUMP TO PATCH AREA          TCA02550 6392
W    12CF 004F 4410  TCAA32    SST  TCASPD         SET EXCESSIVE SPREAD FLAG   TCA02560 6393
                                                                               TCA02570 6394
                        *  SET-UP OUT OF LIMITS MAPS,HFWRD,LFWRD,ACCUMULATE    TCA02580 6395
                        *       TXSUM,COUNT GOOD TC READINGS                   TCA02590 6396
          0050       TCAB10    EQU  *                                          TCA02600 6397
W    12D0 0050 7370            LAN  ZERO                                       TCA02610 6398
     12D1 0051 8260            SAN  TXSUM                                      TCA02620 6399
W    12D2 0052 737E            LAN  CON14                                      TCA02630 6400
     12D3 0053 8005            SAN  XD             SET UP INDEX                TCA02640 6401
W    12D4 0054 737F            LAN  CON15                                      TCA02650 6402
     12D5 0055 C04E            BRU  TCAP05         JUMP TO PATCH AREA          TCA02660 6403
     12D6 0056 AB62            TCAP15 LAP  LTXDF1  ALLOWABLE TEMP DIFF         TCA02670 6404
     12D7 0057 98D8            ADD  TXAVGN                                     TCA02680 6405
     12D8 0058 80D0            SAN  TEM61          UPPER LIMIT                 TCA02690 6406
     12D9 0059 AB63            LAP  LTXDF2                                     TCA02700 6407
     12DA 005A 80D1            SAN  TEM62                                      TCA02710 6408
     12DB 005B 70D8            LAN  TXAVGN                                     TCA02720 6409 #
     12DC 005C 90D1            SUB  TEM62                                      TCA02730 6410
     12DD 005D 80D1            SAN  TEM62          LOWER LIMIT                 TCA02740 6411
                        *  ENTERING LOOP TO CHECK TC                           TCA02750 6412
                        *  READINGS AGAINST LOWER,UPPER LIMITS                 TCA02760 6413
          005E       TCAB20    EQU  *                                          TCA02770 6414
     12DE 005E F800            CLR                                             TCA02780 6415
W    12DF 005F 3CD0            LAT  TCERR1,X       TC READING ERROR FLAG BIT   TCA02790 6416
     12E0 0060 B864            BRC  **4            READING CORRECT             TCA02800 6417
     12E1 0061 E8D9            DMR  G1CCT1         DECREMENT COUNTER#1         TCA02810 6418
     12E2 0062 E8DA            DMR  G1CCT2         DECREMENT COUNTER#2         TCA02820 6419
     12E3 0063 C070            BRU  TCAB30                                     TCA02830 6420
```

THERMOCOUPLE AVERAGING—Continued

```
         12E4 0064 3C80            LAT  TEMRJR,X        TC MANUAL REJECT FLAG              TCA02840 6421
         12E5 0065 B869            BKC  *+4                                                TCA02850 6422
         12E6 0066 E8D9            DMR  GTCCT1          DECREMENT COUNTER#1                TCA02860 6423
         12E7 0067 E8DA            DMR  GTCCT2          DECREMENT COUNTER#2                TCA02870 6424
         12E8 0068 C07D             BRU TCAB30                                             TCA02880 6425
         12E9 0069 7650            LAN  ATCX1R,X        TC READING                         TCA02890 6426
         12EA 006A 80D2            SAN  TEM63                                              TCA02900 6427  #
         12EB 006B C05L            BRU  TCAP06          JUMP TO PATCH AREA                 TCA02910 6428
         12EC 006C E880 TCAB22     TGR                                                     TCA02920 6429
W        12ED 006D 4C30            SST  LILBT,X                                            TCA02930 6430
         12EE 006E 6872            BKC  *+4             READING IS WITHIN LOWER LIMIT      TCA02940 6431
         12EF 006F E8D9            DMR  GTCCT1          DECREMENT COUNTER #1               TCA02950 6432
         12F0 0070 E8DA            DMR  GTCCT2          DECREMENT COUNTER #2               TCA02960 6433
         12F1 0071 C07D             BRU TCAB30                                             TCA02970 6434
         12F2 0072 70D2            LAN  TEM63           TC READING                         TCA02980 6435
         12F3 0073 90D0            SUB  TEM61           UPPER LIMIT                        TCA02990 6436
         12F4 0074 E880            TGR                  POS=OUT OF LIMIT                   TCA03000 6437
W        12F5 0075 4C20            SST  HILBT,X                                            TCA03010 6438
         12F6 0076 H878            BKC  *+2                                                TCA03020 6439
         12F7 0077 E8D9            DMR  GTCCT1          DECREMENT COUNTER                  TCA03030 6440
                      *ACCUMMULATE SUM                                                     TCA03040 6441
              007B TCAB25 EQL  *                                                           TCA03050 6442
         12F8 007B 70D2            LAN  TEM63           B11                                TCA03060 6443
         12F9 0079 F808            TAM                                                     TCA03070 6444  #
         12FA 007A F004            SKR  4               B15                                TCA03080 6445
         12FB 007B 9A60            ADD  TXSUM                                              TCA03090 6446
         12FC 007C 8260            SAN  TXSUM                                              TCA03100 6447
              007D TCAB30 EQL  *                                                           TCA03110 6448
         12FD 007D E805            DMR  XD                                                 TCA03120 6449
         12FE 007E D05E            BRS  TCAB20          CHECK FOR FINISH                   TCA03130 6450
                                                                                           TCA03140 6451
                      *  CHECK FOR HOT/COLD SPOTS                                          TCA03150 6452
                      *                                                                    TCA03160 6453
              007F TCAC10 EQL  *                                                           TCA03170 6454
         12FF 007F C08A            BPU  TCAC40                                             TCA03180 6455
         1300 0080 9801 TCAC11     ADD  BP              ADD PROCEDURE BASE                 TCA03190 6456
         1301 0081 80D4            SAN  TEM65                                              TCA03200 6457
         1302 0082 70D3            LAN  LFLWRD          COLD TC MAP                        TCA03210 6458
         1303 0083 80D0            SAN  TEM61                                              TCA03220 6459
         1304 0084 C8D4            JIS  TEM65           JUMP TO ADDRESS CONTAINED IN TEM65 TCA03230 6460
W        1305 0085 4411            SST  TCACS           STORE IN COLD SPOT FLAG            TCA03240 6461
              0086 TCAC20 EQL  *                                                           TCA03250 6462
         1306 0086 70D2            LAN  HILWPD          HOT SPOT MAP                       TCA03260 6463
         1307 0087 80D0            SAN  TEM61                                              TCA03270 6464
         1308 0088 C8D4            JIS  TEM65           JUMP TO ADDRESS CONTAINED IN TEM65 TCA03280 6465  #
         1309 0089 C04B            BRU  TCAP03                                             TCA03290 6466

TCA03300 6467
                      *  CALC NEW TXAVG                                                    TCA03310 6468
                      *                                                                    TCA03320 6469
              008A TCAC40 EQL  *                                                           TCA03330 6470
W        130A 008A 7370            LAN  ZERO                                               TCA03340 6471
         130B 008B 80D1            SAN  TEM62                                              TCA03350 6472
         130C 008C 7260            LAN  TXSUM           B15                                TCA03360 6473
         130D 008D 80D0            SAN  TEM61                                              TCA03370 6474
         130E 008E 70DA            LAN  GTCCT2          B15,GOOD TC COUNTER                TCA03380 6475
         130F 008F E005            SKC  5               B4                                 TCA03390 6476
         1310 0090 80D2            SAN  TEM63                                              TCA03400 6477  ..
         1311 0091 CR53            FSC  .DVD                                               TCA03410 6478
         1312 0092 00D0            PTN  TEM61                                              TCA03420 6479
         1313 0093 00D2            PTN  TEM63                                              TCA03430 6480
         1314 0094 00D3            PIN  TEM64                                              TCA03440 6481
         1315 0095 70D4            LAN  TEM65           B11,NEW AVG                        TCA03450 6482
         1316 0096 80D8            SAN  TXAVGN                                             TCA03460 6483 ..
                                                                                           TCA03470 6484  #
                      *CHECK FOR MIN # OF TC WITHIN LIMITS                                 TCA03480 6485
                      *                                                                    TCA03490 6486
              0097 TCAC50 EQL  *                                                           TCA03500 6487
         1317 0097 C044            BRU  TCAP02          JUMP TO PATCH AREA                 TCA03510 6488
         1318 0098 90D9 TCAC51     SUB  GICCT1          TC'S WITHIN LIMITS                 TCA03520 6489
         1319 0099 F880            TGR                  POS=TROUBLE                        TCA03530 6490
W        131A 009A 4413            SST  TCATCN          EXCESSIVE # OF TC'S OUT OF LIMITS  TCA03540 6491
                                                                                           TCA03550 6492
                      *CHECK FOR EXCESSIVE CHANGE IN AVG TX                                TCA03560 6493
              009B TCAC55 EQL  *                                                           TCA03570 6494
         131B 009B A8D4            LAP  LIXAVG          LIMIT OF CHANGE IN AVG TX          TCA03580 6495
         131C 009C 80D0            SAN  TEM61                                              TCA03590 6496
         131D 009D 70D8            LAN  TXAVGN          NEW AVG                            TCA03600 6497
         131E 009E 9166            SUR  TXAVG           OLD AVG,PREVIOUS PASS              TCA03610 6498
         131F 009F F808            TAM                                                     TCA03620 6499
         1320 00A0 8845            BKC  *+5             IF POSITIVE                        TCA03630 6500
         1321 00A1 9BD0            ALD  TEM61           DIFF LIMIT                         TCA03640 6501
         1322 00A2 F808            TAM                  NEG=EXCESSIVE DIFF                 TCA03650 6502
W        1323 00A3 4414            SST  TCAAVG          EXCESSIVE TXAVG DIFF FLAG          TCA03660 6503
         1324 00A4 C0A8            BRU  TCAC60                                             TCA03670 6504
         1325 00A5 90D0            SUB  TEM61                                              TCA03680 6505
         1326 00A6 F880            TGR                  POS=EXCESSIVE DIFF                 TCA03690 6506 #
W        1327 00A7 4414            SST  TCAAVG          EXCESSIVE DIFF FLAG                TCA03700 6507
                                                                                           TCA03710 6508
                      *  STORE NEW AVG,CALC CORRECTION,KVAL, AND CHECK FOR OVERFLOW        TCA03720 6509
                                                                                           TCA03730 6510
              00A8 TCAC60 EQL  *                                                           TCA03740 6511
         1328 00A8 70D8            LAN  TXAVGN          B11                                TCA03750 6512
```

THERMOCOUPLE AVERAGING—Continued

```
W   1329 00A9 8166            SAN TXAVG                                                          TCA03760 6513
W   132A 00AA 725F            LAN ATXD                                                           TCA03770 6514
    132B 00AB 9166            SUR TXAVG                                                          TCA03780 6515
    132C 00AC 8262            SAN KVAL1              CORRECTION FACTOR #1 (ATXD-TXAVG)           TCA03790 6516
    132D 00AD EA00            TOV                    TEST OVERFLOW                               TCA03800 6517
W   132E 00AE 4415            SST TCAART                                                         TCA03810 6518
         00AF            TCAC70 EQU *                                                            TCA03820 6519
    132F 00AF CB40            JIS MSPRTN             RETURN TO MASTER STATUS                     TCA03830 6520
                                                                                                 TCA03840 6521
                            *  TCA CONSTANTS                                                     TCA03850 6522
                                                                                                 TCA03860 6523
    1350 00B0 0009            MINTCP CON 9           MIN NUMBER OF TC'S ALLOWED TO BE REJECT     TCA03870 6524
    1351 00B1 05FB            LTXSPD SCN 0.95.53B13  LIMIT,EXHAUST TEMP SPREAD=70 DEG F          TCA03880 6525
    1352 00B2 0443            LTXDF1 SCN 0.68.23B13  LIMIT,TC DEV FROM AVG,UPPER=50 DEG F        TCA03890 6526
    1353 00B3 0443            LTXDF2 SCN 0.68.23B13  LIMIT,TC DEV FROM AVG,LOWER=50 DEG F        TCA03900 6527
    1354 00B4 0221            LTXAVG SCN 0.34.12B13  LIMIT,CHANGE IN TEMP AVG =25 DEG F          TCA03910 6528
    1355 00B5 6600            LTXMAX SCN 0.1638B11   LIMIT,MAX TEMP READING =1200 DEG F          TCA03920 6529
    1356 00B6 00B7            TCASBP CON TCASUB      ADDRESS OF LOCAL SUBROUTINE                 TCA03930 6530
                                                                                                 TCA03940 6531
                            *  COLD/HOT SPOT SEARCHING SUB-ROUTINE                               TCA03950 6532
                                                                                                 TCA03960 6533
         00B7            TCASUB EQU *                                                            TCA03970 6534
    1357 0000 0000            ORG TCASR1+TCASUB,A                                                TCA03980 6535
W   1357 0000 737C            LAN TWELVE                                                         TCA03990 6536
    1358 0001 8005            SAN XD                 SET UP INDEX                                TCA04000 6537
                            *SHUFFLE BITS TO GIVE CORRECT SEQ AROUND THE EXH PLENUM              TCA04010 6538
    1359 0002 70B0            LAN TEM61                                                          TCA04020 6539
    135A 0003 A373            ANA THREE                                                          TCA04030 6540
    135B 0004 80B1            SAN TEM62              TC FLAGS  2,1                               TCA04040 6541
    135C 0005 70B0            LAN TEM61                                                          TCA04050 6542
    135D 0006 E00C            SFC 12                                                             TCA04060 6543
    135E 0007 A377            ANA SEVEN                                                          TCA04070 6544
    135F 0008 80B2            SAN TEM63                                                          TCA04080 6545
    1340 0009 A371            ANA ONE                                                            TCA04090 6546
    1341 000A E00E            SKC 14                                                             TCA04100 6547
    1342 000B 80B1            ERA TEM62                                                          TCA04110 6548
    1343 000C 80B1            SAN TEM62              TC FLAGS  OTA,2,1                           TCA04120 6549
    1344 000D 70B0            LAN TEM61                                                          TCA04130 6550
    1345 000E E002            SKC 2                                                              TCA04140 6551
    1346 000F A37F            ANA CON15                                                          TCA04150 6552
    1347 0010 E00D            SKC 13                                                             TCA04160 6553
    1348 0011 80B1            ERA TEM62                                                          TCA04170 6554
    1349 0012 80B1            SAN TEM62              FLAG 6,5,4,3,OTA,2,1                        TCA04180 6555
    134A 0013 70B2            LAN TEM63                                                          TCA04190 6556
    134B 0014 A372            ANA TWO                                                            TCA04200 6557
    134C 0015 E00A            SKC 10                                                             TCA04210 6558

134D 0016 80B1            ERA TEM62                                                          TCA04220 6559
    134E 0017 80B1            SAN TEM62              FLAGS OTB,6,5,4,3,OTA,2,1                   TCA04230 6560
    134F 0018 70B0            LAN TEM61                                                          TCA04240 6561
    1350 0019 E006            SFC 6                                                              TCA04250 6562
    1351 001A A37E            ANA CON15                                                          TCA04260 6563
    1352 001B E008            SKC 8                                                              TCA04270 6564
    1353 001C 80B1            ERA TEM62                                                          TCA04280 6565
    1354 001D 80B1            SAN TEM62              FLAGS 10,9,8,7,OTB,6,5,4,3,OTA,2,1          TCA04290 6566
    1355 001E 70B2            LAN TEM63                                                          TCA04300 6567
    1356 001F A374            ANA FOUR                                                           TCA04310 6568
    1357 0020 E006            SPC 6                                                              TCA04320 6569
    1358 0021 80B1            ERA TEM62                                                          TCA04330 6570
    1359 0022 80B1            SAN TEM62              FLAGS OTC,10,9,8,7,OTB,6,5,4,3,OTA,2,1      TCA04340 6571
    135A 0023 70B0            LAN TEM61                                                          TCA04350 6572
    135B 0024 E00A            SKC 10                                                             TCA04360 6573
    135C 0025 A373            ANA THREE                                                          TCA04370 6574
    135D 0026 E003            SKC 3                                                              TCA04380 6575
    135E 0027 80B1            ERA TEM62                                                          TCA04390 6576
    135F 0028 8000            SAN TEM61              FLAGS 12,11,OTC,10,9,8,7, ETC               TCA04400 6577
                            *CHECK FOR COLD/HOT SPOT PATTERN                                     TCA04410 6578
         0029            TCAD10 EQU *                                                            TCA04420 6579
W   1360 0029 737C            LAN TWELVE                                                         TCA04430 6580
    1361 002A 8005            SAN XD                 SET UP INDEX                                TCA04440 6581
    1362 002B 70B0            LAN TEM61                                                          TCA04450 6582
    1363 002C A377        TCAD20 ANA SEVEN                                                       TCA04460 6583
    1364 002D 8377            ERA SEVEN                                                          TCA04470 6584
    1365 002E F840            TEQ                    ZERO=3 ADJACENT TC'S OUT OF LIMITS          TCA04480 6585
    1366 002F 003E            BKS TCAD30             YES                                         TCA04490 6586
    1367 0030 70B0            LAN TEM61                                                          TCA04500 6587
    1368 0031 E001            SPC 1                                                              TCA04510 6588
    1369 0032 8000            SAN TEM61                                                          TCA04520 6589
    136A 0033 E805            BNR XD                                                             TCA04530 6590
    136B 0034 002C            BKS TCAD20             CHECK FOR FINISH                            TCA04540 6591
    136C 0035 A37B            ANA ELEVEN                                                         TCA04550 6592
    136D 0036 837B            ERA ELEVEN                                                         TCA04560 6593
    136E 0037 F840            TEQ                    ZERO=3 ADJACENT TC'S OUT OF LIMITS          TCA04570 6594
    136F 0038 003E            BKS TCAD30             YES                                         TCA04580 6595
    1370 0039 70B0            LAN TEM61                                                          TCA04590 6596
    1371 003A E001            SKC 1                                                              TCA04600 6597
    1372 003B A37D            ANA CON13                                                          TCA04610 6598
    1373 003C 837D            ERA CON13                                                          TCA04620 6599
    1374 003D F840            TEQ                    ZERO=3 ADJACENT TC'S OUT OF LIMITS          TCA04630 6600
    1375 003E 0806        TCAD30 JIR R6              RETURN TO MAIN PROGRAM                      TCA04640 6601
                            *  TCA PATCH AREA                                                    TCA04650 6602
                                                                                                 TCA04660 6603
    1376 003F E800            BNR P                  HALT                                        TCA04670 6604
```

THERMOCOUPLE AVERAGING—Continued

```
W   1377 0040 4418       TCAP01 SST TCAMRJ        TC MANUAL REJECT FLAG              TCA04680 6605
W   1378 0041 441A              SST TCAPSS        SECOND PASS FLAG                   TCA04690 6606
    1379 0042 C003              BRU TCAA05                                           TCA04700 6607
    137A 0043 E800              DMR P                                                TCA04710 6608
W   137B 0044 541A       TCAP02 LAT TCAPSS        SECOND PASS FLAG                   TCA04720 6609
    137C 0045 D049              BRS *+4                                              TCA04730 6610
    137D 0046 F900              SIR                                                  TCA04740 6611 #
W   137E 0047 441A              SST TCAPSS        SET SECOND PASS FLAG               TCA04750 6612
    137F 0048 C050              BRU TCAB10                                           TCA04760 6613
    1380 0049 A8B6              LAP TCASHP        LOAD RELATIVE PTR TO SUBROUTINE    TCA04770 6614
    1381 004A C080              BRU TCAC11                                           TCA04780 6615
W   1382 004B 4412       TCAP03 SST TCAHS         STORE IN HOT SPOT MAP              TCA04790 6616
    1383 004C A8B0       TCAP04 LAP MINTCR        LOAD MIN # TC'S REQ'D              TCA04800 6617
    1384 004D C09B              BRU TCAC51                                           TCA04810 6618
    1385 004E 80D9       TCAP05 SAN GTCCT1        INIT GOOD TC COUNTER #1            TCA04820 6619
    1386 004F 80DA              SAN GTCCT2        INIT GOOD TC COUNTER #2            TCA04830 6620
    1387 0050 C056              BRU TCAB15                                           TCA04840 6621
    1388 0051 70D1       TCAP06 LAN TEM62         LOWER LIMIT                        TCA04850 6622
    1389 0052 90D2              SUB TEM63         TC RDG                             TCA04860 6623
    138A 0053 C0CC              BRU TCAB22        JUMP BACK                          TCA04870 6624
    138B 0054 F808       TCAP07 TAM               NEG=OVERFLOW                       TCA04880 6625
    138C 0055 D859              BRC *+4           POS=NORMAL                         TCA04890 6626 #
W   138D 0056 73D9              LAN MSKR15        USE LARGEST #                      TCA04900 6627
W   138E 0057 8167              SAN TXSPD         1X SPREAD                          TCA04910 6628
    138F 0058 C04F              BRU TCAA32                                           TCA04920 6629
W   1390 0059 8167              SAN TXSPD         1X SPREAD                          TCA04930 6630
    1391 005A C047              BRU TCAA31                                           TCA04940 6631
         0112              TCAEND EQU **TCASUM                                       TCA04950 6632
         005E                     GLN TCASIZ-TCAEND                                  TCA04960 6633
    1392 005B F800              DMR P                                                TCA04970 6634
    1393 005C E800                                                                         0
    1394 005D F800                                                                         0
    1395 005E F800                                                                         0
    1396 005F F800                                                                         0
    1397 0060 E800                                                                         0
    1398 0061 E800                                                                         0
    1399 0062 F800                                                                         0
    139A 0063 F800                                                                         0
    139B 0064 F800                                                                         0
    139C 0065 E800                                                                         0 #
    139D 0066 E800                                                                         0
    139E 0067 E800                                                                         0
    139F 0068 F800                                                                         0
    13A0 0069 F800                                                                         0
    13A1 006A E800                                                                         0
    13A2 006B F800                                                                         0
```

```
                                                                                    PPR01000 6636
                                                                                    PPR01010 6637
                                                                                    PPR01020 6638
        *                                                                           PPR01030 6639
        * * * * * * * * * * * * * * * * * * * * * * * * * * * * * * * * * * *      PPR01040 6640
        *                                                                  *        PPR01050 6641
        *       TEMPERATURE  TRIMMING  PROGRAM , PPR                       *        PPR01060 6642
        *                                                                  *        PPR01070 6643
        *                                                                           PPR01080 6644
                                                                                    PPR01090 6645
        * * * * * * * * * * * * * * * * * * * * * * * * * * * * * * * * *           PPR01100 6646
                      OBJ 1                                                         PPR01110 6647
                      INS 2                                                         PPR01120 6648
        * * *                                                                       PPR01130 6649
        *                                                                           PPR01140 6650
        *       EQU/EQL STATEMENTS -                                                PPR01150 6651
        03F7      PPRFL  EQU RUNWD,#7            PPR RUN FLAG                       PPR01160 6652
        0475      PPRTMP EQU PPRFLG,#5           TEMP TRIM POLARITY FLAG            PPR01170 6653
        0477      PPROV  EQU PPRFLG,#7           PPR TRIM SATURATION (FOUR BITS)    PPR01180 6654
        *                 PPRFLG,#7 INDICATES TRIM SATURATION,TEMP CONTROL          PPR01190 6655
        *                 PPRFLG,#8 INDICATES TRIM SATURATION,INLET GUIDE VANES     PPR01200 6656
        *                 PPRFLG,#9 INDICATES TRIM SATURATION,OT,CHANNEL A          PPR01210 6657
        *                 PPRFLG,#A INDICATES TRIM SATURATION,OT,CHANNEL B          PPR01220 6658
        047D      WPPR   EQU PPRFLG,#D           WARM UP FLAG,CLEARED WHEN W.U. COMPLETE PPR01230 6659
        03C0      PPRFL1 EQU OPTWD0,#0           TEMP BIAS OPTION,1=VCE TYPE BIAS   PPR01240 6660
        *       LOCAL EQL'S - SCRATCH AND DEDICATED STORAGE                         PPR01250 6661
        *                                                                           PPR01260 6662
        00B8      TEM71  EQL SCRT3                                                  PPR01270 6663
        00B9      TEM72  EQL SCRT3+1                                                PPR01280 6664
        00BA      TEM73  EQL SCRT3+2                                                PPR01290 6665
        00BB      TEM74  EQL SCRT3+3                                                PPR01300 6666
        00BC      TEM75  EQL SCRT3+4                                                PPR01310 6667
        00D4      TALARM EQL SCRT2+4             CALC ALARM PT                      PPR01320 6668
        00D5      TTRIP  EQL SCRT2+5             CALC TEMP TRIP                     PPR01330 6669
        00C8      TEM76  EQL SCRT1                                                  PPR01340 6670
        00C9      TEM77  EQL SCRT1+1                                                PPR01350 6671
        00CC      TREFS  EQL SCRT1+4             SCALED ATREF   (TEMP REF)          PPR01360 6672
        00CD      OTRFAS EQL SCRT1+5             SCALED AOTRFA  (OT REF )           PPR01370 6673
        00CE      OTRFBS EQL SCRT1+6             SCALED AOTRFB  (OT REF )           PPR01380 6674
        00CA      TEM78  EQL SCRT1+2                                                PPR01390 6675
        00CB      TEM79  EQL SCRT1+3                                                PPR01400 6676
        0270      IPPR   EQL DSTOR7              DLC PASS COUNTER                   PPR01410 6677
        0271      DFLSU  EQL DSTOR7+1            START UP RAMP                      PPR01420 6678
        0272      DFLR2  EQL DSTOR7+2            PK,PK RES CONTROL RAMP             PPR01430 6679
        0273      DFLC   EQL DSTOR7+3            AMBIENT BIAS                       PPR01440 6680
        0274      DFLR4  EQL DSTOR7+4            PK RES TRIP RAMP                   PPR01450 6681
```

TEMPERATURE TRIMMING PROGRAM, PPR—Continued

```
         0275      VCEPCD  EQU  DSTOR7+5        VCE OR EQUIV PCD                    PPR01460 6682
         0276      TEMDST  EQU  DSTOR7+6        INTERMED STORAGE FOR BTMTEM         PPR01470 6683
         0277      IGVDST  EQU  DSTOR7+7        INTERMED STORAGE FOR BTMIGV         PPR01480 6684
         0278      OTADST  EQU  DSTOR7+8        INTERMED STORAGE FOR BTMOTA         PPR01490 6685
         0279      OTBDST  EQU  DSTOR7+9        INTERMED STORAGE FOR BTMOTB         PPR01500 6686
         027A      DELR1   EQU  DSTOR7+#A       DELTA CONTROL REF (TBASE-ATREF)     PPR01510 6687
         027B      DELR3A  EQU  DSTOR7+#B       DELTA OT REF,CHAN A(OTBASE-AOTRFA)  PPR01520 6688
         027C      DELR3B  EQU  DSTOR7+#C       DELTA OT REF,CHAN B(OTBASE-AOTRFB)  PPR01530 6689
         027D      KVALR1  EQU  DSTOR7+#D       TEMP CORRECTION RAMP#1,MID VALUE ERROR PPR01540 6690
         027E      KVALR2  EQU  DSTOR7+#E       TEMP CORRECTION RAMP #2,INTEGRATING PPR01550 6691
                  *TEMSP       TEMP SET POINT                                       PPR01560 6692
                  *                                                                 PPR01570 6693
                  *                                                                 PPR01580 6694
                  *    SYSTEM  SYMBOLS                                               PPR01590 6695
                  *                                                                 PPR01600 6696
                  * *                                                               PPR01610 6697
                  *PPRFLG     PPR FLAG WORD                                         PPR01620 6698
                  *DJEDA      PPRFLG,#0  AMBIENT BIAS PROBLEM                       PPR01630 6699
                  *DJEDB      PPRFLG,#1  EXCESSIVE TEMP DIFF(AOTA,B,C,ATX)          PPR01640 6700
                  *DJEDC      PPRFLG,#2  TEMP CORRECTION EXCEEDS LIMIT,LTEMKV       PPR01650 6701
                  *DJEDD      PPRFLG,#3  TEMP CORRECTION EXCEEDS LIMIT,LTEMTP       PPR01660 6702
                  *PP26EA     PPRFLG,#4  TEMP ALARM FLAG                            PPR01670 6703
                  *PPRABT     PPRFLG,#6  PPR PROGRAM OVERFLOW (ABORT)               PPR01680 6704
                  *PPROR2     PPRFLG,#B  PK,PK RES,BIAS EQUALS ZERO                 PPR01690 6705
                  *PPRTEM     PPRFLG,#C  TEMP TRIM EQUALS ZERO                      PPR01700 6706
                  *PPRINH     PPRFLG,#E,CORRECTION RAMP#2 INHIBIT FLAG              PPR01710 6707
                  *PPRLKV     PPRFLG,#F,CORRECTION RAMP#2 IN SATURATION FLAG        PPR01720 6708
                  *                                                                 PPR01730 6709
                  *     .KPY                                                        PPR01740 6710
                  *     .DLA                                                        PPR01750 6711
                  *     ZERO                                                        PPR01760 6712
                  *     ONE                                                         PPR01770 6713
                  *L261C      TEMP CONT MODE                                        PPR01780 6714
                  *          CON15                                                  PPR01790 6715
                  *          DIMABT   TEMP SYSTEM ABORT FROM SEQUENCING             PPR01800 6716
                  *D26FT      OVERTEMP SHUTDOWN                                     PPR01810 6717
                  *D2WX       WARM UP COMPLETE                                      PPR01820 6718
                  *DPK        PEAK                                                  PPR01830 6719
                  *DPR        PEAK RES                                              PPR01840 6720
                  *AVCE                          VCE INPUT ---0 TO 12 VDC           PPR01850 6721
                  *APCD                          PCD INPUT ---0 TO 5 VDC            PPR01860 6722
                  *ATREF                         INPUT,TEMP REF                     PPR01870 6723
                  *          AOTRFA  INPUT,OT REF,CHAN A                            PPR01880 6724
                  *          AOTRFB  INPUT,OT REF,CHAN B                            PPR01890 6725
                  *          BTMTEM  OUTPUT,TEMP CONTROL BIAS                       PPR01900 6726
                  *          BTMIGV  OUTPUT,IGV BIAS                                PPR01910 6727

*          BTMOTA  OUTPUT,OT TRIP BIAS,CHAN A                     PPR01920 6728
                  *          BTMOTB  OUTPUT,OT TRIP BIAS, CHAN B                    PPR01930 6729
                  *          TXAVG   TEMP AVERAGE FROM TCA                          PPR01940 6730
                  *          KVAL1   TEMP CORRECTION FACTOR #1,FROM TCA             PPR01950 6731
                  *          RUNWD            RUN WORD                              PPR01960 6732
                  *          OPTWD0,#0        OPTION WORD                           PPR01970 6733
                  *          MSKL12           CONST FFF0                            PPR01980 6734
                  *          PPR CONSTANT POOL  ALL CONSTANTS                       PPR01990 6735
                  *L526X      GEN BKR                                               PPR02000 6736
                  *AUTAD      SCALED OVERTEMP                                       PPR02010 6737
                  * * * *                                                           PPR02020 6738
                                                                                    PPR02030 6739
                  *    PROGRAM , PPR                                                PPR02040 6740
                  *                                                                 PPR02050 6741
                  * * * *                                                           PPR02060 6742
     13D0 0000 0000        ORG PPRSRT,A                                             PPR02070 6743
          0000              PPRA01 EQU *                                            PPR02080 6744
     13D0 0000 F800         CLR                                                     PPR02090 6745
W    13D1 0001 4476         SST PPRABT      CLEAR ABORT FLAG                        PPR02100 6746
     13D2 0002 43F7         SST PPRRFL      PROGRAM RUN FLAG SET TO ZERO            PPR02110 6747
     13D3 0003 7276         LAN TEMDST      TEMP TRIM                               PPR02120 6748
     13D4 0004 F808         TAM                                                     PPR02130 6749
     13D5 0005 0017         BFS PPRA15      BYPASS ABORT IF TEMP LESS THAN ANALOG REF PPR02140 6750
W    13D6 0006 57B1         LAT DIMABT      TEST FOR TEMP SYSTEM ABORT              PPR02150 6751
     13D7 0007 8817         BRC PPRA15      NORMAL ROUTINE                          PPR02160 6752
          0008              PPRA05 EQU *                                            PPR02170 6753
                                                                                    PPR02180 6754
                  * ABORT RAMPING STARTS HERE                                       PPR02190 6755
W    13D8 0008 7371         LAN ONE         USE THREE IF TEMP PROTECTION TRIM IS NEEDED PPR02200 6756
     13D9 0009 8005         SAN XD                                                  PPR02210 6757
          000A              PPRA07 EQU *                                            PPR02220 6758
     13DA 000A 7676         LAN TEMDST,X    LOAD INTERMED STORAGE FOR TRIM          PPR02230 6759
     13DB 000B 9303         SUB CONABT      DECREMENT TRIM                          PPR02240 6760
     13DC 000C F803         TAM                                                     PPR02250 6761
     13DD 000D 0010         BFS PPRA09      IF NEG,GO TO ZERO                       PPR02260 6762
     13DE 000E 8676         SAN TEMDST,X    OTHERWISE USE NEW VALUE                 PPR02270 6763
     13DF 000F C012         BFU PPRA12                                              PPR02280 6764
          0010              PPRA09 EQU *                                            PPR02290 6765
W    13E0 0010 7370         LAN ZERO                                                PPR02300 6766
     13E1 0011 8676         SAN TEMDST,X                                            PPR02310 6767
          0012              PPRA12 EQU *                                            PPR02320 6768
     13E2 0012 F805         DBR XD          FINISHED TEST                           PPR02330 6769
     13E3 0013 008A         BFS PPRA07      NO                                      PPR02340 6770
W    13E4 0014 7370         LAN ZERO                                                PPR02350 6771
     13E5 0015 8272         SAN DLR2        SET PK,PK RES RAMP TO ZERO              PPR02360 6772
     13E6 0016 C140         BKU PPRF50                                              PPR02370 6773
```

TEMPERATURE TRIMMING PROGRAM, PPR—Continued

```
            0017        PPRA15 EQL *                                                PPR02380 6774
                         *                                                           PPR02390 6775
                         *    COMPRESSOR DISCHARGE BIASING SECTION                   PPR02400 6776
                         *                                                           PPR02410 6777
  13E7 0017 33C0         LAT PPREL1        COMPRESSOR DISCHARGE BASED ON VCE         PPR02420 6778
  13E8 0018 881B         BRC **3           NO                                        PPR02430 6779
W 13E9 0019 7101         LAN AVCE          YES,LOAD VCE                              PPR02440 6780
  13EA 001A C02F         BRU PPRA20                                                  PPR02450 6781
W 13EB 001B 7370         LAN ZERO          PCD CONVERSION TO EQUIV VCE BEGINS HERE   PPR02460 6782
  13EC 001C 80DB         SAN TEM71                                                   PPR02470 6783
W 13ED 001D 7104         LAN APCD          LOAD PCD                                  PPR02480 6784
  13EE 001E 80D9         SAN TEM72         B11                                       PPR02490 6785
W 13EF 001F 73C3         LAN PCDGC         LOAD PCD CONVERSION FACTOR                PPR02500 6786
  13F0 0020 80DA         SAN TEM73         B2                                        PPR02510 6787
  13F1 0021 CB52         ESC .MPY                                                    PPR02520 6788
  13F2 0022 00D8         PIN TEM71                                                   PPR02530 6789 #
  13F3 0023 00DA         PIN TEM73                                                   PPR02540 6790
  13F4 0024 00DB         PIN TEM74                                                   PPR02550 6791
  13F5 0025 70DB         LAN TEM74         B13                                       PPR02560 6792
  13F6 0026 A3B3         ANA MSKL3         CHECK FOR OVERFLOW                        PPR02570 6793
  13F7 0027 9370         SUB ZERO                                                    PPR02580 6794
  13F8 0028 F840         TEQ                                                         PPR02590 6795
  13F9 0029 8829         BES **4           SYSTEM CORRECT                            PPR02600 6796
  13FA 002A F900         STR                                                         PPR02610 6797
W 13FB 002B 4470         SST D3EDA         AMB BIAS TROUBLE                          PPR02620 6798
  13FC 002C C140         BRU PPRE50                                                  PPR02630 6799
  13FD 002D 70DB         LAN TEM74         B13                                       PPR02640 6800
  13FE 002E F00F         SRC 14            B11                                       PPR02650 6801
       002E        PPRA20 EQL *                                                      PPR02660 6802
  13FF 002F 8275         SAN VCEPCD        STORE FOR VCE/PCD MIN LEVEL CHECK         PPR02670 6803
  1400 0030 93C4         SUB VCEBK         B11                                       PPR02680 6804
  1401 0031 D035         BES **4           POSITIVE                                  PPR02690 6805 #
W 1402 0032 7370         LAN ZERO                                                    PPR02700 6806
  1403 0033 8273         SAN DELC                                                    PPR02710 6807
  1404 0034 C040         BRU PPRB10                                                  PPR02720 6808
       0035        PPRA30 EQL *            BEGINNING OF BIAS (DELC) CALC             PPR02730 6809
  1405 0035 80D9         SAN TEM72         B11  (VCE-VCEBK)                          PPR02740 6810
W 1406 0036 7370         LAN ZERO                                                    PPR02750 6811
  1407 0037 80D8         SAN TEM71                                                   PPR02760 6812
W 1408 0038 73C5         LAN VCEGNS        B0,(DEG/(VDC VCE * 128)                   PPR02770 6813
  1409 0039 80DA         SAN TEM73                                                   PPR02780 6814
  140A 003A CB52         ESC .MPY                                                    PPR02790 6815
  140B 003B 00D8         PIN TEM71                                                   PPR02800 6816
  140C 003C 00DA         PIN TEM73                                                   PPR02810 6817
  140D 003D 00DB         PIN TEM74                                                   PPR02820 6818
  140E 003E 70DB         LAN TEM74         B11                                       PPR02830 6819
  140F 003F 8273         SAN DELC          B11                                       PPR02840 6820
       0040        PPRB10 EQL *                                                      PPR02850 6821 #
                         *                                                           PPR02860 6822
                         *    CHECK FOR REMAINDER OF PROGRAM BYPASS                  PPR02870 6823
                         *                                                           PPR02880 6824
  1410 0040 7270         LAN IPPR          BYPASS COUNTER                            PPR02890 6825
  1411 0041 9371         SUB ONE                                                     PPR02900 6826
  1412 0042 8270         SAN IPPR                                                    PPR02910 6827
  1413 0043 F808         TAM                                                         PPR02920 6828
  1414 0044 881B         BEC PPRB20                                                  PPR02930 6829
                         *                                                           PPR02940 6830
                         *FROM HERE TO PPRE20 IS ONLY EXECUTED EVERY FIFTH PASS      PPR02950 6831
W 1415 0045 7374         LAN FOUR                                                    PPR02960 6832
  1416 0046 8270         SAN IPPR          RESET BYPASS COUNTER                      PPR02970 6833
       0047        PPRB20 EQL *                                                      PPR02980 6834
                         *                                                           PPR02990 6835
                         *    SET UP DELTA REFERENCES                                PPR03000 6836
                         *                                                           PPR03010 6837
W 1417 0047 7370         LAN ZERO          IF REF AOTREA,AOTREB ARE NEEDED,REVISE ZERPPR03020 6838
  1418 0048 8005         SAN XD                                                      PPR03030 6839
W 1419 0049 7370         LAN ZERO                                                    PPR03040 6840
  141A 004A 80DB         SAN TEM71                                                   PPR03050 6841
W 141B 004B 73D4         LAN SCLREF        B1,TEMP REF SCALING CONST                 PPR03060 6842
  141C 004C 80D9         SAN TEM72                                                   PPR03070 6843
       004D        PPRB25 EQL *                                                      PPR03080 6844
W 141D 004D 7517         LAN ATRLF,X       NEGATIVE NUMBER                           PPR03090 6845
  141E 004E A3B7         ANA MSKL12        DELETE STATUS BITS                        PPR03100 6846
  141F 004F 80DA         SAN TEM73         B11                                       PPR03110 6847 #
  1420 0050 CB52         ESC .MPY                                                    PPR03120 6848
  1421 0051 00D8         PIN TEM71                                                   PPR03130 6849
  1422 0052 00DA         PIN TEM73                                                   PPR03140 6850
  1423 0053 00DB         PIN TEM74                                                   PPR03150 6851
W 1424 0054 7370         LAN ZERO                                                    PPR03160 6852
  1425 0055 90DB         SUB TEM74         POS NUMBER,B12                            PPR03170 6853
  1426 0056 F00F         SRC 15            B11                                       PPR03180 6854
  1427 0057 84CC         SAN TREFS,X       SCALED REF                                PPR03190 6855
  1428 0058 F808         TAM                                                         PPR03200 6856
W 1429 0059 1476         LDT PPRB1                                                   PPR03210 6857
W 142A 005A 4476         SST PERAB1        SET ABORT FLAG IF OT CAUSES OVERFLOW      PPR03220 6858
  142B 005B E805         DBR XD                                                      PPR03230 6859
  142C 005C 804D         BES PPRB25                                                  PPR03240 6860
W 142D 005D 73C6         LAN TBASE                                                   PPR03250 6861
  142E 005E 90CC         SUB TREFS         SCALED TEMP REF                           PPR03260 6862 #
  142F 005F 827A         SAN DELR1                                                   PPR03270 6863
W 1430 0060 73CD         LAN OTBASE                                                  PPR03280 6864
  1431 0061 90CB         SUB OTREAS        SCALED OT REF ,CHANNEL A                  PPR03290 6865
```

TEMPERATURE TRIMMING PROGRAM, PPR—Continued

```
W   1432 0062 827H          SAN DELR3A                                          PPR03300 6866
W   1433 0063 73CD          LAN OTBASE                                          PPR03310 6867
    1434 0064 90CE          SUB OTREBS      SCALED OT REF ,CHANNEL B            PPR03320 6868
W   1435 0065 827C          SAN DELR3B                                          PPR03330 6869
         0066      PPRB30 EQU *                                                 PPR03340 6870
                        *                                                       PPR03350 6871
                        *   START UP SUPPRESSION SECTION                        PPR03360 6872
                        *                                                       PPR03370 6873
    1436 0066 F800          CLR                                                 PPR03380 6874
    1437 0067 3783          LAT D2WX        WARM UP COMPLETE                    PPR03390 6875
    1438 0068 0071          BHS PPRC10      YES                                 PPR03400 6876
    1439 0069 F908          STR                                                 PPR03410 6877
W   143A 006A 4470          SST WPPR        WARM UP FLAG                        PPR03420 6878
W   143B 006B 7370          LAN ZERO                                            PPR03430 6879
W   143C 006C 827F          SAN KVALR2      SET CORRECTION RAMP#2 TO ZERO       PPR03440 6880
W   143D 006D 73C7          LAN SUCLMP      START UP CLAMP                      PPR03450 6881 #
    143E 006E 93C6          SUB TBASE       TEMP BASE REF                       PPR03460 6882
    143F 006F 8271          SAN DELSU       TEMP START UP SUPPRESSION           PPR03470 6883
    1440 0070 C0AB          BRU PPRD20                                          PPR03480 6884
         0071      PPRC10 EQU *                                                 PPR03490 6885
    1441 0071 F800          CLR                                                 PPR03500 6886
W   1442 0072 3470          LAT WPPR        FIRST PASS AFTER WU COMPLETE        PPR03510 6887
    1443 0073 887A          BRC PPRC20      NO                                  PPR03520 6888
W   1444 0074 7166          LAN TXAVG       TX AVG                              PPR03530 6889
    1445 0075 93C6          SUB TBASE       TEMP BASE                           PPR03540 6890
    1446 0076 8271          SAN DELSU       START UP SUPPRESSION                PPR03550 6891
    1447 0077 F800          CLR                                                 PPR03560 6892
W   1448 0078 4470          SST WPPR        CLEAR WU FLAG                       PPR03570 6893
    1449 0079 C083          BRU PPRC40                                          PPR03580 6894
         007A      PPRC20 EQU *                                                 PPR03590 6895
    144A 007A 7271          LAN DELSU       START UP SUPPRESSION                PPR03600 6896
    144B 007B F808          TAM             NEG TEST                            PPR03610 6897
    144C 007C D080          BHS PPRC35      YES                                 PPR03620 6898 #
         007D      PPRC30 EQU *                                                 PPR03630 6899
W   144D 007D 7370          LAN ZERO                                            PPR03640 6900
    144E 007E 8271          SAN DELSU       START UP SUPPRESSION                PPR03650 6901
    144F 007F C083          BRU PPRC40                                          PPR03660 6902
         0080      PPRC35 EQU *                                                 PPR03670 6903
    1450 0080 7271          LAN DELSU       START UP SUPPRESSION                PPR03680 6904
    1451 0081 9BCB          ADD CONSU       INCREMENTIN G CONST,START UP        PPR03690 6905
    1452 0082 8271          SAN DELSU       START UP SUPPRESSION                PPR03700 6906
         0083      PPRC40 EQU *                                                 PPR03710 6907
                        *                                                       PPR03720 6908
                        *   PEAK,PEAK RESERVE, CONTROL BIASING CALC              PPR03730 6909
                        *                                                       PPR03740 6910
    1453 0083 F800          CLR                                                 PPR03750 6911

W   1454 0084 3795          LAT DPK         PEAK TEST                           PPR03760 6912
    1455 0085 0087          BHS *+2         YES                                 PPR03770 6913
    1456 0086 C0AB          BRU PPRD20      NO                                  PPR03780 6914
W   1457 0087 3796          LAT DPR         PEAK RESERVE TEST                   PPR03790 6915
    1458 0088 8897          BRC PPRD10      NO                                  PPR03800 6916
W   1459 0089 73CB          LAN TPKRES      YES                                 PPR03810 6917
    145A 008A 93C6          SUB TBASE                                           PPR03820 6918
    145B 008B 9272          SUB DELR2       B11                                 PPR03830 6919 #
    145C 008C 9371          SUB ONE         B15,LEAST SIGNIFICANT BIT           PPR03840 6920
    145D 008D F808          TAM             NEG TEST                            PPR03850 6921
    145E 008E 0093          BHS *+5         YES                                 PPR03860 6922
    145F 008F 7272          LAN DELR2       NO                                  PPR03870 6923
    1460 0090 9BC9          ADD CONPPC      INCREMENT CONST                     PPR03880 6924
    1461 0091 8272          SAN DELR2       PK,PK RES CONTROL RAMP              PPR03890 6925
    1462 0092 C0A5          BRU PPRD40                                          PPR03900 6926
W   1463 0093 73CB          LAN TPKRES      PK RES TEMP CONT REF                PPR03910 6927
    1464 0094 93C6          SUB TBASE       BASE TEMP CONT REF                  PPR03920 6928
    1465 0095 8272          SAN DELR2       PK,PK RES CONT RAMP                 PPR03930 6929
    1466 0096 C0A5          BRU PPRD40                                          PPR03940 6930
         0097      PPRD10 EQU *             PEAK BIAS CALC                      PPR03950 6931
W   1467 0097 738A          LAN CON16                                           PPR03960 6932
    1468 0098 80C8          SAN TEM76       DEADBAND = ONE COUNT                PPR03970 6933
W   1469 0099 73CA          LAN TPEAK                                           PPR03980 6934
    146A 009A 93C6          SUB TBASE                                           PPR03990 6935 #
    146B 009B 9272          SUB DELR2                                           PPR04000 6936
    146C 009C 90C8          SUB TEM76                                           PPR04010 6937
    146D 009D F808          TAM             NEG TEST                            PPR04020 6938
    146E 009E 88A7          BRC PPRD15      NO ,DELR2 TOO SMALL                 PPR04030 6939
    146F 009F 98C8          ADD TEM76                                           PPR04040 6940
    1470 00A0 98C8          ADD TEM76                                           PPR04050 6941
    1471 00A1 F808          TAM             NEG TEST                            PPR04060 6942
    1472 00A2 D0AF          BHS PPRD30      YES,DELR2 TOO LARGE                 PPR04070 6943
W   1473 00A3 73CA          LAN TPEAK                                           PPR04080 6944
    1474 00A4 93C6          SUB TBASE                                           PPR04090 6945
    1475 00A5 8272          SAN DELR2       PK,PK RES CONT RAMP                 PPR04100 6946
    1476 00A6 C0A5          BRU PPRD40                                          PPR04110 6947
         00A7      PPRD15 EQU *                                                 PPR04120 6948
    1477 00A7 7272          LAN DELR2                                           PPR04130 6949
    1478 00A8 9BC9          ADD CONPPC      INCREMENT UP                        PPR04140 6950
    1479 00A9 8272          SAN DELR2                                           PPR04150 6951 #
    147A 00AA C0A5          BRU PPRD40                                          PPR04160 6952
         00AB      PPRD20 EQU *                                                 PPR04170 6953
    147B 00AB 7272          LAN DELR2       B11                                 PPR04180 6954
    147C 00AC 9371          SUB ONE         B15                                 PPR04190 6955
    147D 00AD F808          TAM             NEG TEST                            PPR04200 6956
    147E 00AE D0B3          BHS PPRD35      YES                                 PPR04210 6957
```

TEMPERATURE TRIMMING PROGRAM, PPR—Continued

```
              00AF        PPRD30 EQL *                                          PPR04220 6958
   147F  00AF 7272               LAN   DELR2                                    PPR04230 6959
   1480  00B0 93C9               SUB   CONPPC                                   PPR04240 6960
   1481  00B1 8272               SAN   DELR2       PK,PK RES CONT RAMP          PPR04250 6961
   1482  00B2 C0B5               BRU   PPRD40                                   PPR04260 6962
W  1483  00B3 7370        PPRD35 LAN   ZERO                                     PPR04270 6963
   1484  00B4 8272               SAN   DELR2                                    PPR04280 6964
              00B5        PPRD40 EQL *                                          PPR04290 6965
                                                                                PPR04300 6966
                           *   PEAK RESERVE PROTECTION BIASING                  PPR04310 6967
                           *                                                    PPR04320 6968
   1485  00B5 F800               CLR                                            PPR04330 6969
W  1486  00B6 3796               LAT   DPR         PK RES TEST                  PPR04340 6970
   1487  00B7 B8BC               BFC   *+5         NO                           PPR04350 6971
W  1488  00B8 73CE               LAN   OTPKRS      YES                          PPR04360 6972 #
   1489  00B9 93CD               SUB   OTBASE                                   PPR04370 6973
   148A  00BA 8274               SAN   DELR4       PK RES PROT RAMP             PPR04380 6974
   148B  00BB C0C3               BRU   PPRE10                                   PPR04390 6975
   148C  00BC 7274               LAN   DELR4                                    PPR04400 6976
   148D  00BD 93CF               SUB   CONPPP      DECREMENTING CONST           PPR04410 6977
   148E  00BE 8274               SAN   DELR4       PK RES PROT RAMP             PPR04420 6978
   148F  00BF F800               TAM                                            PPR04430 6979
   1490  00C0 B8C3               BFC   *+3                                      PPR04440 6980
W  1491  00C1 7370               LAN   ZERO                                     PPR04450 6981
   1492  00C2 8274               SAN   DELR4       PK RES PROT RAMP             PPR04460 6982
              00C3        PPRE10 EQL *                                          PPR04470 6983
                                                                                PPR04480 6984
                           *   CORRECTION RAMP #1 CALC,TO CORRECT MID VALUE ERROR,KVALR1   PPR04490 6985
                           *                                                    PPR04500 6986
   1493  00C3 7262               LAN   KVAL1       CORRECTION #1 (FROM TCA)     PPR04510 6987
W  1494  00C4 9270               SUB   KVALR1      COMPARE TO RAMP#1            PPR04520 6988
   1495  00C5 93C2               SUB   KVALD1      COMPARE DIFF TO DEADBAND#1   PPR04530 6989
   1496  00C6 F808               TAM               NEG TEST                     PPR04540 6990
   1497  00C7 B8CD               BFC   PPRE11      NO,KVALR1 IS TOO SMALL       PPR04550 6991 #
   1498  00C8 9BC2               ADD   KVALD1                                   PPR04560 6992
   1499  00C9 9BC2               ADD   KVALD1      ADD TWICE DEADBAND           PPR04570 6993
   149A  00CA F808               TAM               NEG TEST                     PPR04580 6994
   149B  00CB D0D1               BFS   PPPE12      YES,KVALR1 IS TOO LARGE      PPR04590 6995
   149C  00CC C0D4               BRU   PPRE15                                   PPR04600 6996
W  149D  00CD 7270        PPRE11 LAN   KVALR1                                   PPR04610 6997
   149E  00CE 9BCC               ADD   CONKV1      ADD INCREMENTING FACTOR #1   PPR04620 6998
W  149F  00CF 8270               SAN   KVALR1                                   PPR04630 6999
   14A0  00D0 C0D4               BRU   PPRE15                                   PPR04640 7000
W  14A1  00D1 7270        PPRE12 LAN   KVALR1                                   PPR04650 7001
   14A2  00D2 93CC               SUB   CONKV1                                   PPR04660 7002
W  14A3  00D3 8270               SAN   KVALR1      CORRECTION RAMP #1           PPR04670 7003

00D4        PPRE15 EQL *                                          PPR04680 7004
                                                                                PPR04690 7005
                           *   CORRECTION RAMP #2 CALC,SLOW INTEGRAL ACTION,KVALR2   PPR04700 7006
                           *                                                    PPR04710 7007
W  14A4  00D4 73C6               LAN   TBASE       BASE TEMP REF                PPR04720 7008
   14A5  00D5 9A71               ADD   DELSU       START UP SUPPRESSION, NEG #  PPR04730 7009
   14A6  00D6 9A72               ADD   DELR2       PK,PK RES RAMP               PPR04740 7010 #
   14A7  00D7 9273               SUB   DELC        AMB BIAS,RESULTING IN TEMPERATURE CONT REF PPR04750 7011
   14A8  00D8 8165               SAN   TEMSP       TEMP SET POINT               PPR04760 7012
   14A9  00D9 F800               CLR                                            PPR04770 7013
W  14AA  00DA 347E               LAT   PPRINH      BYPASS IF INHIBIT FLAG SET   PPR04780 7014
   14AB  00DB 01EC               LOF   L261C       BYPASS IF NOT ON TEMP CONT   PPR04790 7015
   14AC  00DC 00EB               BFS   PPRE20      JUMP                         PPR04800 7016
   14AD  00DD 9166               SUB   TXAVG       TEMP AVG (FROM TCA PROGRAM)  PPR04810 7017
   14AE  00DE 8068               SAN   TEM71       STORE TEMP ERROR             PPR04820 7018
   14AF  00DF F808               TAM                                            PPR04830 7019
   14B0  00E0 D0FE               BFS   PPRE16      IF NEG,ACTUAL TEMP TOO HIGH  PPR04840 7020
   14B1  00E1 93E8               SUB   KVALD2      TEST DEADBAND (ERROR IS POS) PPR04850 7021
   14B2  00E2 F808               TAM                                            PPR04860 7022
   14B3  00E3 D0EB               BFS   PPRE20      IF NEG,CONTROL IS WITHIN DEADBAND PPR04870 7023
W  14B4  00E4 727E               LAN   KVALR2      CORRECTION RAMP             PPR04880 7024
   14B5  00E5 9BE9               ADD   CONKV2      INCREMENT RAMP UPWARD        PPR04890 7025 #
W  14B6  00E6 827E               SAN   KVALR2      STORE AS NEW CORRECTION RAMP#2  PPR04900 7026
   14B7  00E7 93EA               SUB   LKVAL2      CHECK AGAINST CORRECTION LIMIT PPR04910 7027
   14B8  00E8 F800               TGR                                            PPR04920 7028
W  14B9  00E9 447F               SST   PPRLKV      CORRECTION RAMP#2 SAT FLAG   PPR04930 7029
   14BA  00EA 68EB               BFC   PPRE20      IF NEG,CORRECTION DOES NOT EXCEED LIMIT PPR04940 7030
W  14BB  00EB 73EA               LAN   LKVAL2                                   PPR04950 7031
W  14BC  00EC 827E               SAN   KVALR2      SET CORRECTION TO MAX ALLOWABLE PPR04960 7032
   14BD  00ED C0EB               BRU   PPRE20                                   PPR04970 7033
              00EE        PPRE16 EQL *             NEG ERROR CHECK              PPR04980 7034
   14BE  00EE 9BE8               ADD   KVALD2      TEST DEADBAND                PPR04990 7035
   14BF  00EF F808               TAM                                            PPR05000 7036
   14C0  00F0 B8EB               BFC   PPRE20      IF POS,CONTROL IS WITHIN DEADBAND,SO JUMP PPR05010 7037
W  14C1  00F1 727E               LAN   KVALR2      CORRECTION RAMP             PPR05020 7038
   14C2  00F2 93E9               SUB   CONKV2      DECREMENT RAMP NEGATIVELY    PPR05030 7039
W  14C3  00F3 827E               SAN   KVALR2      STORE NEW RAMP              PPR05040 7040
   14C4  00F4 9BEA               ADD   LKVAL2      ADD LIMIT                    PPR05050 7041 #
   14C5  00F5 F808               TAM                                            PPR05060 7042
W  14C6  00F6 447F               SST   PPRLKV      CORRECTION RAMP#2 SAT FLAG   PPR05070 7043
   14C7  00F7 B8EB               BFC   PPRE20      IF POS,THE CORRECTION RAMP IS WITHIN LIMIT PPR05080 7044
W  14C8  00F8 7370               LAN   ZERO                                    PPR05090 7045
   14C9  00F9 93EA               SUB   LKVAL2                                   PPR05100 7046
W  14CA  00FA 827E               SAN   KVALR2      SET CORRECTION RAMP TO MAX ALLOWABLE PPR05110 7047
              00FB        PPRE20 EQL *                                          PPR05120 7048
                                                                                PPR05130 7049
```

TEMPERATURE TRIMMING PROGRAM, PPR—Continued

```
                        *    TRIM CALCULATIONS                                      PPR05140 7050
                        *                                                           PPR05150 7051
W    14CB 00EB 727D          LAN KVALR1        CORRECTION RAMP #1                   PPR05160 7052
W    14CC 00FC 9A7E          ADD KVALR2        CORRECTION RAMP#2 (INTEGRAL CORRECTION) PPR05170 7053
     14CD 00FD 9273          SUB DELC          AMB BIAS                             PPR05180 7054
W    14CE 00FE 9A74          ADD DELR1         DELTA REF                            PPR05190 7055
     14CF 00FF 8277          SAN IGVDS1        IGV TRIM TEMPERATURE STORAGE         PPR05200 7056
     14D0 0100 9A72          ADD DELR2         PK,PK RES RAMP                       PPR05210 7057
     14D1 0101 9A71          ADD DELSU         START UP SUPPPESSION (NEG NO)        PPR05220 7058
     14D2 0102 8276          SAN TEMDS1        TEMPERATURE CONTROL TRIM,TEMP STORAGE PPR05230 7059
W    14D3 0103 727B          LAN DELR3A        OT DELTA REF,CHAN A                  PPR05240 7060 #
     14D4 0104 9A74          ADD DELR4         OT PK RES RAMP                       PPR05250 7061
     14D5 0105 9273          SUB DELC          AMB BIAS                             PPR05260 7062
     14D6 0106 8278          SAN OTADS1        OT TRIM TEMP STORAGE,CHAN A          PPR05270 7063
W    14D7 0107 727C          LAN DELR3B        OT DELTA REF,CHAN B                  PPR05280 7064
     14D8 0108 9A74          ADD DELR4         OT PK RES RAMP                       PPR05290 7065
     14D9 0109 9273          SUB DELC          AMB BIAS                             PPR05300 7066
     14DA 010A 8279          SAN OTHDS1        OT TRIM TEMP STORAGE,CHAN B          PPR05310 7067
W    14DB 010B 7300          LAN TALMB         BASE TEMP ALARM                      PPR05320 7068
     14DC 010C 9273          SUB DELC                                               PPR05330 7069
     14DD 010D 9A74          ADD DELR4                                              PPR05340 7070
     14DE 010E 8004          SAN TALARM        B11,TEMP ALARM POINT                 PPR05350 7071
W    14DF 010F 7301          LAN TTRIPD        BASE TEMP TRIP                       PPR05360 7072
     14E0 0110 9A74          ADD DELR4                                              PPR05370 7073
     14E1 0111 9273          SUB DELC                                               PPR05380 7074
     14E2 0112 8005          SAN TTRIP         CALC TRIP TEMP,B11                   PPR05390 7075 #
          0113          PPRE30 EQU *                                                PPR05400 7076
                        *                                                           PPR05410 7077
                        *    SET UP OF PROTECTION AND ALARM FLAGS                   PPR05420 7078
                        *                                                           PPR05430 7079
     14E3 0113 7004          LAN TALARM                                             PPR05440 7080
     14E4 0114 9166          SUB TXAVG         AVERAGE TEMPERATURE                  PPR05450 7081
     14E5 0115 F808          TAM               NEG TEST,SET R                       PPR05460 7082
W    14E6 0116 4474          SST PP26EA        TEMP ALARM FLAG                      PPR05470 7083
          0117          PPRE40 EQU *                                                PPR05480 7084
     14E7 0117 7005          LAN TTRIP                                              PPR05490 7085
     14E8 0118 9166          SUB TXAVG                                              PPR05500 7086
     14E9 0119 F808          TAM               NEG TEST,SET R                       PPR05510 7087
W    14EA 011A 4747          SST D26EF                                              PPR05520 7088
          011B          PPRF10 EQU *           EXHAUST TEMP DIFF AND AMB BIAS CHECK PPR05530 7089
     14EB 011B F800          CLR                                                    PPR05540 7090
     14EC 011C 31F0          LAT L52GX         IS GEN BKR CLOSED                    PPR05550 7091
     14ED 011D B924          BRC PPRF20                                             PPR05560 7092
W    14EE 011E 73C1          LAN VCEREQ        YES,LOAD REQ'D VCE                   PPR05570 7093
     14EF 011F 9275          SUB VCEPCD        ACTUAL VCE OR VCE EQUIV              PPR05580 7094
     14F0 0120 F860          TGR                                                    PPR05590 7095

14F1 0121 B924          BRC *+3                                                PPR05600 7096 #
W    14F2 0122 4470          SST D3EDA                                              PPR05610 7097
     14F3 0123 C140          BRU PPRF50                                             PPR05620 7098
          0124          PPRF20 EQU *                                                PPR05630 7099
     14F4 0124 F800          CLR                                                    PPR05640 7100
W    14F5 0125 4470          SST D3EDA         AMB BIAS PROBLEM                     PPR05650 7101
W    14F6 0126 7372          LAN TWO                                                PPR05660 7102
     14F7 0127 8005          SAN XD            INDEX SET UP                         PPR05670 7103
          0128          PPRF25 EQU *                                                PPR05680 7104
W    14F8 0128 7166          LAN TXAVG                                              PPR05690 7105
W    14F9 0129 965C          SUB AOTAD,X                                            PPR05700 7106
     14FA 012A F808          TAM               NEG TEST                             PPR05710 7107
     14FB 012B B92E          BRC *+3           NO                                   PPR05720 7108
     14FC 012C F380          ERA ONES          CONVERT TO POSITIVE #                PPR05730 7109
     14FD 012D 9871          ADD ONE                                                PPR05740 7110
     14FE 012E 93C0          SUB LTEMPF        COMPARE AGAINST LIMIT                PPR05750 7111
     14FF 012F F860          TGR               POS =TROUBLE                         PPR05760 7112
W    1500 0130 4471          SST D3EDA         STORE IN DIFF ALARM BIT              PPR05770 7113 #
     1501 0131 F805          DNR XD            FINISHED                             PPR05780 7114
     1502 0132 0128          BRS PPRF25        NO                                   PPR05790 7115
          0133          PPRF30 EQU *                                                PPR05800 7116
     1503 0133 7262          LAN KVAL1         CORRECTION #1(FROM TCA)              PPR05810 7117
     1504 0134 F808          TAM                                                    PPR05820 7118
     1505 0135 B938          BRC *+3                                                PPR05830 7119
     1506 0136 B380          ERA ONES                                               PPR05840 7120
     1507 0137 9871          ADD ONE                                                PPR05850 7121
     1508 0138 8008          SAN TEM71                                              PPR05860 7122
     1509 0139 93BE          SUB LTEMKV                                             PPR05870 7123
     150A 013A F860          TGR               POS=ALARM                            PPR05880 7124
W    150B 013B 4472          SST D3EDC                                              PPR05890 7125
     150C 013C 7008          LAN TEM71         CHECK KVAL EXCEEDS TRIP LIMIT        PPR05900 7126
     150D 013D 93BF          SUB LTEMTP                                             PPR05910 7127
     150E 013E F860          TGR               POS = TROUBLE                        PPR05920 7128
W    150F 013F 4473          SST D3EDD         STORE STATUS FLAG,EXCESSIVE CORRECTION PPR05930 7129 #
          0140          PPRF50 EQU *                                                PPR05940 7130
                        *                                                           PPR05950 7131
                        *    SCALING & OUTPUT FORMATING OF TEMP TRIM SIGNALS        PPR05960 7132
                        *                                                           PPR05970 7133
W    1510 0140 7370          LAN ZERO                                               PPR05980 7134
     1511 0141 8008          SAN TEM71                                              PPR05990 7135
W    1512 0142 7371          LAN ONE           IF OVERTEMP TRIMS ARE NEEDED,REV ONE TO TH PPR06000 7136
     1513 0143 8005          SAN XD            SET INDEX                            PPR06010 7137
W    1514 0144 73D2          LAN SCLTFM        B3,SCALING FACTOR                    PPR06020 7138
     1515 0145 8009          SAN TEM72                                              PPR06030 7139
     1516 0146 7676     PPRF52 LAN TEMDS1,X                                         PPR06040 7140
     1517 0147 F808          TAM                                                    PPR06050 7141
```

TEMPERATURE TRIMMING PROGRAM, PPR—Continued

```
W   1518  0148  4475              SST PPRTMP              IF NEG, SET FLAG              PPR06060  7142
    1519  0149  800A              SAN TEM73                                             PPR06070  7143
    151A  014A  C852              FSC *MPY                                              PPR06080  7144
    151B  014B  00D8              PIN TEM71                                             PPR06090  7145
    151C  014C  00DA              PIN TEM73                                             PPR06100  7146
    151D  014D  00DB              PIN TEM74                                             PPR06110  7147
    151E  014E  70DB              LAN TEM74               B14                           PPR06120  7148 #
    151F  014F  A384              ANA MSKL4                                             PPR06130  7149
    1520  0150  F800              CLR                                                   PPR06140  7150
W   1521  0151  3475              LAT PPRTMP                                            PPR06150  7151
    1522  0152  015B              BES PPRF54              FOR NEG NUMBERS               PPR06160  7152
    1523  0153  9370              SUB ZERO                                              PPR06170  7153
    1524  0154  F840              TEQ                                                   PPR06180  7154
    1525  0155  0163              BRS PPRF56              SYSTEM OKAY                   PPR06190  7155
W   1526  0156  7387              LAN MSKL12              SYSTEM SATURATED              PPR06200  7156
    1527  0157  8381              ERA MSKL1                                             PPR06210  7157
    1528  0158  F900              STR                                                   PPR06220  7158
W   1529  0159  4C77              SST PPROV,X                                           PPR06230  7159
    152A  015A  C16A              BRU PPRF57                                            PPR06240  7160
          015B        PPRF54 EQU  *                       NEG NUMBER ROUTINE            PPR06250  7161
    152B  015B  8384              ERA MSKL4                                             PPR06260  7162
    152C  015C  F840              TEQ                                                   PPR06270  7163
    152D  015D  0163              BRS PPRF56              SYSTEM OKAY                   PPR06280  7164 #
W   152E  015E  7381              LAN MSKL1               SET UP FOR NEG SAT            PPR06290  7165
    152F  015F  838A              ERA CON16                                             PPR06300  7166
    1530  0160  F900              STR                                                   PPR06310  7167
W   1531  0161  4C77              SST PPROV,X                                           PPR06320  7168
    1532  0162  C16A              BRU PPRF57                                            PPR06330  7169
          0163        PPRF56 EQU  *                                                     PPR06340  7170
    1533  0163  F800              CLR                                                   PPR06350  7171
W   1534  0164  4C77              SST PPROV,X                                           PPR06360  7172
    1535  0165  70DB              LAN TEM74               B14                           PPR06370  7173
    1536  0166  F802              TAO                                                   PPR06380  7174
    1537  0167  8969              BRC *+2                                               PPR06390  7175
    1538  0168  9871              ADD ONE                                               PPR06400  7176
    1539  0169  E000              SRC 13                  B11                           PPR06410  7177
          016A        PPRF57 EQU  *                                                     PPR06420  7178
W   153A  016A  856B              SAN TMTEM,X             FOR DISPLAY                   PPR06430  7179
    153B  016B  8387              ERA MSKL12              INVERT OUTPUT                 PPR06440  7180
    153C  016C  98BA              ADD CON16                                             PPR06450  7181 #
    153D  016D  A387              ANA MSKL12              BLANKS RIGHT FOUR BITS        PPR06460  7182
    153E  016E  8773              ERA THREE,X             SETS MULTIPLEX OUTPUT ADDRESS PPR06470  7183
    153F  016F  8583              SAN BTMTEM,X                                          PPR06480  7184
    1540  0170  E805              DMR XD                  FINISHED                      PPR06490  7185
    1541  0171  0146              BPS PPRF52              NO                            PPR06500  7186
          0172        PPRF60 EQU  *                                                     PPR06510  7187

1542  0172  7272              LAN DELR2               PK,PK RES CONTROL BIAS        PPR06520  7188
    1543  0173  9370              SUB ZERO                                              PPR06530  7189
    1544  0174  F840              TEQ                                                   PPR06540  7190
W   1545  0175  4474              SST PPRDR2                                            PPR06550  7191
    1546  0176  7276              LAN TEMDSI                                            PPR06560  7192
    1547  0177  9370              SUB ZERO                                              PPR06570  7193
    1548  0178  F840              TEQ                                                   PPR06580  7194
W   1549  0179  447C              SST PPRTEM                                            PPR06590  7195
    154A  017A  FA00              TOV                                                   PPR06600  7196
W   154B  017B  1476              LDT PPRAB1                                            PPR06610  7197 #
W   154C  017C  4476              SST PPRAB1              STORE PPR ABORT FLAG          PPR06620  7198
    154D  017D  CB40              JIS MSPRTN              RETURN TO MASTER STATUS PROGRAM PPR06630 7199
          0082        PPREND GEN  PPRSIZ-*                                              PPR06640  7200
W   154E  017E  E800              DMR 0                   HALT                          PPR06650  7201
W   154F  017F  E800                                                                              0
    1550  0180  E800                                                                              0
    1551  0181  E800                                                                              0
    1552  0182  E800                                                                              0
    1553  0183  E800                                                                              0
    1554  0184  E800                                                                              0
    1555  0185  E800                                                                              0
    1556  0186  E800                                                                              0
    1557  0187  E800                                                                              0
    1558  0188  E800                                                                              0
    1559  0189  E800                                                                              0
    155A  018A  E800                                                                              0 #
    155B  018B  E800                                                                              0
    155C  018C  E800                                                                              0
    155D  018D  E800                                                                              0
    155E  018E  E800                                                                              0
    155F  018F  E800                                                                              0
    1560  0190  E800                                                                              0
    1561  0191  E800                                                                              0
    1562  0192  E800                                                                              0
    1563  0193  E800                                                                              0
    1564  0194  E800                                                                              0
    1565  0195  E800                                                                              0
    1566  0196  E800                                                                              0
    1567  0197  E800                                                                              0
    1568  0198  E800                                                                              0
    1569  0199  E800                                                                              0 #
    156A  019A  E800                                                                              0
    156B  019B  E800                                                                              0
    156C  019C  E800                                                                              0
    156D  019D  E800                                                                              0
    156E  019E  E800                                                                              0
```

1. In a control system of the type including a controller for providing a fuel control signal to a gas turbine for controlling fuel flow thereto to control the temperature of said turbine, said fuel control signal having a value derived as a function of the average of the values of temperature signals provided to the controller from sensors in the turbine, the improvement in said control system comprising:
   (a) means for specifying to said controller a reference having a value proportional to a desired turbine operating temperature;
   (b) means in said controller for deriving a difference value proportional to the difference in magnitude between said reference and the value derived from the average of the temperature signals;
   (c) means in said controller for developing a first adjustment value which varies at a rate specified by a vernier constant when said difference value exceeds a predetermined magnitude;
   (d) means in said controller for developing a second adjustment value, said second adjustment value having a magnitude proportional to the difference in the value of a mid-value signal and the value derived from the average values of the temperature signals;
   (e) means in said controller responsive to said first adjustment value and to said second adjustment value for developing a temperature trim signal proportional to the difference therebetween; and,
   (f) means for providing said fuel control signal to said turbine including,
      (1) means responsive to specified ones of the temperature signals for generating said mid-value signal, said mid-value signal having a magnitude intermediate the individual values of the temperature signals provided by said specified ones, and
      (2) means for combining said mid-value signal and said temperature trim signal to thereby provide said fuel control signal.

2. In a control system of the type including a controller for providing a fuel control signal to a gas turbine for controlling fuel flow thereto to control the temperature of said turbine, said fuel control signal having a value derived as a function of the average of the values of temperature signals provided to the controller from sensors in the turbine, the improvement in said control system comprising:
   (a) means for specifying to said controller a first reference having a value proportional to a desired turbine operating temperature;
   (b) means in said controller for generating a difference signal having a value proportional to the difference between said first reference and an average value derived from the average of the temperature signals;
   (c) means in said controller responsive to said difference signal for generating a first correction signal which varies at a rate specified by a vernier constant when a difference exists between said first reference and said average value;
   (d) means for specifying to said controller a second reference having a value proportional to a safe turbine operating temperature;
   (e) means in said controller responsive to said first and second references for generating a temperature bias reference having a value proportional to the difference between said first and second references;
   (f) means for combining said average value and a mid-value signal to generate a second correction signal;
   (g) means for algebraically combining said first correction signal, said temperature bias reference and said second correction signal to generate a temperature trim signal; and,
   (h) means including,
      (1) means responsive to specified ones of the temperature signals for generating said mid-value signal, said mid-value signal having a magnitude intermediate the individual values of the temperature signals provided by said specified ones, and,
      (2) means for algebraically combining said mid-value signal, said temperature trim signal and said second reference for generating the fuel control signal provided to said turbine.

3. An improved method of controlling the operating temperature of a gas turbine in a system of the type including a controller for providing a fuel control signal to said turbine for controlling fuel flow thereto, said fuel control signal having a value derived as a function of the average of the values of temperature signals provided to the controller from sensors in the turbine, the method comprising the steps of:
   (a) specifying to said controller first and second references, said first reference having a value proportional to a desired turbine operating temperature and said second reference having a value proportional to a safe turbine operating temperature;
   (b) developing in said controller a first correction value which varies in magnitude at a rate specified by a vernier constant when a difference exists between said first reference and an average value derived from the average values of the temperature signals;
   (c) algebraically combining in said controller said first and second references to generate a temperature bias reference;
   (d) providing to said controller a mid-value signal having a value mid the individual values of specified ones of the temperature signals;
   (e) algebraically combining in said controller said average value and said mid-value signal to generate a second correction value;
   (f) algebraically combining in said controller said first and second correction values and said temperature bias reference to generate a temperature trim signal by said controller; and,
   (g) algebraically combining said mid-value signal, said temperature trim signal and said second reference to provide said fuel control signal to said turbine.

4. In a control system, a method of controlling the operating temperature of a gas turbine in accordance with turbine temperature represented by the values of temperature signals, at least some of said temperature signals, provided to a computer from temperature sensors in the turbine, comprising the steps of:
   (a) providing to the computer first and second reference signals and a mid-value signal, said first reference signal having a value proportional to a desired turbine operating temperature, said second reference signal having a value proportional to a safe turbine operating temperature, and said mid-value signal having a value intermediate the individual values of specified ones of the temperature signals;

(b) storing in the computer a program of instructions, said program directing the computer to,
  (1) calculate an average value proportional to the average turbine temperature in accordance with the values of the temperature signals provided to the computer,
  (2) calculate the difference between said first reference and said average value,
  (3) develop a first correction value having a rate of change specified by a vernier constant when a difference exists between said first reference and said average value,
  (4) develop a temperature bias reference having a value proportional to the difference between said first and second references,
  (5) develop a second correction value proportional to the difference between said average value and said mid-value signal,
  (6) calculate the value of a temperature trim signal for output by said computer, said temperature trim signal having a value proportional to the sum of said first and second correction values and said temperature bias reference; and,
(c) algebraically summing said temperature trim signal, said mid-value signal and said second reference to provide a fuel control signal to said gas turbine to control the flow of fuel to the turbine.

5. In a control system, a method of controlling the operating temperature of a gas turbine in accordance with turbine temperature represented by the values of temperature signals provided to a computer from temperature sensors in the turbine, comprising the steps of:
  (a) providing to the computer a reference signal having a value proportional to a desired turbine operating temperature;
  (b) providing to the computer a mid-value signal having a value intermediate the individual values of specified ones of the temperature signals;
  (c) providing to the computer at least some of said temperature signals;
  (d) storing in the computer an executable program of instructions, said program, when executed, directing said computer to,
    (1) calculate a value proportional to the average turbine temperature in accordance with the average of the values of the temperature signals provided to the computer,
    (2) develop a correction value proportional to the difference in magnitude between the value of said reference signal and the value proportional to the average turbine temperature,
    (3) adjust the correction value by a predetermined vernier constant for each execution of said program if a difference exists between the value of said reference signal and the value proportional to the average turbine temperature,
    (4) calculate the value of a temperature trim signal for output by said computer, said temperature trim signal having a value derived from the sum of said correction value and the difference in magnitude between said mid-valve signal and the value proportional to the average turbine temperature; and,
  (e) algebraically combining said temperature trim signal and said mid-value signal to provide a fuel control signal to said gas turbine to control the flow of fuel to the turbine and the operating temperature thereof.

6. A system for controlling fuel flow to a gas turbine in accordance with turbine temperature represented by the values of temperature readings provided by sensors in the turbine, said system comprising:
  (a) means for providing a predetermined reference proportional to a desired turbine operating temperature; and sensor means for providing the values of said temperature readings
  (b) a programmable controller including,
    (1) a storage means for retaining a program of instructions and holding data related to the calculation of a temperature trim signal for output by said controller,
      (i) certain ones of said instructions directing said controller to determine if the value of each temperature reading is within prescribed limits and to reject those temperature readings which are out of limits,
      (ii) certain other ones of said instructions directing said controller to calculate the value of said temperature trim signal, said temperature trim signal having a value proportional to the sum of first and second adjustment values, said first adjustment value varying at a rate specified by a vernier constant when there is a difference in the magnitude between said reference and a calculated value proportional to the average of unrejected temperature readings and said second adjustment value having a magnitude proportional to the difference in the value of a mid-value signal applied to said controller and said calculated value; and,
  (c) means for providing a fuel control signal to said turbine for controlling fuel flow thereto including,
    (1) means coupled to specified ones of said sensors and responsive to the temperature readings provided thereby for generating said mid-value signal, said mid-value signal having a magnitude substantially proportional to the average turbine operating temperature, and
    (2) means for combining said mid-value signal and said temperature trim signal to thereby provide said fuel control signal.

7. In a control system of the type including a controller for providing a fuel control signal to a gas turbine for controlling fuel flow thereto to control the temperature of said turbine, said fuel control signal having a value derived as a function of the average of the values of temperature signals provided to the controller from sensors in the turbine, the improvement in said control system comprising:
  (a) means in said controller including,
    (1) select means responsive to said temperature signals to determine the reliability of each sensor and to allow at the output thereof only those temperature signals which are within prescribed limits, and
    (2) averaging means responsive to the temperature signals at the output of said select means for generating a temperature average signal proportional to the average of the temperature signals applied thereto;
  (b) means for specifying to said controller a reference signal having a value proportional to a desired turbine operating temperature;
  (c) means in said controller responsive to said reference signal and said temperature average signal for generating a first correction signal proportional to the difference in magnitude between said reference and temperature average signals;
(d) means in said controller responsive to said first correction signal for developing an adjustment signal which varies at a specified rate when said first correction signal exceeds a predetermined magnitude;
(e) means in said controller responsive to a mid-value signal applied to said controller and said temperature average signal for generating a second correction signal proportional to the difference in the magnitude therebetween;
(f) means in said controller responsive to said adjustment signal and said second correction signal for developing a temperature trim signal proportional to the sum thereof; and,
(g) means for providing said fuel control signal to said turbine including,
(1) means connected to specified ones of said sensors and responsive to the temperature signals provided thereby for generating said mid-value signal, said mid-value signal having a magnitude substantially proportional to the average turbine operating temperature, and,
(2) means for combining said mid-value signal and said temperature trim signal to thereby provide said fuel control signal.

8. In a control system of the type including a controller for providing a fuel control signal to a gas turbine for controlling fuel flow thereto to control the temperature of said turbine, said fuel control signal having a value derived as a function of the average of the values of temperature signals provided to the controller from sensors in the turbine, the improvement in said control system comprising:
(a) means for specifying to said controller a first reference signal having a value proportional to a desired turbine operating temperature;
(b) means for specifying to said controller a second reference signal having a value proportional to a safe turbine operating temperature;
(c) means in said controller including,
(1) select means resonsive to said temperature signals to determine the reliability of each sensor to allow at the output thereof only those temperature signals which are within prescribed limits,
(2) averaging means responsive to the temperature signals at the output of said select means for generating a temperature average signal proportional to the average of the temperature signals applied thereto;
(d) means in said controller responsive to said first refernce signal and said temperature average signal for generating a first correction signal proportional to the difference in magnitude between said first reference and temperature average signals;
(e) means in said controller responsive to said first correction signal for developing an adjustment signal which varies at a specified rate when said first correction signal exceeds a predetermined magnitude;
(f) means in said controller responsive to a mid-value signal applied to said controller and said temperature average signal for generating a second correction signal proportional to the difference in the magnitude therebetween;
(g) means in said controller responsive to said first and second reference signals for generating a third reference signal proportional to the difference in the magnitude between said first and second reference signals;
(h) means in said controller responsive to said adjustment signal, said second correction signal and said third reference signal for developing a temperature trim signal proportional to the sum thereof; and,
(i) means for providing said fuel control signal to said turbine including,
(1) means connected to specified ones of said sensors and responsive to the temperature signals provided thereby for generating said mid-value signal, said mid-value signal having a magnitude substantially proportional to the average turbine operating temperature, and,
(2) means for combining said mid-value signal, said temperature trim signal and said second reference signal to thereby provide said fuel control signal.

* * * * *